United States Patent
Lynch et al.

(10) Patent No.: US 9,980,213 B2
(45) Date of Patent: May 22, 2018

(54) METHODS, APPARATUS AND SYSTEMS FOR WIRELESS NETWORK SELECTION

(71) Applicant: InterDigital Patent Holdings, Inc., Wilmington, DE (US)

(72) Inventors: Kenneth F. Lynch, King of Prussia, PA (US); Scott C. Hergenhan, King of Prussia, PA (US); Angelo A. Cuffaro, Montreal (CA); Alexander Reznik, King of Prussia, PA (US); Yousif Targali, Sammamish, WA (US); Yogendra C. Shah, King of Prussia, PA (US); Vinod Kumar Choyi, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 93 days.

(21) Appl. No.: 14/913,538

(22) PCT Filed: Aug. 22, 2014

(86) PCT No.: PCT/US2014/052247
§ 371 (c)(1),
(2) Date: Feb. 22, 2016

(87) PCT Pub. No.: WO2015/031184
PCT Pub. Date: Mar. 5, 2015

(65) Prior Publication Data
US 2016/0212695 A1   Jul. 21, 2016

Related U.S. Application Data

(60) Provisional application No. 61/871,776, filed on Aug. 29, 2013, provisional application No. 62/002,413, filed on May 23, 2014.

(51) Int. Cl.
*H04W 8/30* (2009.01)
*H04W 48/18* (2009.01)
(Continued)

(52) U.S. Cl.
CPC ....... *H04W 48/18* (2013.01); *H04W 28/0268* (2013.01); *H04W 48/06* (2013.01); *H04W 48/08* (2013.01)

(58) Field of Classification Search
CPC ..... H04W 84/12; H04W 48/16; H04W 88/08; H04W 12/08
(Continued)

(56) References Cited

U.S. PATENT DOCUMENTS

2004/0176024 A1   9/2004   Hsu et al.
2006/0227972 A1  10/2006   Brok et al.
(Continued)

FOREIGN PATENT DOCUMENTS

WO   WO-2004/077753   9/2004
WO   WO-2010/139058   12/2010

OTHER PUBLICATIONS

"FriendList", http://developers.Facebook.com/docs/reference/api/FriendList/, May 29, 2013, 2 pages.
(Continued)

*Primary Examiner* — Charles C Jiang
*Assistant Examiner* — Will Lin
(74) *Attorney, Agent, or Firm* — Eric Berkowitz

(57) ABSTRACT

Methods, apparatus and systems for managing an exposure of a network to a wireless transmit/receive unit (WTRU) are disclosed. One representative method includes receiving, by an access point (AP) of the network, information associated with the WTRU; and selectively exposing, by the AP, the network.

21 Claims, 28 Drawing Sheets

(51) Int. Cl.
*H04W 48/08* (2009.01)
*H04W 28/02* (2009.01)
*H04W 48/06* (2009.01)

(58) Field of Classification Search
USPC .............................................. 370/252, 431
See application file for complete search history.

(56) References Cited

U.S. PATENT DOCUMENTS

| | | | |
|---|---|---|---|
| 2008/0080387 A1 | 4/2008 | Wang et al. | |
| 2008/0096575 A1* | 4/2008 | Aragon | H04W 36/22 455/453 |
| 2008/0130595 A1* | 6/2008 | Abdel-Kader | H04W 48/00 370/338 |
| 2008/0198826 A1* | 8/2008 | Won | H04W 24/02 370/338 |
| 2009/0252129 A1* | 10/2009 | Jaakkola | H04W 8/30 370/338 |
| 2010/0309815 A1* | 12/2010 | Yepez | H04L 12/4625 370/254 |
| 2010/0309847 A1* | 12/2010 | Bharadwaj | H04W 48/18 370/328 |
| 2012/0209934 A1* | 8/2012 | Smedman | H04L 12/5692 709/208 |
| 2013/0065585 A1 | 3/2013 | Pelletier et al. | |
| 2014/0128102 A1* | 5/2014 | Finlow-Bates | H04W 48/08 455/456.3 |
| 2014/0133456 A1* | 5/2014 | Donepudi | H04W 88/10 370/331 |
| 2014/0169279 A1* | 6/2014 | Song | H04W 72/082 370/329 |

OTHER PUBLICATIONS

"Getting Started with Facebook Login for Web", http://developers.Facebook.com/docs/Facebook-login/getting-started-web/, Jun. 23, 2013, 3 pages.
"International Preliminary Report on Patentability from the International Preliminary Examining Authority", Application No. PCT/US14/52247, dated Aug. 14, 2015, 11 pages.
"Partial International Search Report", PCT Application No. PCT/US14/52247, dated Feb 17, 2015, 8 pages.
"The Login Flow for Web", http://developers.Facebook.com/docs/Facebook-login/login-flow-for-web/, Jul 10, 2013, 3 pages.
Panasonic, et al., "Interaction of ANDSF with enhanced policy framework", 3GPP Tdoc S2-104107, 3GPP TSG SA WG2 Meeting #80, Aug. 3-Sep. 3, 2010, Brunstad, Norway, Aug. 30-Sep. 3, 2010, 2 pages.
Huawei, "Discussion about ANDSF", 3GPP Draft; Tdoc S2-083355, 3GPP TSG SA WG2 Meeting #65, Prague, Czech Republic, May 12-16, 2008, 4 pages.
IEEE, "Part 11: Wireless LAN Medium Access Control (MAC) and Physical Layer (PHY) Specifications; Amendment 9: Interworking with External Networks", IEEE Std 802u-2011, Feb 25, 2011, 208 pages.
Lee, Jae S., et al., "Selective Transmission of the Probe Response", IEEE 802.11-12/0063r1, Jan 12, 2011, 28 pages.
Lee, Jae S., et al., "Selective Transmission of the Probe Response for 11ai Spec Framework", IEEE 802.11-12/0572r1, May 4, 2012, 22 pages.
"New Smarter use cases on home networking", 3GPP Tdoc S1-154232; 3GPP TSG-SA WG1 Meeting #72; Anaheim, USA, Nov. 16-20, 2015, 3 pages.

* cited by examiner

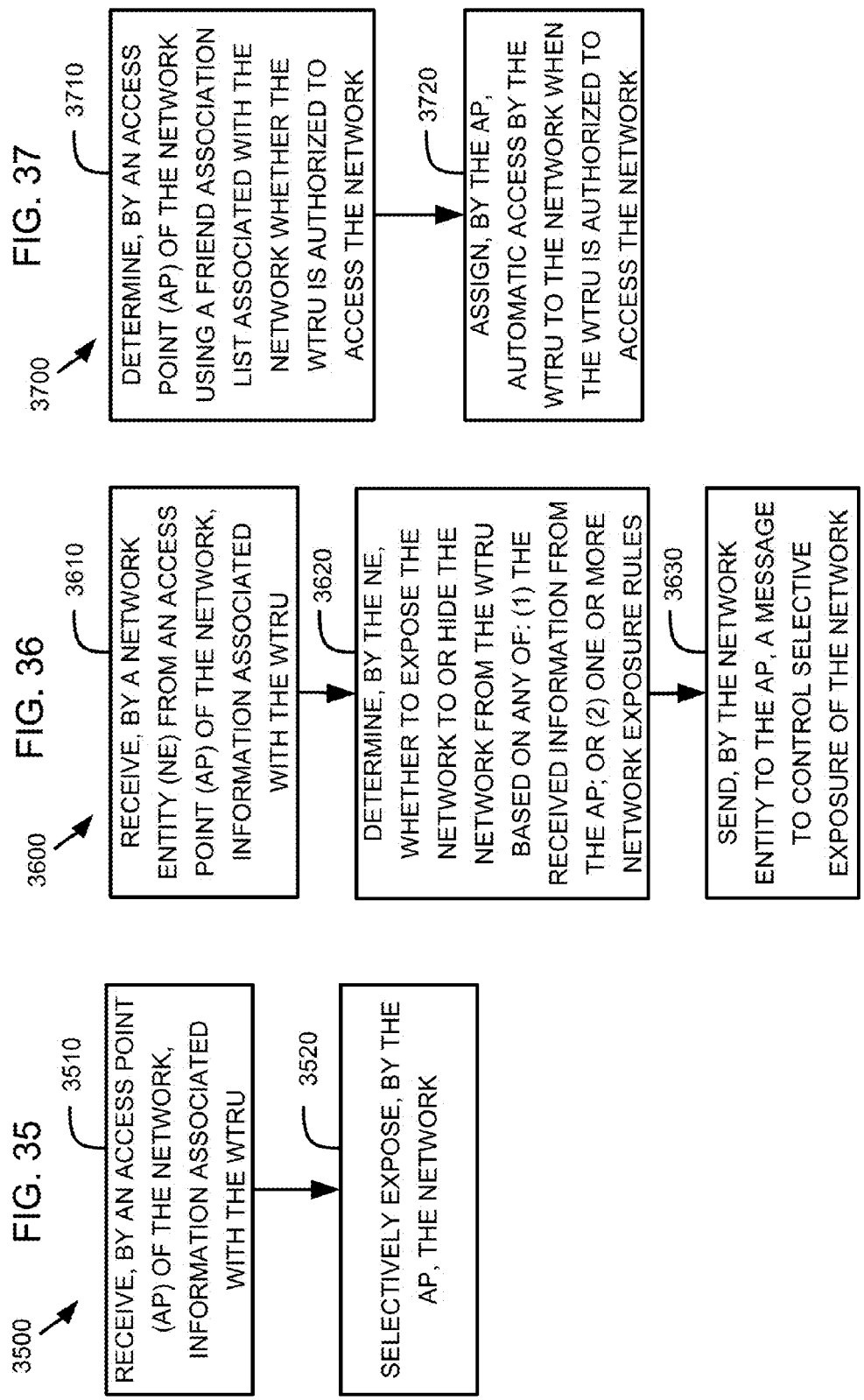

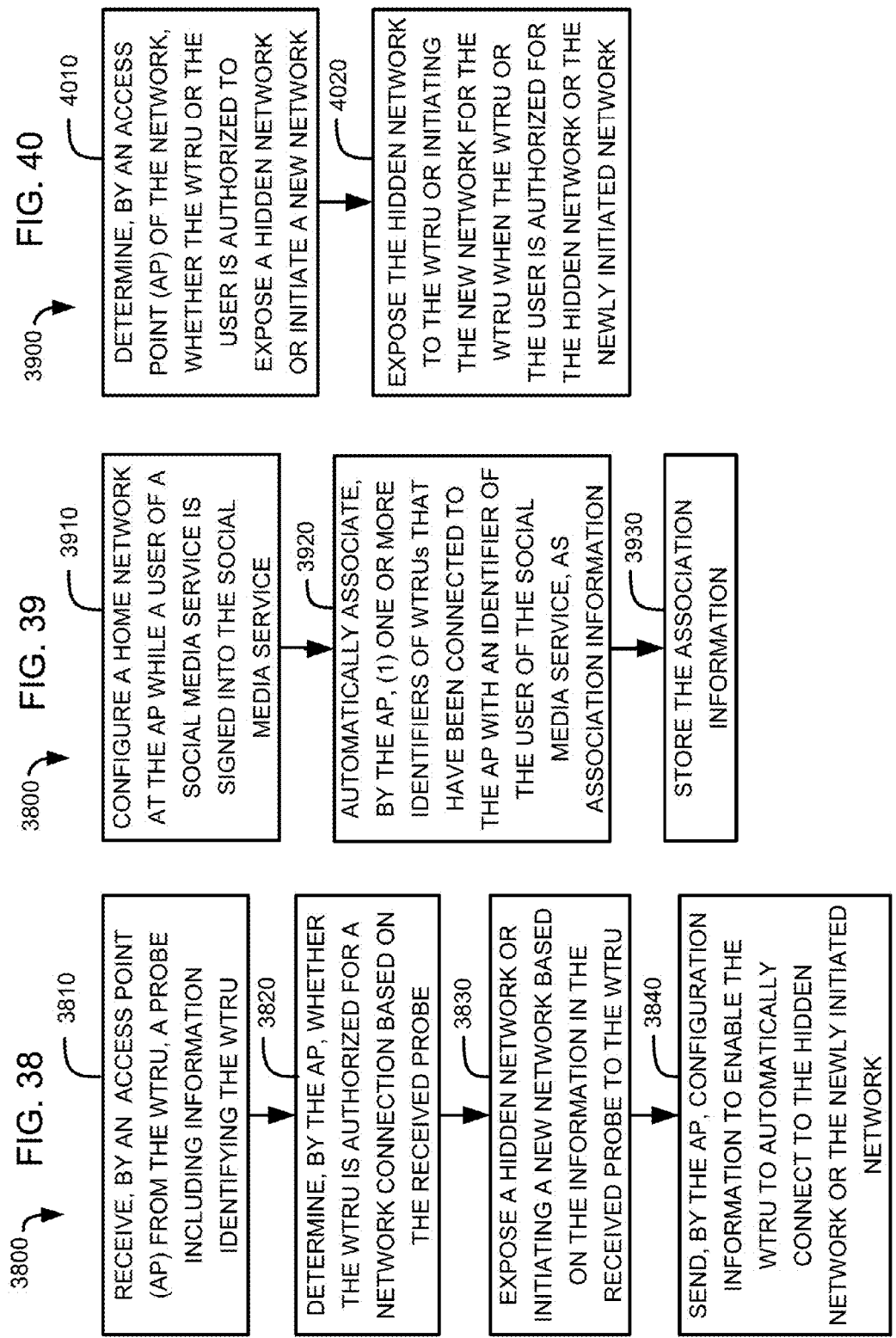

- 4210: RECEIVE, BY A NETWORK ENTITY (NE) FROM THE AP, ANY OF: (1) AN IDENTITY OF THE WTRU; (2) AN IDENTITY OF THE USER OF THE WTRU; OR THE MAC ADDRESS OF THE WTRU
- 4220: PERFORM, BY THE NE, AN AUTHENTICATION OF THE WTRU USING THE RECEIVED INFORMATION
- 4230: DERIVE, BY THE NE, A SECURITY KEY ASSOCIATED WITH THE WTRU AND THE AP
- 4240: SEND, BY THE NE TO THE AP, THE DERIVED SECURITY KEY TO FACILITATE A 4-WAY HANDSHAKE OPERATION BETWEEN THE WTRU AND THE AP

- 4110: RECEIVE, BY THE AP FROM THE WTRU, INFORMATION FOR AUTHENTICATING THE WTRU OR A USER OF THE WTRU
- 4120: DETERMINE FROM THE RECEIVED INFORMATION ANY OF: (1) AN IDENTITY OF THE WTRU; (2) AN IDENTITY OF THE USER OF THE WTRU; OR (3) THE MAC ADDRESS OF THE WTRU
- 4130: SEND THE RECEIVED INFORMATION, BY THE AP, TO THE A NETWORK ENTITY (NE) TO ENABLE AUTHENTICATION OF THE WTRU
- 4140: RECEIVE, BY THE AP, A SECURITY KEY FROM THE NE ASSOCIATED WITH THE WTRU AND THE AP
- 4150: DERIVE A TRANSIENT KEY OR USING THE RECEIVED SECURITY KEY AS A TRANSIENT KEY ASSOCIATED WITH A SESSION BETWEEN THE WTRU AND THE AP
- 4160: PERFORM A 4-WAY HANDSHAKE OPERATION TO CONFIRM THE SECURE CONNECTION BETWEEN THE WTRU AND THE AP

US 9,980,213 B2

METHODS, APPARATUS AND SYSTEMS FOR WIRELESS NETWORK SELECTION

CROSS REFERENCE

This application claims the benefit of U.S. Provisional Application No. 61/871,776, filed Aug. 29, 2013 and U.S. Provisional Application No. 62/002,413, filed May 23, 2014, the contents of which are incorporated by reference herein.

FIELD

The present invention relates to the field of wireless communications and, more particularly, to methods, apparatus and systems for wireless network selection.

RELATED ART

Network selection in a WiFi device includes the process of choosing which network the WiFi device is to associate with from a list of available networks. Currently, this is done by scanning for available networks, filtering the list by those networks that match known networks, and then choosing the network with the strongest signal.

SUMMARY OF THE INVENTION

Representative embodiments of the disclosure include methods, apparatus and systems for managing an exposure of a network to a wireless transmit/receive unit. One representative method includes receiving, by an access point (AP) of the network, information associated with the WTRU; and selectively exposing, by the AP, the network.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 35 is a flow diagram of a representative method for managing an exposure of a network to a WTRU;

FIG. 36 is a flow diagram of another representative method for managing an exposure of a network to a WTRU;

FIG. 37 is a flow diagram of a representative method for managing a connection to a network by a WTRU;

FIG. 38 is a flow diagram of another representative method for managing a network connection by a WTRU;

FIG. 39 is a flow diagram of a representative method for associating a WTRU or an AP itself with a user of a social media service;

FIG. 40 is a flow diagram of a representative method for managing a connection to a network by a WTRU and/or a user;

FIG. 41 is a flow diagram of a representative method for establishing a secure connection between a WTRU and an AP associated with a Wireless Network (WN); and FIG. 42 is a flow diagram of another representative method for facilitating an establishment of a secure connection between a WTRU and an AP associated with a WN.

DETAILED DESCRIPTION

A detailed description of illustrative embodiments may now be described with reference to the figures. However, while the present invention may be described in connection with representative embodiments, it is not limited thereto and it is to be understood that other embodiments may be used or modifications and additions may be made to the described embodiments for performing the same function of the present invention without deviating therefrom.

Although the representative embodiments are generally shown hereafter using wireless network architectures, any number of different network architectures may be used including networks with wired components and/or wireless components, for example.

Figure 1:
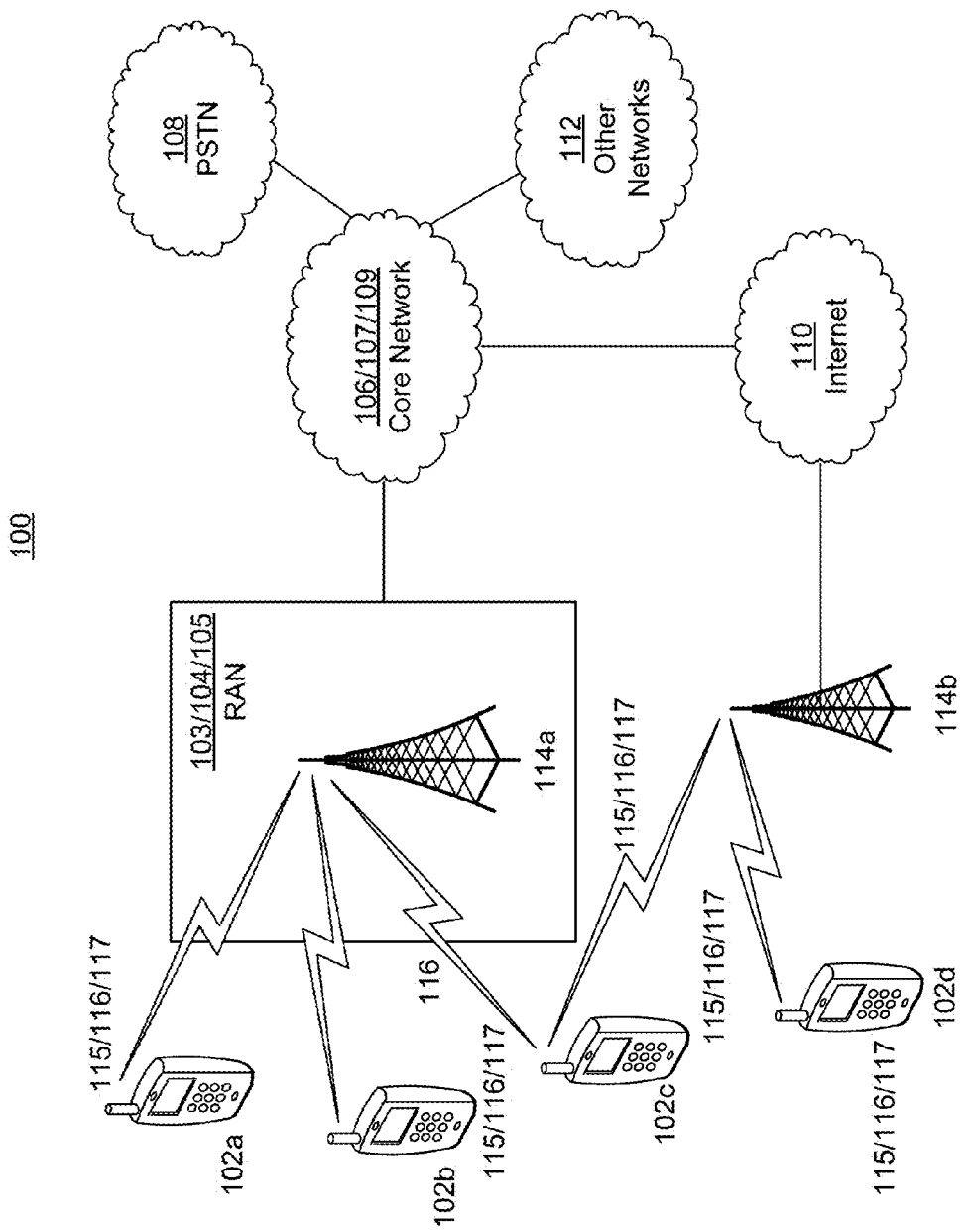
FIG. 1 is a system diagram illustrating an example communications system in which one or more disclosed embodiments may be implemented.

FIG. 1 is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive units (WTRUs) 102a, 102b, 102c, 102d, a radio access network (RAN) 104, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. The WTRU 102a, 102b, 102c and 102d is interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM, UMTS, CDMA 2000, WiMAX, or WiFi radio technology.

The core network 106/107/109 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1 may be configured to communicate with the base station 114a, which may employ a cellular-based radio technology, and with the base station 114b, which may employ an IEEE 802 radio technology.

Figure 2:
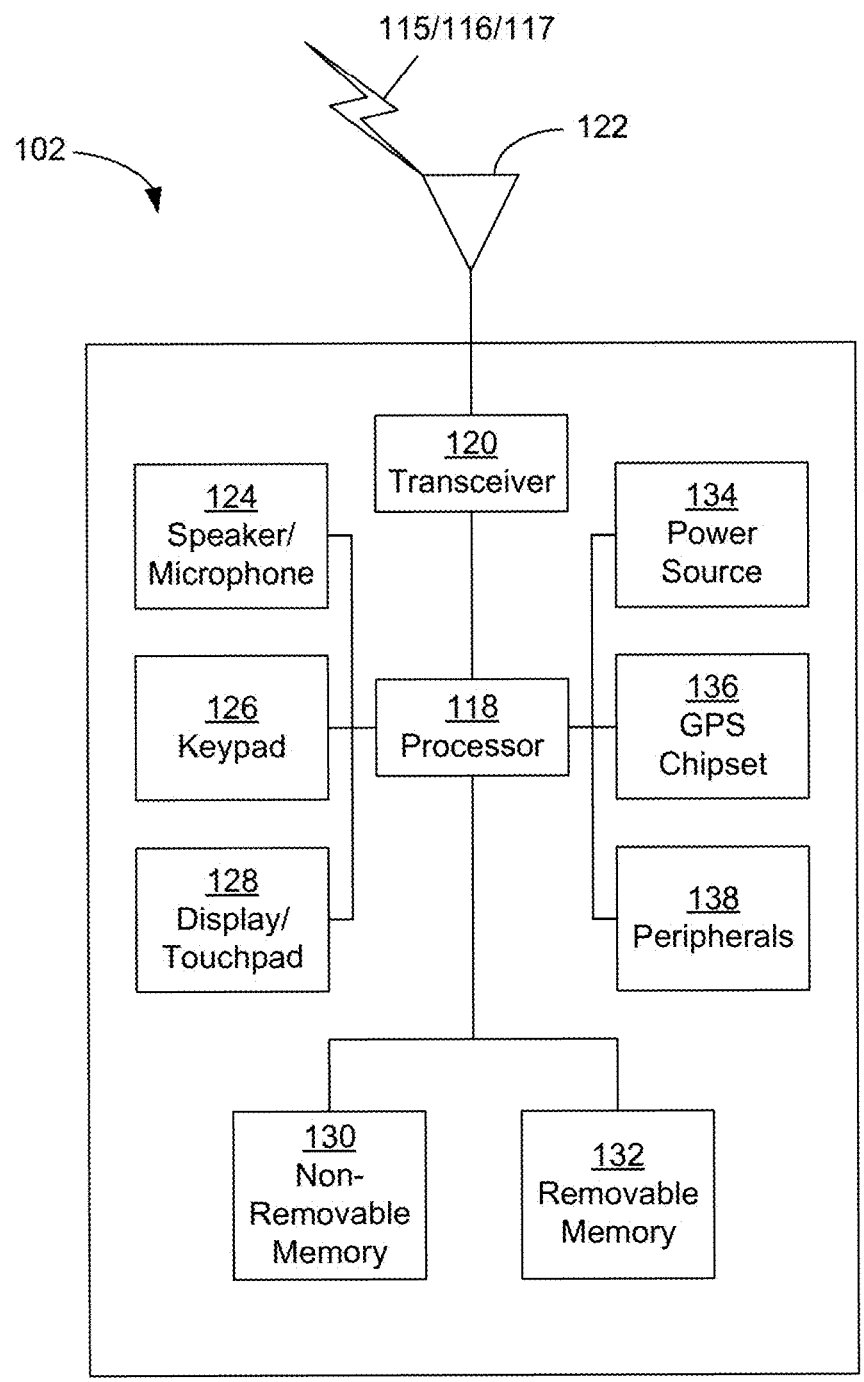
FIG. 2 is a system diagram illustrating an example wireless transmit/receive unit (WTRU) that may be used within the communications system illustrated in FIG. 1.

FIG. 2 is a system diagram illustrating an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3:
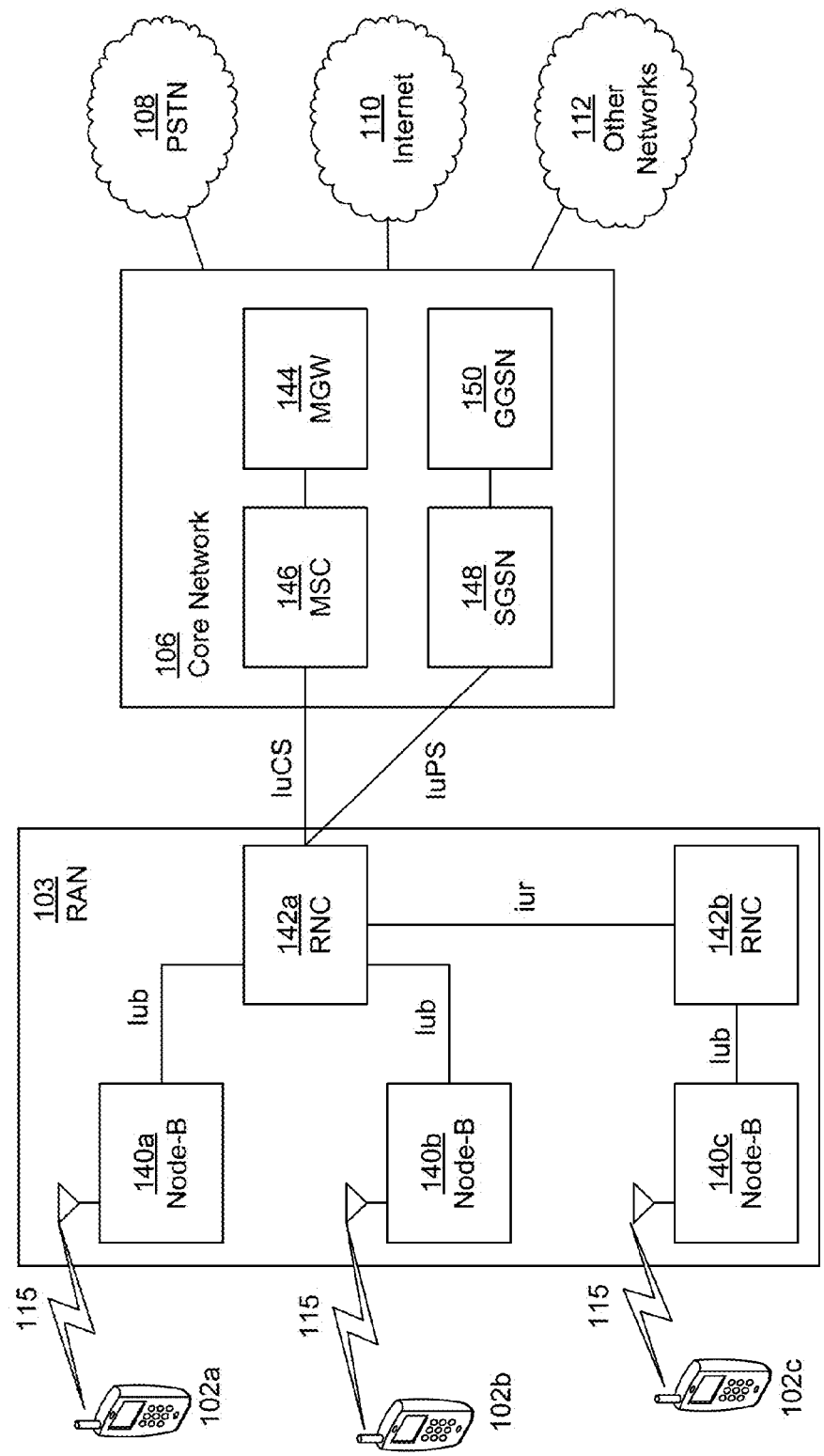
FIG. 3 is a system diagram illustrating an example radio access network and another example core network that may be used within the communications system illustrated in FIG. 1.

FIG. 3 is a system diagram illustrating the RAN 103 and the core network 106 according to another embodiment. As noted above, the RAN 103 may employ a UTRA radio technology to communicate with the WTRUs 102a, 102b, 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGM 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the other networks 112, which may include other wired and/or wireless networks that are owned and/or operated by other service providers.

Figure 4:
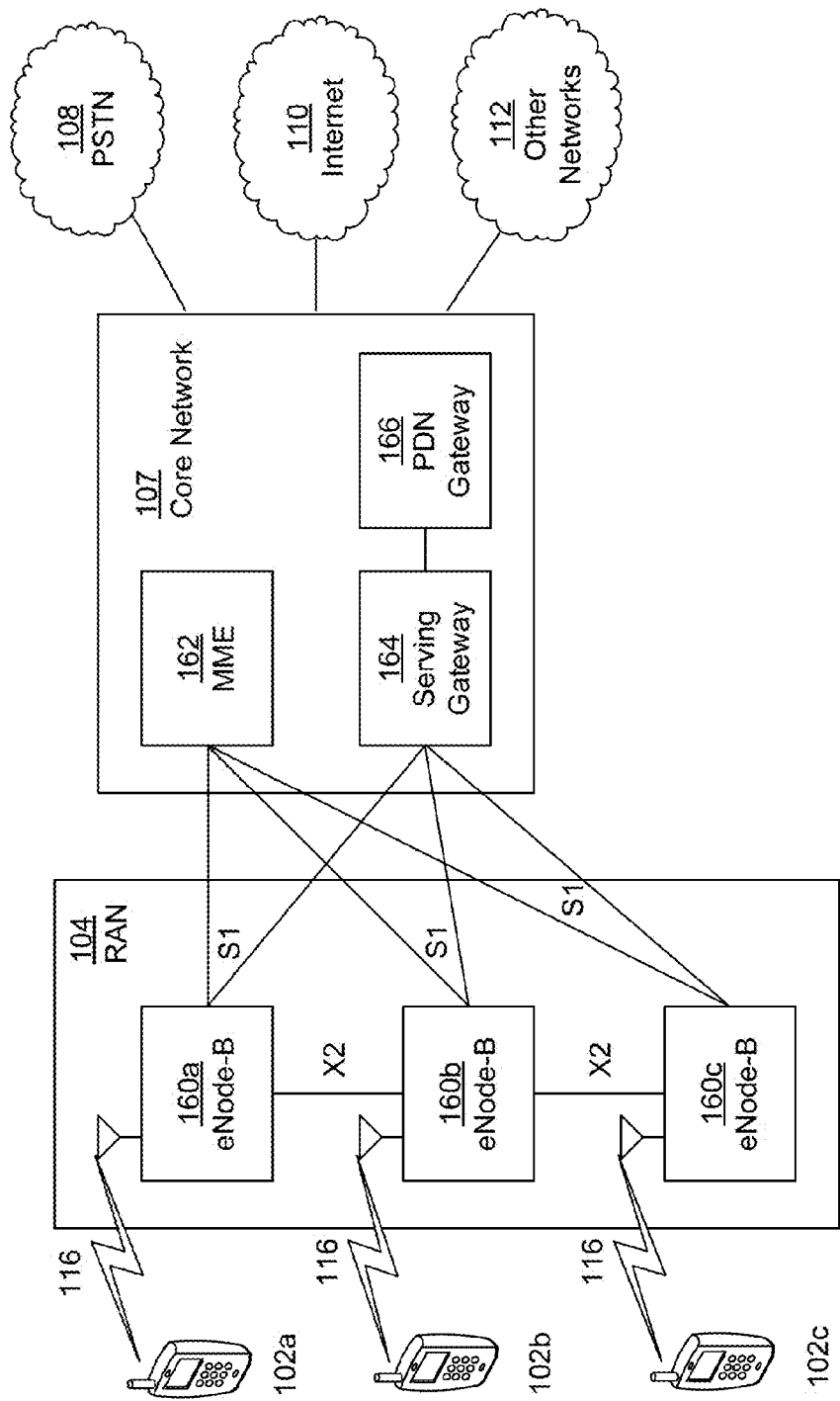
FIG. 4 is a system diagram illustrating another example radio access network and another example core network that may be used within the communications system illustrated in FIG. 1.

FIG. 4 is a system diagram illustrating the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 4, the eNode-Bs 160a, 160b, 160c may communicate with one another over an X2 interface.

The core network 107 shown in FIG. 4 may include a mobility management entity (MME) 162, a serving gateway (SGW) 164, and a packet data network (PDN) gateway (or PGW) 166. While each of the foregoing elements are depicted as part of the core network 107, it will be appreciated that any of these elements may be owned and/or operated by an entity other than the core network operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The serving gateway 164 may be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the other networks 112, which may include other wired and/or wireless networks that are owned and/or operated by other service providers.

Figure 5:
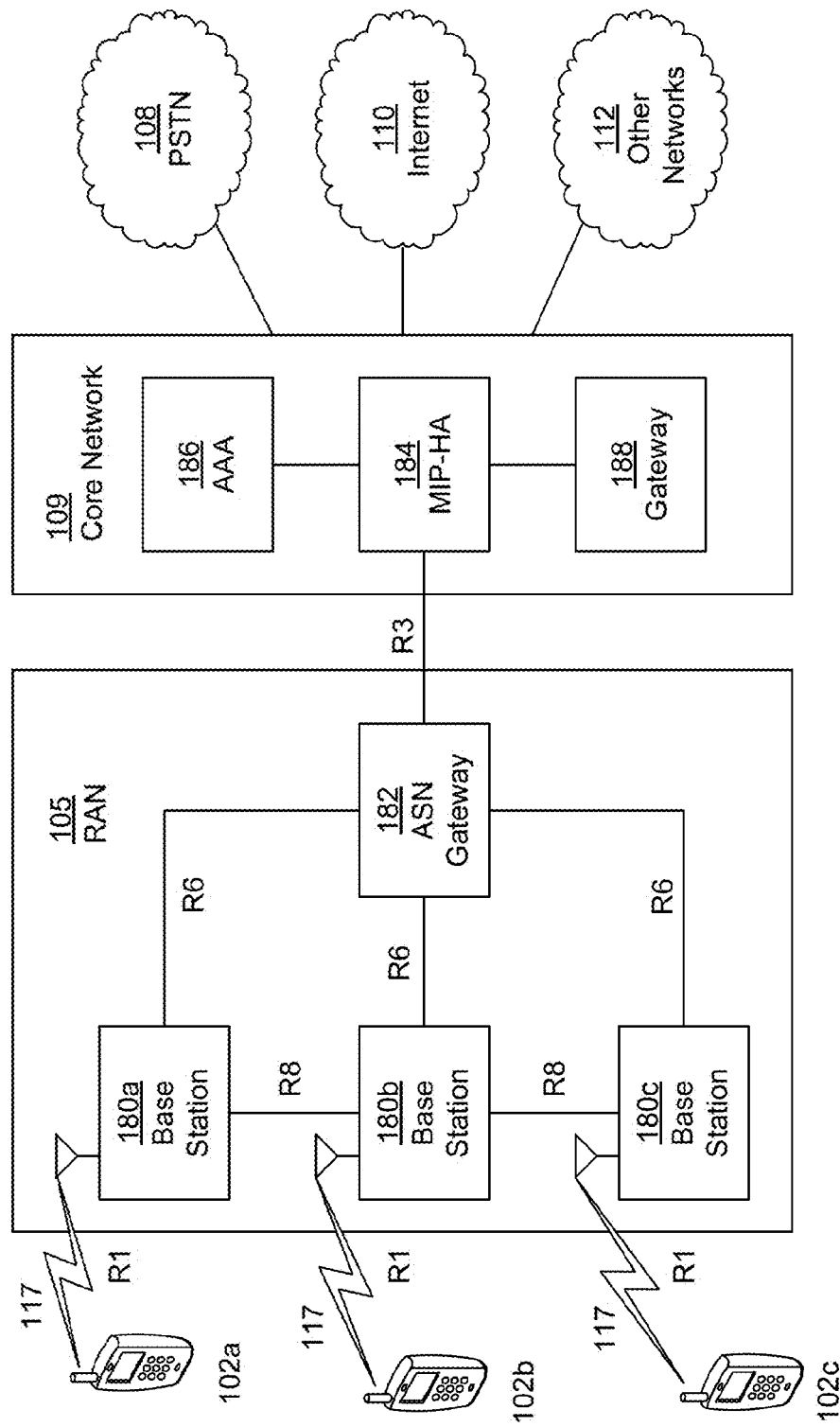
FIG. 5 is a system diagram illustrating a further example radio access network and a further example core network that may be used within the communications system illustrated in FIG. 1.

FIG. 5 is a system diagram illustrating the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. The base station 180a, for example, may use multiple antennas to transmit wireless signals to, and/or receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 100c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any of these elements may be owned and/or operated by an entity other than the core network operator.

The MIP-HA 184 may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. The gateway 188 may provide the WTRUs 102a, 102b, 102c with access to the other networks 112, which may include other wired and/or wireless networks that are owned and/or operated by other service providers.

Although not shown in FIG. 5, it will be appreciated that the RAN 105 may be connected to other ASNs, other RANS (e.g., RANs 103 and/or 104) and/or the core network 109 may be connected to other core networks (e.g., core network 106 and/or 107. The communication link between the RAN 105 and the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although the WTRU is described in FIGS. 1-5 as a wireless terminal, it is contemplated that in certain representative embodiments that such a terminal may use (e.g., temporarily or permanently) wired communication interfaces with the communication network.

Figures 6, 22:
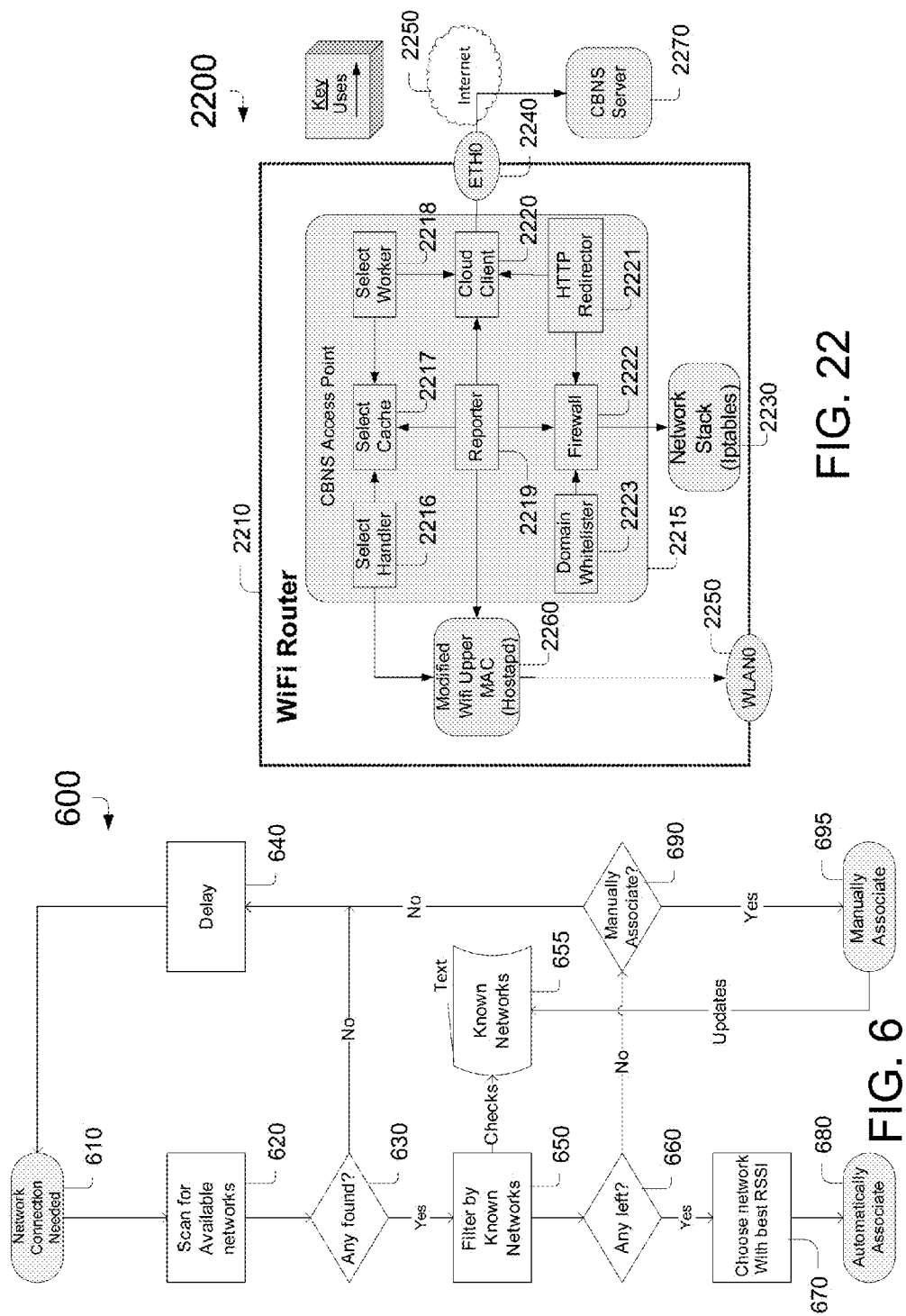
FIG. 6 is a diagram illustrating a network selection process.
FIG. 22 is a diagram illustrating a representative communication architecture including a WiFi router.

FIG. 6 is a diagram illustrating a network selection process.

Referring to FIG. 6, network selection process 600 may include, at block 610, the WTRU 102 determining that a network connection is desirable and/or needed. At block 620, the WTRU 102 may scan for available networks (e.g., networks within range of the WTRU 102). At block 630, the WTRU 102 may determine whether one or more available networks have been found (e.g., discovered). If the WTRU 102 does not find any available networks, at block 640, the WTRU may wait a period of time (e.g., a predetermined or random delay period) and may then restart processing at block 610. If the WTRU 102 finds one or more available networks, at block 650, the WTRU 102 may filter the discovered available networks (e.g., after the scanning procedure) based on networks previously known to the WTRU 102. The WTRU 102 may include a memory or storage 655 for storing a database and/or a list of known networks. For example, the filtering procedure may check the discovered networks from the scan with the known networks previously stored in memory 655. At block 660, the WTRU 102 may determine whether one or more discovered networks match one or more known networks. If the WTRU 102 determines that one or more discovered networks match one or more know networks, the WTRU may choose for connection a known network stored in the memory 655 (e.g., from the database or list). In certain representative embodiments, at block 670, the choice may be based on one or more criterion or conditions, for example, Received Signal Strength Indicator (RSSI), Signal to Noise Ratio (SNR), and/or other power transmission indicators, among others. At block 680, the WTRU 102 may automatically associate (e.g., without user input and/or intervention) with the chosen known network based on the information stored in memory 655 regarding the known network. At block 690, if the WTRU 102 determines that none of the discovered networks match any known networks stored in the memory 655, the WTRU 102 may determine based on user choice and/or user input whether to manually associate with a network which is not known (e.g., not stored in memory 655), but may have been discovered. If the WTRU 102 determines to manually associate with a network which is discovered but not a known network (e.g., not stored in the memory), at block 695, the WTRU may receive input via a user input device (touch screen, keypad and/or microphone, among others) and may associate (e.g., manually associate) with the discovered network based on the user provided information. After or during manual association, at block 695, the WTRU may update the known networks in the memory 655 (e.g., database and/or list) to include the manually associated network. If the WTRU 102 determines to not manually associate with a discovered network, processing at block 690 may move to block 640.

In certain representative embodiments, a WiFi, a WTRU or another communication device may be already configured (e.g., pre-configured) for connection to a network (e.g., WiFi network) by using, for example a Service Set Identifier (SSID) and/or a key (e.g., a secured key). Network selection may execute (e.g., run) as a part of a native service within the operating system (for example a connection manager). Once the connection manager chooses a network, the WTRU/device 102 may expect the association to that network to succeed, and, if not, the WTRU/device 102 may remove that network from the list of known networks. When unknown (e.g., only unknown) networks are discovered, a user may choose to manually select the network and may configure the access parameters via user input.

The network selection process of FIG. 6, may or may not be seamless. Seamless connectivity may be achieved when a WTRU/device 102 can automatically select and associate with a network without user interaction (e.g., without requiring any interaction with the user). An example of a seamless connection may include a WTRU/device 102 that enters a user's house and may automatically connect to the user's home WiFi network. It is common in conventional WiFi systems that when a user enters a new WiFi network, the user has to configure manually his/her WTRU/device 102 to connect with the WiFi network.

The network selection process of FIG. 6, may not enable "directed" management of connectivity (i.e., the network connection process may not provide the WTRU/device 102 with a way to access the right (e.g., appropriate and/or optimum) network from among the list of known networks (e.g., several present networks). For example, the mechanism for choosing the right network may vary, and may include the ability to access the user's mobile operator services, enterprise network, home network and/or some other specific service, among others. The automatic selection of an appropriate network may not be achievable by the selection process of FIG. 6 in many situations (e.g., as it does not make the selection of such a network seamless).

The network selection process of FIG. 6, may not enable a dynamic connection. When a WTRU/device 102 cannot connect to a network, the connection manager, for example, may force the WTRU/device 102 to be reconfigured manually or may remove the network from its set of known networks. This prevents the WTRU/device 102 from connecting to the network again without user intervention. For example, the WiFi device that can connect to the WiFi network may expect to continue in the future to be able to connect to the WiFi network, and, if the WiFi device cannot connect, the WiFi device may determine or conclude something is wrong. In addition, if the WiFi device is not able to connect to a network, the WiFi device does not expect to be able to connect to the network (e.g., unless the device has been reconfigured). Dynamic connectivity enables networks to selectively choose when WTRUs/devices 102 may or should be given a connection.

In certain representative embodiments, dynamic connectivity may allow a WTRU/device 102 to seamlessly connect to a network at one time, not connect at another time, and then connect again later as part of a normal operation.

In certain representative embodiments, the selection of which network for connection may be made in consideration of or based on information associated with: (1) the services being executed on the WTRU/device 102; (2) the mobile operator services, (3) the enterprise network; (4) the home network; and/or (5) other specific service, among others.

In certain representative embodiments, seamless connectivity may be implemented to enable connectivity without user intervention and/or input (e.g., any user intervention and/or input).

In certain representative embodiments, connection procedures may be implemented that may leverage existing relationships, such as, for example social networks, b2b communities and other on-line "application-level" services targeted to communities of individuals and/or smaller businesses.

In certain representative embodiments, an intelligent network-based connection manager may be implemented which may be provisioned with policies to allow automatic (e.g., without user intervention) establishment of connections with one or more networks (e.g., appropriate networks) in the area (e.g., via application-level communication) using, for example, social networking information. The network-based connection manager may enable programming of the known networks that users previously had to configure manually and may enable dynamic modification of the policies from the network.

Certain representative embodiments address shortcomings in the conventional systems.

In certain representative embodiments, processes may be implemented to make changes to policy logic that may be used to interact with software on some or all WTRUs or other communication devices.

In certain representative embodiments, processes may be implemented to enable third party network-based connection management services to not conflict with native connection managers.

In certain representative embodiments, processes may be implemented to enable third party software enhancements to the native connection management functionality of the WTRUs/devices 102.

In certain representative embodiments, processes may be implemented to direct (e.g., forcefully direct) a WTRU/device 102 to a particular network such that the access point or network may make the final network selection choice.

In certain representative embodiments, processes may be implemented to extend a network (e.g., private network, home, enterprise, etc.) to a remote location, for example, in a way that relies on a web/application based relationship to ensure integrity, authentication and/or security of a resulting virtual private network (VPN) and/or VPN connection.

In certain representative embodiments, authentication methods may be implemented to control which WTRUs/devices 102 are given connectivity (dynamic connectivity). For example, dynamic connectivity may or may not give a WTRU/device 102 an automatic connection any moment it is in the network proximity while the WTRU/device 102 continues to operate normally (e.g., with no access failures).

In certain representative embodiments, the network selection logic may be moved from within the WTRU/device 102 to within the network by allowing APs to identify interested WTRUs/devices 102, and use entities within the Internet cloud to inform those WTRUs/devices 102 of which network to select to and how to make the connection.

In certain representative embodiments, processes may be implemented to enable the client WTRUs/devices 102 not to run any special software (e.g., zero-impact on these WTRUs/devices 102).

In certain representative embodiments, processes may be implemented to enable WTRUs/devices 102 (e.g., iPhones), which do not expose connection management APIs, to be managed by the network.

In certain representative embodiments, connection policy logic may be more (e.g., much more) dynamic and/or complex, when implemented in the network.

In certain representative embodiments, processes may be implemented to enable better information privacy. For example, a network may choose one or more WTRUs/devices 102 rather than broadcasting detailed information about itself.

In certain representative embodiments, processes may be implemented to move complexity out of the client and into the internet cloud (e.g., where it may be better suited), for example, to lower WTRU and phone costs).

In certain representative embodiments, processes may be implemented to enable virtual presence of the WTRU's "home" networks. For example, the virtual presences may be dynamically configured in guest networks (e.g., whenever the internet-based relationships between the network owners provide for the ability to do so (e.g., whenever sufficient trust may be established via appropriate permissions (e.g., in-place permissions))).

In certain representative embodiments, a WTRU/device 102 may be given a connection, or denied a connection, at any moment based on logic in the cloud/network.

Figure 7:
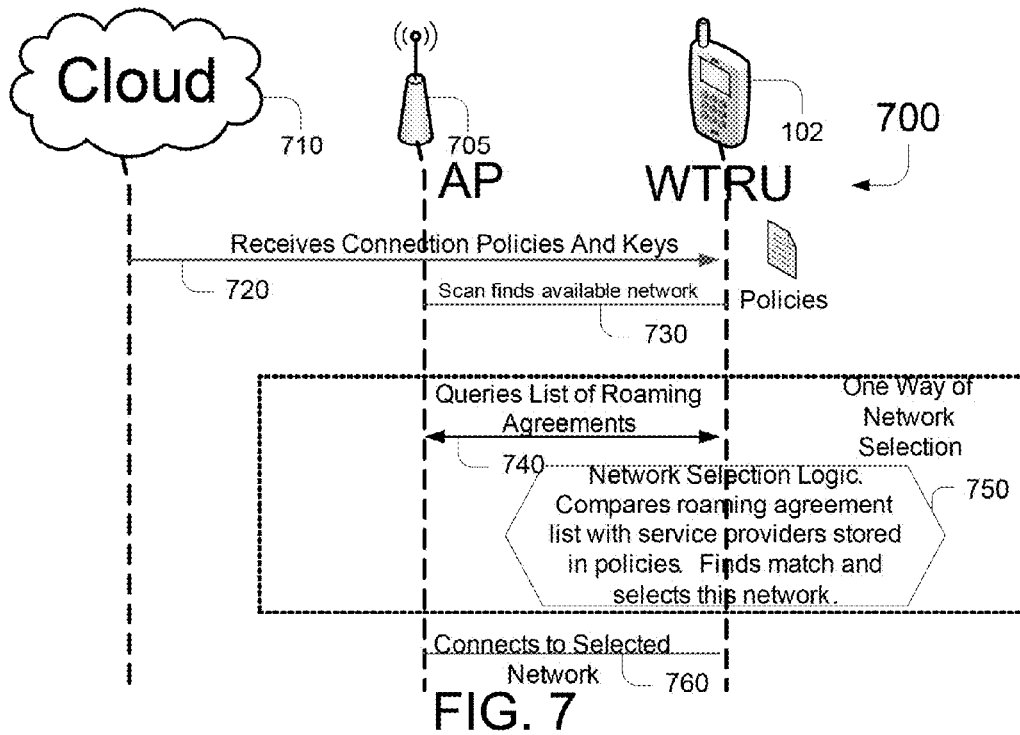
FIGS. 7 and 8 are diagrams illustrating procedures for network selection.
Figure 8:
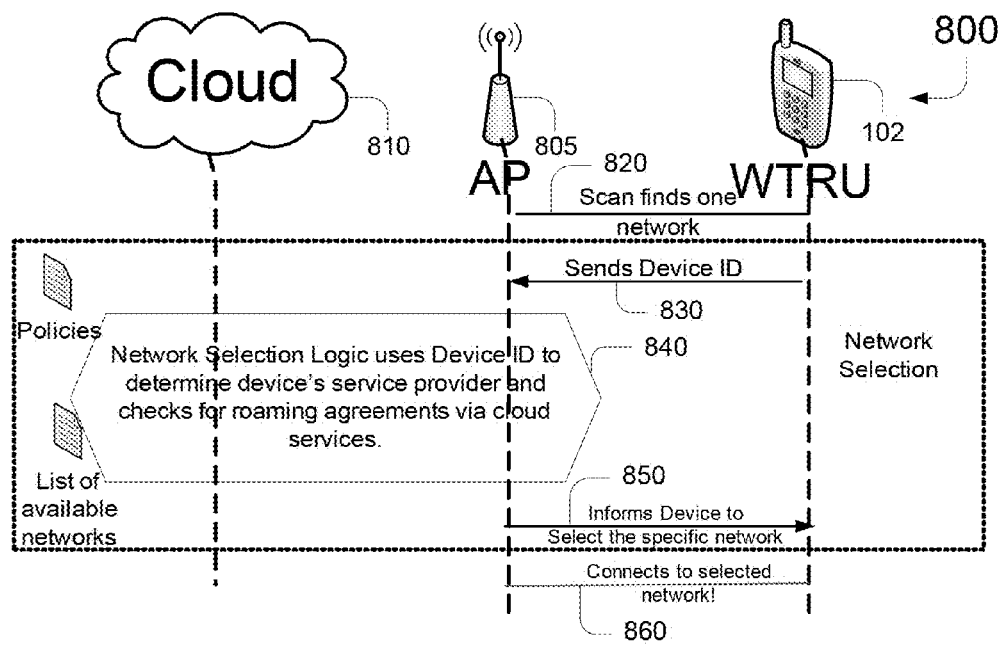

FIGS. 7 and 8 are diagrams illustrating procedures for network selection. For example, a mobile wireless device (e.g., the WTRU 102) may connect to an AP 705 or 805 via a roaming agreement.

Referring to FIG. 7, a system 700 includes a network (e.g., cloud 710), an access point (AP) 705 and a WTRU 102. At 720, the WTRU 102 may receive connection policies and/or keys via the AP 705 from the cloud 710. The WTRU 102 may use the policies from the cloud 710 to establish a connection with an available network. At 730, the WTRU 102 may scan for available networks and may find one or more such networks. At 740, the WTRU 102 may query the network for a list of roaming partners and/or roaming agreements and may receive a queries response including the list. At 750, the client (e.g., of the WTRU 102) then may check if its service provider is one of the roaming partners. At 760, if the service provider of the WTRU is one of the roaming partners, the WTRU may connect to that network (using the network's authentication procedure).

Referring to FIG. 8, a system 800 may include a network (e.g., cloud 810), one or more access points (APs) 805, and one or more WTRUs 102. At 820, the WTRU 102, for example, may scan for available networks and may find one or more such networks. At 830, the WTRU 102 may send a unique identifier (e.g., a WTRU ID) to the AP 805 to identify itself to the network. At 840, the AP 805 may look up the service provider of the WTRU 102 from the WTRU ID and may find that the AP 805 may provide a roaming agreement with that service provider.

In certain representative embodiments, the cloud 810 and/or the AP 805 may use network selection policies and/or a list of available networks for selection of a specific network to connect with the WTRU 102. At 850, the information regarding the roaming agreement and/or the service provider may be sent (e.g., passed) to the WTRU 102 along with the specific selected network (e.g., an identifier of the network to provide the connection). At 860, the WTRU 102 may connect to the selected network (e.g., as usual). It is contemplated that, in this case, the AP 805 did not expose (e.g., did not need to expose) information about what roaming agreements it supports, and the client (e.g., the WTRU 102) may not maintain (e.g., did not need to maintain) any information about its service provider. The AP 805 may have control over each WTRU 102 and may selectively inform a specific WTRU 102 or set of WTRUs 102 (e.g., only a specific WTRU 102 and/or only a specific set of WTRUs 102) of such information due to a condition (e.g., any condition) being satisfied such as time of day or other conditions, for example. The WTRUs 102 that are not given (e.g., provided) a connection behave normally (e.g., with no access failures) because the WTRUs 102 are simply not selecting the network, as opposed to failing to authenticate.

In certain embodiments, a WiFi connection procedure may occur after scanning and before network association. After the network is selected, the remainder of the process may be the same as conventional procedures or may be changed appropriately. It is contemplated that the network provided by the network selection process may be accessible by the WTRU 102; however, the WTRU 102 may not expect the network selection to always return the same results from the same AP and/or location.

In certain representative embodiments, operations may be implemented without changes to (e.g., requiring any special functionality on) the WTRUs 102.

In certain representative embodiments, these operations/procedures may be provided in addition to or in lieu of conventional processes for network selection (e.g., WiFi network selection). The procedure (e.g., all of the processes) may coexist making gradual deployment possible.

Representative Use Case for Virtual Home Networks for Visiting Devices

A representative use case may exist for consumer home WiFi routers. A home WiFi router may recognize or detect when a friend (e.g., WiFi user) enters a house (e.g., an owner's house) and may dynamically set up the friend's network in the house for the use of the user of the WiFi. The owner of the house (e.g., administrator of the WiFi system) (hereafter sometimes referred to as, Mary) may have installed a router (e.g., a new home router) and may have set up the home network to have an SSID for a network of SSID_MARY. The home router may learn the devices on the network (e.g., WiFi network) and may store the identifiers along with the home network configuration in a secure service (e.g., internet/cloud service). When Mary visits a friend John (e.g., at John's house), the router at John house may discover a visiting wireless device, may communicate with the internet/cloud to determine that the wireless device is a friend's device (via an association in a social media service, such as Facebook, Twitter, Linked-in, Instagram, Snapchat, Wanelo, Vine, Skype, Pinterest, Tumblr, Oovoo, Path, Keek, My Space, My Flickr, Google+, Gmail, Yahoo and/or Happy Flickr, among many others) and may setup an additional network, SSID_MARY (e.g., a virtualized network), allowing the wireless device to connect seamlessly (e.g., the same as if Mary walked into her own house).

Although certain representative embodiments are illustrated using Facebook, as the social media service, it is contemplated that other social media services which may include an association between users may also enable procedures, operations and methods of this disclosure.

In certain representative embodiments, Mary may be provided access to a local network (e.g., her home network) from a friend's network (e.g., John's network) by tunneling between the home router of John and the home router of Mary to create a virtual private network (VPN) for Mary. The friend's network may offer virtual private storage for Mary's content (e.g., home videos, and/or photos, among others) which may or may not be eliminated when the VPN is taken down.

It is contemplated that any association may be used to enable the network connection. For example, in a commercial setting (e.g., in a store, gas station, and/or coffee shop, among others), a registered customer association may be used instead of a friends association, for instance. In is also contemplated that in an enterprise trusted business relationships and/or professional social media services may be used to enable automated network connections.

In certain representative embodiments, the router may be or may include an auxiliary device (e.g., plugged into the WAN port) of a legacy router.

In certain representative embodiments, John may be having a party and Mary may attend with others (e.g., a few of her friends). John may configure his guest network to allow friends of friends and/or guest of guest so that Mary's friends may get a connection (e.g., effortless internet connection) in addition to or in lieu of Mary. John may configure his guest network so that Mary's friends are allowed access (e.g., only allowed access) when Mary is visiting, present, responsible and/or contactable by John (for example, was or has been in the network for and/or within a given time period). John may configure the network to allow (e.g., only allow) friends of friends (and/or guest of guest) for certain friends and/or certain guests of John and/or of Mary.

In certain representation embodiments, a friend of John (e.g., Mary) may be in a first friend tier at the highest tier level and a friend of Mary (e.g., who is a friend of a friend of John) may be in a second friend tier at a second, lower tier level, among any number of such tier levels such that certain tier levels (e.g., the first, second and third tiers levels) may be exposed to the network (e.g., with or without the presence of someone in a higher tier level).

Seamless Connectivity for Closed Devices

In certain representative embodiments, the network may include a management function (e.g., an intelligent network-based connection manager) that may function similar to one on the client. The management function may allow WiFi network operators to provide seamless connectivity for users of WTRUs 102 (e.g., any wireless device) including, for example, iPhones, iPads, Blackberry, Windows Phones, and/or laptops, among others, without running or installing additional software (any additional software) and/or relying on any new standard adoption.

When the WTRU 102 enters into proximity of a previously unknown managed AP, the WTRU 102 may connect automatically and/or seamlessly without any user intervention. In certain representative embodiments, the WTRU 102 may be temporarily prevented from connecting to known APs that the wireless device had connected to previously. The WiFi network operator or WiFi administrator may add or remove devices (e.g., at any time) based on policy logic functions implemented in the network using, for example, one or more of: the device ID, a user, a user identifier, a time, a location, and/or a roaming agreement, among others. For example, a network operator may offload specific WTRUs and/or network devices, some WTRUs/network devices and/or all applicable WTRUs/network devices, from cellular to a specific WiFi AP without using dedicated software running in the offloaded WTRUs/network devices.

As representative embodiments may take advantage of the native functionality of the devices, the devices themselves may not be aware that any connection management is occurring.

In certain representative embodiments, WTRUs 102-1 and 102-2 may know networks X and Y respectively in the proximity of an AP. If the provider wants to offload WTRU 102-1 and not offload WTRU 102-2, a new network X, which may be known to WTRU 102-1 and may not be known to WTRU 102-2 may be created by the AP. This may have the same effect as sending a policy to WTRU 102-1 to connect to network X using a smart connection manager (e.g., except the client may not require a smart connection manager and/or other non-native functionality (e.g., any other non-native functionality). Network X may be removed to on-load WTRU 102-1 back onto the cellular network. Another network Y that is known to WTRU 102-2 and not known to WTRU 102-1 may be created to connect WTRU 102-2.

In certain representative embodiments, where changes to the WTRU may be provisioned (e.g., made) for automated network selection and connection, when the AP desires or wants to provide a connection, the WTRU may be instructed by the AP to connect using credentials for network X or Y.

Representative Procedures for Tying Network Selection to Credit Card Purchases

In certain representative embodiments, a user may be provided with WiFi access when using a card (e.g., credit and/or debit card) to buy something (e.g., a ticket at a museum, a ballpark or a theme park, pay for a hotel, and/or pay for gasoline, among others). The access to the network may be during the stay at the location of the network coverage or for a particular timeframe. The AP may identify the WTRU 102. The AP may determine using cloud resources that the WTRU 102 is owned (or used) by the user who is making or has made the purchase (e.g., that day) and/or that the WTRU 102 is associated with the credit card (e.g., associated with the credit card when the user installed the mobile application (e.g., the bank's mobile application on the purchasers device previously). If the user comes back the next day without buying a ticket, the user may or may not be able to select the network at that time based on established policies, but the device may operate normally (e.g., no failure to connect or access errors would occur).

Representative Procedures for Business Guest Network Selection

In certain representative embodiments, a visiting client may automatically connect to a business associate's guest network based on their association using the visiting client's own access credentials or his company's access credentials. For example, after the client's device is identified, the network/cloud may determine to which company the client belongs, and if the company is a trusted company. If the company is trusted, the AP may provide access to the guest network and authenticate the user through his own company's authentication server.

Representative Notification, User Tracking and Advertising

Users may not be aware that a hotspot is available to them. Some devices may be configured to connect (e.g., automatically connect) to open networks, which may lead to frustration as these networks may be and often are captive portals that the user may not be authorized to pass. With network based selection, a user may configure a profile selecting that the user be notified and/or would like to be notified (e.g., through a push mechanism, such as SMS) when a network is available that may require them to perform a given action. For instance, advertisers may agree to give access to users who are willing to identify themselves (e.g., through a social media account) and/or have their behavior tracked by the network. When a user, who has agreed to this policy, enters (e.g., walks into) a mall (and/or satisfies a triggering condition), the user's WTRU 102 may be detected and their policy may be checked. The user may be sent a notice to agree to being identified, tracked, and/or pushed targeted ads in exchange for internet access and other possible promotions. The response from the user may be completed and/or done through another network, for example, a cellular network and/or another WiFi network, for example, by following an HTTP URL. Engagement with the user may be completed on the other network before switching or handover of the device to the guest network.

In certain representative embodiments, the WTRU 102 may be allowed to associate with the guest network and/or may complete the appropriate procedures or steps, for example, through and/or using a captive portal.

In certain representative embodiments, the users may be engaged via a captive portal, if or when high bandwidth is used by the WTRU 102 (such as when a WTRU 102 streams content using a bandwidth above a threshold, for example, video content).

Notifications may be sent to network owners when certain events occur, such as if or when a new user accesses the network.

A notification mechanism may be provided to allow guests to request for access to the network. The guest may initiate the request from a captive portal of the desired network, and/or through another network (e.g., WIFI, cellular, and/or WLAN network, among others). The request may be forwarded to the network owner (and/or a device of the network owner). The network owner and/or device may approve (either manually or via automated approval) the visitor and/or guest as a temporary or permanent visitor and/or guest.

Other Representative Procedures for Cloud-Based Network Selection

It is contemplated that any number of possibilities exist for using the vast resources available on the Internet to create highly dynamic connection logic that would not be possible in client or WTRU 102 based connection management. For example: (1) during times of network congestion seamless connectivity may be based on customer ratings (e.g., an airport may provide seamless connectivity for frequent flyers only or a hotel may provide seamless connectivity for premier guests only); (2) members attending an event may have seamless connectivity during the event based on their association to a group on social media; and/or (3) customers in a coffee shop may be given a limited timeframe (e.g., one hour) of seamless connectivity after they have installed the shop's mobile application.

Representative Procedures for Controlling Network Visibility to Maintain QoS

A user may be given (e.g., only given) a connection to the network if the network is usable with a given QoS. WTRUs 102 and/or other devices may be prioritized so that one or more of the highest ranking WTRUs/devices 102 may select to the network and/or a maximum capacity of the network (e.g., device, load and/or throughput capacity, among others) may not be exceeded. A subset (e.g., a smaller subset) of users may be provided (selected and/or allowed) for a working network, rather than a larger group of users for a congested and/or dysfunctional network. The priority may rotate (e.g., may even rotate) through a group of users so that the users (e.g., each user) may get access for a time period (e.g., a few minutes of access). The access time to access the network may be based on (e.g., may be limited based on) a ranking, may be based on (e.g., may be limited based on) loading of the network and/or may be predetermined.

Users may view when and/or for how long access is to be provided and may get notifications when the device is connected to the network. For example, during times of network congestion, an airport or other entity may provide seamless connectivity for frequent flyers and/or VIP members (e.g., only those flyers and/or members).

The network may give priority to WTRUs 102 and other devices with a strong signal strength (e.g., above a threshold level) to improve QoS and to minimize retransmissions. If a network only has capacity and/or room for one more WTRUs 102 and/or other devices, and two or more WTRUs/devices 102 are interested in connecting to the network, the network may choose the WTRU/device 102 with the strongest signal strength (e.g., only the device with the strongest signal strength), signal to interference ratio and/or signal-to-noise ratio to give the best service. WTRU/device priorities may be based on what applications the WTRU/device 102 is using or plans to use. WTRUs/devices 102 running applications preferred and/or given a higher priority by the network may be given priority (e.g., connection/network exposure priority) over WTRUs/devices 102 using other applications (e.g., non-preferred applications). The WTRU/device priorities may be based on how much bandwidth a WTRU/device is using and/or plans to use or how much bandwidth the WTRU/device is using and/or plans to use as compared to or relative to available bandwidth. The network may allow a specified or dynamically set number of high bandwidth users (e.g., users that use at least a threshold bandwidth). The specified number may be a minimum or 20 high bandwidth users, for example. If surplus capacity exists, the network may allow further users (e.g., up to 200 users maximum). User profiles may be used to predict if enough bandwidth is available on the network to support the current users (e.g., based on their typical needs and/or requirements).

A vehicle-based hotspot may use such techniques and/or procedures to limit its visibility to devices (e.g., only the devices) within the vehicle. The number of hotspot users may be specified and/or limited to the maximum capacity of the vehicle. The vehicle-based hotspot may use a minimum RSSI and/or one or more other conditions from devices to help ensure that WTRUs/devices 102 (e.g., only WTRUs/ devices) within the vehicle may use the network. The vehicle-based hotspot may establish a condition that a device be present for a certain amount of time prior to providing visibility to the network to avoid passing WTRUs/ devices 102 from the outside.

Representative Network Selection Procedures Based on an Active Application

Access to the network may be provided and/or given to a first device if and/or when the first device (and/or a corresponding device of the user, such as a second device that is linked to the first device and/or owned by the same entity as the first device) is executing and/or running a certain app and/or webpage. Another network connection may be used to signal the network to provide a specific network for the first device on demand, at a specified time, and/or at a specified time relative to the current time. When the app is no longer executing and/or running, the network may be destroyed (and/or taken down). For example, the device may be disassociated from the network and then the network may not respond to subsequent probe requests to hide the network from the first or second devices. Filtering may be setup in the access point (AP) to prioritize or even restrict access to the application servers. For example, customers in a coffee shop may be given network access when the customers use the shop's mobile app to order food and drinks (e.g., coffee). In certain representative embodiments, the customers may gain access if they run the shop's mobile app and may not gain access using any other apps.

Representative Network Load Balancing

CBNS may be used to place mobile devices, supporting multiple wireless technologies (e.g., cellular and WiFi radio access technologies, among others), on a WiFi network at a given time to off-load the mobile devices from one such technology (e.g., a cellular network). It is contemplated that the devices may prefer or prioritize a first access technology over a second access technology. For example, connections to a network, transmission of packets, flows and/or a data communication may be prioritized to use a WiFi network over a cellular network. The WiFi network may be removed (e.g., hidden) to cause and/or to force the device back onto the cellular network. Another procedure may be used to balance devices on different WiFi channel frequencies and/ or technologies. For instance, if the AP had multiple radios with differing operating frequencies (e.g., a 5 Ghz radio and a 2.4 GHz radio), a device may be forced onto a particular one of the frequencies by exposing to the device the network that operates on the desired (e.g., preferred) radio frequency and/or hiding the network with the non-desired (e.g., non-preferred) frequency.

Representative Network Based Solution

In certain representative embodiments, the network-based solution may rely on (e.g., may entirely rely on) the network side to provide control of the connectivity and it is contemplated that no modifications may be made to the devices.

Representative Procedure

The cloud-based network selection process may include some or all of the following procedures/processes/steps:

1. Initial setup—A one-time configuration of the device.
2. Discovery—The AP may discover devices desiring a connection and may collect additional device information (any additional device information) used.
3. Decision—A decision may be made, either in the AP or in the cloud, whether or not to select a device for a network.
4. Network Setup—The AP may set up the backend network support for the device (e.g., virtual networks and/or virtual storage).
5. Invitation—The AP may signal the device with the selected network and the additional information used to connect to the selected network.
6. Connectivity—The device may establish a secure connection in a conventional manner. The connection process may be unaffected, but is shown in the process flow for clarity. If the logic changes such that a connected device is no longer to be connected, the AP may disconnect the device.

Various procedures for implementing this process are set forth herein.

Representative Procedures Using Discovery Network and Network Creation

Certain representative embodiments may take advantage of a typical wireless device connection management behavior of scanning for known networks and connecting to them, and may not use custom software (e.g., any custom software) on the device itself. Such implementation may be done using current mobile devices and existing standards. For example:

1. Initial Setup: The device may be pre-configured once with a plurality of known networks (e.g., two known networks) (which may be done in various ways, including manually, through a device management profile, and/or programmatically by an app)
    a. A discovery network (e.g., DISCOVERY_NET) may have one of several actual SSID, as discussed herein). The discovery network may be open or secured. DISCOVERY_NET configurations are described below.
    b. A HOME_NET, which is the device's "home" network. The device may have several home networks associated with several contexts (e.g., "home", "work", and/or "mobile operator access," among others). Depending on the context/virtual presence of the user (e.g., is the phone in Home configuration, Work configuration, or Mobile configuration, among others) a single HOME_NET may be known.
2. Discovery
    a. The managed AP may bring up the discovery network SSID and may monitor for associated devices. The selection of the SSID for DISCOVERY_NET is discussed below.
    b. The discovery DISCOVERY_NET SSID may be a globally known/agreed on (and may be potentially standardized) SSID such as, for example, SSID_DISCOVERY. In certain representative embodiments, a name associated with the facilitator of the service (e.g., Facebook) may be used, for example as in "FACEBOOK_DISCOVERY_NET." In certain representative embodiments, the ISP (e.g., COMCAST) may be providing the service using for example, a "COMCAST_DISCOVERY" SSID. The SSID may be enterprise specific (e.g., "InterDigital_Approved_Host_Discovery"). In some or all cases, the device may be pre-configured to search and connect temporarily with the SSID, for example using appropriate credentials (e.g., WPA/2-PSK) in the cases of using a secure and not open SSID). Such a configuration may be accomplished (or done) explicitly by the user, or by downloading some appropriate Software (SW) (e.g., a "friend network sharing" application), (for example from Facebook or InterDigital's corporate enterprise configuration).

c. When a device enters into the proximity of a network, the device may attempt (e.g., naturally attempt) to connect to the SSID_DISCOVERY. The AP may record the device's MAC address, and soon after, the SSID_DISCOVERY network may be brought down. The device may be forced to disconnect. The discovery network should or must be kept up long enough to ensure that devices (e.g., all devices) seeking a connection have time to associate with the network, otherwise, some devices might never be detected. The SSID_DISCOVERY network may not provide internet access to the device. The SSID_DISCOVERY network may operate to detect/discover devices looking for connections (e.g., is just there to 'fish' for devices looking for connections). By going down, the AP may force devices to disconnect (e.g., naturally disconnect) from the discovery network.

d. After some time, the discovery network may be brought up again and the discovery process may be repeated.

e. In certain representative embodiments the discovery network may send a web page to unrecognized devices (e.g., any unrecognized devices) attempting an HTTP Get (e.g., the first operation when browsing most web pages) indicating details about the network and instructions on how a user can configure their device to connect automatically.

3. Decision:
   a. The AP, with or without assistance (e.g., help) from one or more cloud-based servers, may decide whether the device is to be offered a connection (e.g., at this time), based on, for example, its device identification (e.g., its MAC address) and current conditions.

4. Network Setup:
   a. The AP may communicate, for example securely (e.g., using SSL/TLS) with one or more cloud-based servers and may receive (e.g. get) information used to setup the HOME_NET in the visited network. The received information may include information to establish a VLAN for HOME_NET and to setup a secure tunnel between the visited network and the HOME_NET "home location". In certain representative embodiments, the AP may allocate virtual storage. The secure tunnel and the virtual storage may be securely eliminated once the user has departed the visited network.

5. Invitation:
   a. In certain representative embodiments, the AP may bring up the device-specific network (ex: HOME_NET).
   b. For example, if the AP does not want to offer a connection, the device HOME_NET network may not be brought up. The device may continue to connect to the SSID_DISCOVERY network for short periods of time.
   c. The device may detect the known network, HOME_NET.

6. Connection:
   a. The device may connect to HOME_NET using a preconfigured access procedure (e.g., using WPA/2-PSK and/or 802.1x/EAP, among others)
   b. The device may be removed from the network later if appropriate, by taking the HOME_NET network down.

Multiple APs may be coordinated to provide the desired connection to a device.

In certain representative embodiments, in addition to or in lieu of using MAC addresses for devices IDs, an identification obtained from authentication with the discovery network may be used. For example, instead of using a MAC address, the username from EAP-TTLS may be used. The device may be provisioned with an appropriate user name and password in the initial setup.

Figure 9:
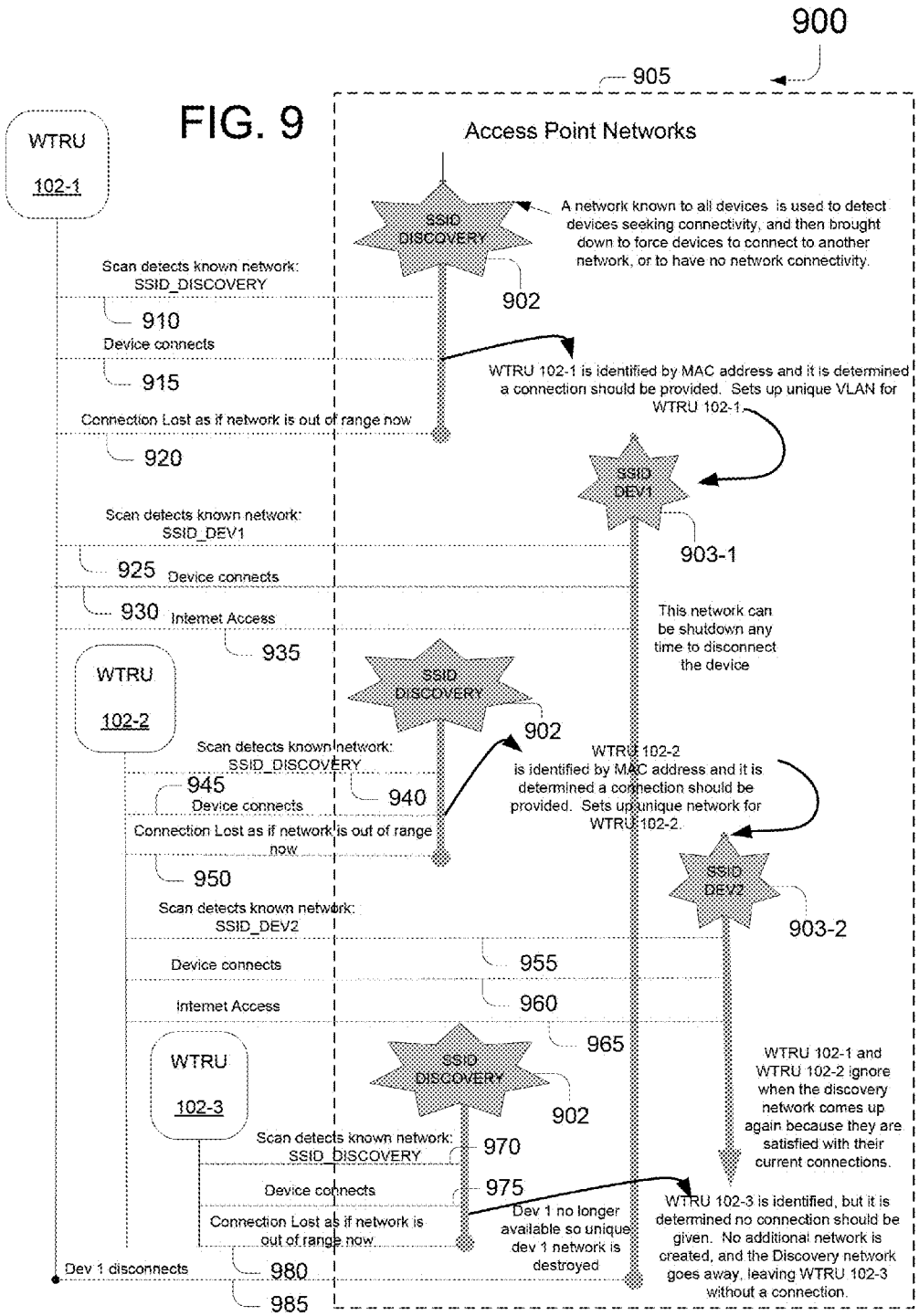
FIG. 9 is a sequence diagram illustrating two devices seamlessly connecting to an access point (AP) using a discovery network and network creation and a third device, which does not get a connection.

FIG. 9 is a sequence diagram 900 illustrating two devices 102 (e.g., pre-configured mobile wireless devices WTRU 102-1 and WTRU 102-2) seamlessly connecting to an access point 905 using a discovery network and network creation and a third mobile wireless device WTRU 102-3, which does not get a connection (e.g., at this time) and continues operating normally without any access errors or authentication failures.

Referring to FIG. 9, sequence diagram 900, at 910, may include the WTRU 102-1 scanning for and detecting a known discovery network 902 (e.g., named SSID_DISCOVERY). SSID_DISCOVERY may be a network known to the WTRUs 102 (e.g., all WTRUs 102) and may be used to detect WTRUs seeking connectivity. The SSID_DISCOVERY network 902 may be brought down to force the WTRUs 102 to connect to another network, or to have no network connectivity.

At 915, WTRU 102-1 may connect to the SSID_DISCOVERY network 902 and may provide the MAC address of the WTRU 102-1 to the network (e.g., via the AP 905). The WTRU 102-1 may be identified by its MAC address and SSID_DISCOVERY network 902 and may determine whether a connection to another network SSID_DEV1 903-1 (via setup of a unique VLAN for the WTRU 102-1) should be or is to be provided. At 920, the SID_DISCOVERY network 902 may be brought down and the connection between the WTRU 102-1 and the SSID_DISCOVERY may be lost (e.g., as if the SSID_DISCOVERY network 902 is out of range). At 925, if a connection to the other network (e.g., the SSID_DEV1 network) is to be provided, the network (e.g., via the AP 905) may setup a VLAN (e.g., a unique VLAN) for the WTRU 102-1). After disconnection from the SSID_DISCOVERY network 902 and setup of the other network 903-1 (e.g., a known network named SSID_DEV1), at 925 the WTRU 102-1 may scan for and detect the SSID_DEV1 network 903-1 (which may be preconfigured to be a known network). At 930, the WTRU 102-1 may connect with the SSID_DEV1 network 903-1. At 935, the WTRU 102-1 may access the Internet via the SSID_DEV1 network 903-1. The SSID_DEV1 network 903-1 may be shutdown at any time to disconnect the WTRU 102-1.

In certain representative embodiments, the development networks $SSID\_DEV_1$ ... $SSID\_DEV_N$ 903-1, 903-2 ... 903-N may selectively provide their networks to and/or disconnect their networks from a particular WTRU 102-1 based on the MAC address provided by the WTRU 102-1 during connection with the discovery network 902 (e.g., the SSID_DISCOVERY network). In other representative embodiments, connections may be provided based on the MAC address and one or more other factors including loading of a network (e.g., the development network and/or loading of the AP 905, among others).

At 940, the WTRU 102-2 may scan for and may detect the SSID_DISCOVERY network 902. At 945, the WTRU 102-2 may connect to the SSID_DISCOVERY network 902 and may provide the MAC address of the WTRU 102-2. The WTRU 102-2 may be identified by its MAC address and the SSID_DISCOVERY network 902 may determine whether a connection to another network, the SSID_DEV2 network 903-2 (e.g., via setup of a unique network for WTRU 102-2) should be or is to be provided. At 950, the SSID_DISCOVERY network 902 may be brought down and the connection between the WTRU 102-2 and the SSID_DISCOVERY network 902 may be lost (e.g., as if the SSID_DISCOVERY network 902 is out of range). If a connection to the SSID_DEV2 network 903-2 is to be provided, the network (e.g., the AP 905) may setup a VLAN (e.g., a unique VLAN) for the WTRU 102-2. After disconnection from the SSID_DISCOVERY network 902 and setup of the SSID_DEV2 network 903-2, at 955, the WTRU 102-2 may scan for and may detect the SSID_DEV2 network 903-2 (e.g., which may be preconfigured to be a known network). At 960, the WTRU 102-2 may connect with the SSID_DEV2. At 965, the WTRU 102-2 may access the Internet via the SSID_DEV2 network 903-2. The SSID_DEV2 network 903-2 may be shutdown at any time to disconnect the WTRU 102-2. The WTRUs 102-1 and 102-2 may ignore the SSID_DISCOVERY network 902, when the SSID_DISCOVERY network 902 comes up again because the WTRUs 102-1 and 102-2 may be satisfied with their current connections.

At 970, the WTRU 102-3 may scan for and may detect the SSID_DISCOVERY network 902. At 975, the WTRU 102-3 may connect to the SSID_DISCOVERY network 902 and may provide the MAC address of the WTRU 102-3. The WTRU 102-3 may be identified by its MAC address and the SSID_DISCOVERY network 902 may determine whether a connection to a further network (e.g., the SSID_DEV3 network 903-3, not shown) via setup of a unique network for WTRU 102-3) should be or is to be provided. At 980, the SSID_DISCOVERY network 902 may be brought down and the connection between the WTRU 102-3 and the SSID_DISCOVERY network 902 may be lost (e.g., as if the SSID_DISCOVERY network 902 is out of range). If a connection to the further network 903-3 is not to be provided, the network 903-3 (e.g., the AP 905) may do nothing to connect the WTRU 102-3.

At 985, if the SSID_DEV1 network 903-1 becomes unavailable or is no longer available, the SSID_DEV1 network 903-1 may be brought down or destroyed causing WTRU 102-1 to disconnect and/or to become disconnected from the SSID_DEV1 network 903-1.

Figure 10A:
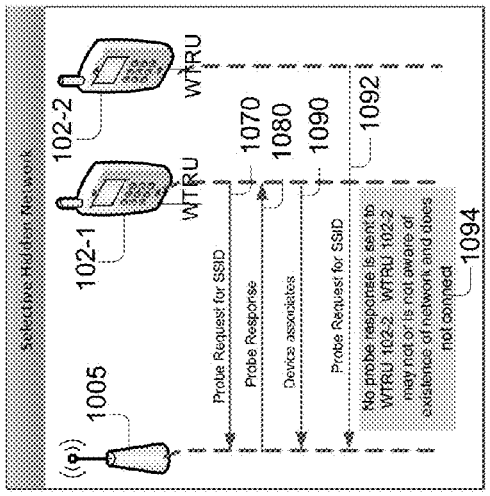
FIGS. 10A and 10B are diagrams illustrating a representative association procedure using hidden networks.
Figure 10B:
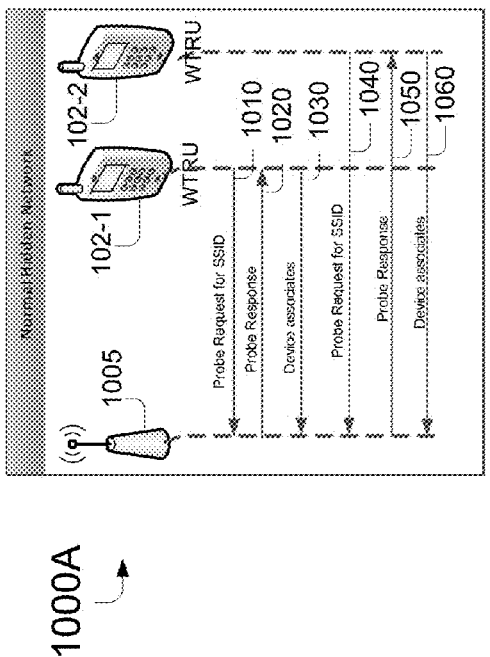

FIGS. 10A and 10B are diagrams illustrating representative procedures 1000A and 1000B, respectively, using hidden networks.

Referring to FIG. 10A, at 1010, a first WTRU 102-1 of a plurality of WTRUs (e.g., WTRU 102-1 and 102-2) may send probe request frames for a hidden network named SSID to an AP 1005. At 1020, the AP 1005 may respond with a probe response management frame to the first WTRU 102-1 indicating that the network SSID exists on the particular AP 1005. At 1030, the WTRU 102-1 may associate with the network SSID. At 1040, a second WTRU 102-2 of a plurality of WTRUs (e.g., WTRU 102-1 and 102-2) may send probe request frames for the hidden network named SSID to the AP 1005. At 1050, the AP 1005 may respond with a probe response management frame to the second WTRU 102-2 indicating that the network SSID exists on the particular AP 1005. At 1060, the WTRU 102-2 may associate with the network SSID.

Referring to FIG. 10B, with a selectively hidden network, at 1070, the first WTRU 102-1 of the plurality of WTRUs (e.g., WTRU 102-1 and 102-2) may send probe request frames for the hidden network named SSID to the AP 1005. At 1080, the AP 1005 may respond with a probe response management frame to the first WTRU 102-1 indicating that the network SSID exists on the particular AP 1005. At 1090, the WTRU 102-1 may associate with the network SSID. At 1092, the second WTRU 102-2 of the plurality of WTRUs (e.g., the WTRUs 102-1 and 102-2) may send probe request frames for the hidden network named SSID to the AP 1005. At 1094, the AP 1005 may not respond with any probe response management frame and the WTRU 102-2 may not be aware of the existence of the hidden network SSID and may not connect to the hidden network SSID. For example, WTRU 102-1 may connect as normal and the network (e.g., the AP 1005) may avoid the WTRU 102-2. The network SSID may selectively respond to probe requests. For example, the network SSID (e.g., the AP 1005 associated with the network SSID) may respond to the probe requests from the WTRU 102-1 and may not respond to the probe request from the WTRU 102-2. Using this representative procedure, the AP 1005 may detect which of the WTRUs 102-1 and 102-2 are present (e.g., requesting access to the network SSID) and may decide to only expose the network SSID to certain WTRUs (e.g., the WTRU 102-1) by selectively sending probe responses. The WTRUs, such as WTRU 102-2, which do not see (e.g., know about) the network SSID may operate as if the network is out-of-range.

As used herein, WTRUs are sometimes referred to as devices and may be used interchangeably.

Representative Procedure Using Selective Probe Responses

Referring to FIGS. 9, 10A and 10B, in certain representative embodiments, the procedure may implement the discovery and invitation processes/steps by selectively responding to devices searching for a hidden network (e.g., that have SSID not broadcasted in a beacon). The discovery process/step may be used separately, for example, to remove the use of the discovery network in the previous procedure. Using the entire procedure may remove the use for the AP 905, and 1005 to create multiple networks. The representative procedure using selective probe responses may include some or all or the following:

1. Initial Setup:
   The devices and/or WTRUs 102 (e.g., all devices or WTRUs) may be preconfigured with a common, known and/or hidden SSID. Devices 102 may be allowed to register through any AP 905 and 1005 via a captive portal. When an unknown device connects, a captive portal may be used to allow the user to register. In certain representative embodiments, registration may be accomplished without a captive portal, for example for device-to-device or machine to machine (M2M) registration set forth herein.
2. Discovery:
   a. The AP 905 and 1005 may detect devices 102 using probe requests for a network of interest. Multiple hidden networks may be supported. The device MAC address may be retrieved from the probe request. Most devices 102 actively scan using probe requests, or devices 102 may be configured with a specific hidden network to ensure probe requests are sent.

3. Invitation:
  a. The AP 905 and 1005 may give and/or send (e.g., only give) a probe response to the devices 102 to which a connection is to be or should be provided. Other devices 102 may not be aware of the network's existence and the network may remain hidden (e.g., unexposed) to them and the devices 102 may operate and/or are to operate normally (e.g., without the network which remains hidden). The probe response may be sent from the AP 905 and 1005 to the device 102 (e.g., directly to the device). The probe response may be sent to some devices 102 (e.g., and not other devices) in order to selectively expose/hide the network. The AP 905 and 1005 by itself may determine or may check with a cloud service (e.g., cloud server) to determine if the network is to be or should be shown and/or exposed to a device 102 (e.g., that the probe response is to be or should be sent). In certain representative embodiments, if the latency to the cloud service is too long, the AP 905 and 1005 may reference a local cache of server responses. If the device 102 providing the probe request is not in the cache, the network may be exposed to the device 102 and later, if appropriate or necessary, based on further information, access by the device 102 to the network may be removed (e.g., by again hiding the network). In this case, the hiding of the network may be appropriate, as the device 102 may not continue to send out probe requests in the same location if no known networks are found. In certain representative embodiments, the device 102 may be removed by the AP 905 and 1005 (e.g., by sending a deauthentication and/or disassociation frame and then the AP 905 and 1005 may not respond to probe requests from the device 102 so that the device 102 does not reconnect to the network).
4. Connection:
  For added security, a version of EAP may be used to validate each user individually after the device 102 has selected the network. If the logic changes and a connected device 102 is to be no longer connected or should no longer be connected, the AP 905 and 1005 may disconnect the devices, for example, by sending a disassociation message (e.g., 802.11 Deauthentication and Disassociation management frames and/or other disassociation request). The registration process may allow users to choose their own passwords, which may improve security, for example, by limiting the exposure of passwords.

Representative Procedures to Remove Dependency on MAC Addresses

Each device 102 may be configured with a unique SSID generated and/or constructed by appending a unique device ID (which may be associated with the MAC ID of the device 102 or which may be independent of a MAC address of the device 102) to a common string (ex: CBNS_<devid>). The device ID may be used instead of a MAC ID with the probe request.

Representative Procedure Using 802.11u

In certain representative embodiments, the procedure may implement the discovery and invitation processes/steps by crafting or creating device specific ANQP responses to selectively control how a device selects a network. The representative procedure using ANQP responses may include some or all or the following:

1. Initial Setup:
  a. Initial setup may not be appropriate and/or required.
2. Discovery:
  a. Use ANQP query (e.g., Initial GAS Request) to identify a device 102 from its MAC address.
3. Invitation:
  a. Craft ANQP response to get the device 102 to select the desired network and do not include other information (e.g., any superfluous information). For example, if it is determined (e.g., in the cloud) that the service provider of the device 102 has a roaming agreement with the AP 905 and 1005, the device 102 may be notified (e.g., only notified) of the roaming agreement and for example may not be notified of other roaming agreements with other providers. For example, there may not be a reason to inform the device 102 of which other service providers have roaming agreements with the AP 905 and 1005.

In certain representative embodiments, the AP 905 and 1005 may not have to expose any information about itself that the client does not use.

In certain representative embodiments, the network selection may be made in the cloud, and may not be made in the device 102. For example, the cloud-based selection may allow for more flexibility and complexity in the policy logic. For instance, a provider may decide to allow (e.g., only to allow) its VIP customers to roam on certain other providers networks at certain times. As another example, a provider may allow certain customers: (1) having a particular account type; (2) of a certain market segment; and/or (3) having a certain spending profile to roam.

Although various forms of network selection have been illustrated using cloud-based information and policy logic to implement automated network selection and connections, it is contemplated that the same policy logic may be used to determine various characteristic of the connection. For example, a VIP customer may be allowed to connect and use a segment of the bandwidth of a WiFi connection. The policy logic from the cloud may be used to determine whether to enable a connection with a device, the proper network to assign to the device, and the characteristics (e.g., type of service allowed, bandwidth assigned, priority, and/or QoS, among others) for the connection/service of the device.

Representative Architecture

Figure 11:
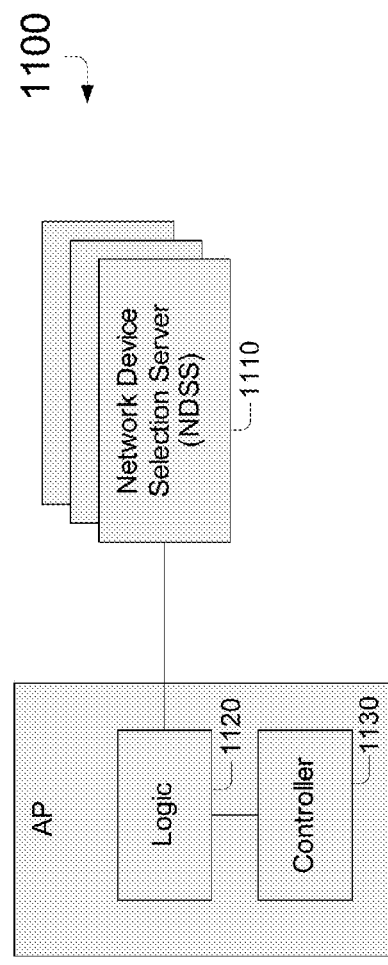
FIG. 11 is a diagram illustrating a representative cloud-based network selection architecture.

FIG. 11 is a diagram illustrating a representative cloud-based network selection architecture 1100.

Referring to FIG. 11, the architecture 1100 may include two main component types, the access point (AP) 1105 and a Network Device Selection Server (NDSS) 1110 along with the associations between these entities. The NDSS 1110 may inform the AP 1105 if a device 102 is to be or should be given a connection, or not. If the device 102 is to be or should be given a connection, the NDSS 1110 may inform the AP 1105 how to provide the connection. The NDSS 1110 may collect some event information of when devices 102 come and go in various APs 1105. The AP 1105 may provide functionality used for cloud-based network selection and, for example, may involve the ability to create additional networks and/or selectively respond to probe requests, as described herein.

The AP 1105 may have subcomponents (e.g. two subcomponents) including, for example, a Logic sub-component 1120 and/or a Controller sub-component 1130. The Logic sub-component 1120 may provide or may include (e.g., may encapsulate) logic (e.g., all logic) and NDSS communication. The Logic sub-component 1120 may be platform independent. The Controller subcomponent 1130 may provide or may include (e.g., may encapsulate) lower level AP functions (e.g., all such functions) such as discovering devices and/or creating networks, among others. The Controller sub-component 1130 may be platform dependent. It is contemplated that both of these sub-components 1120 and 1130 may be modified based on the procedures used for device discovery and/or device connection, among others.

Multiple NDSSs

Figure 12:
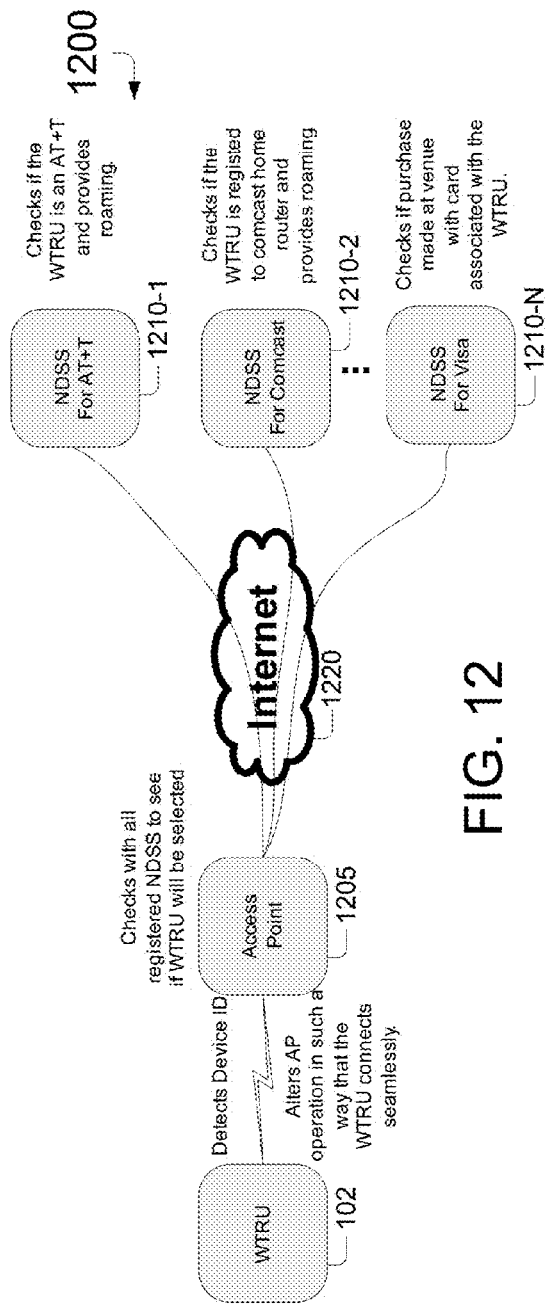
FIG. 12 is a diagram illustrating a representative multiple Network Device Selection Server (NDSS) deployment.

FIG. 12 is a diagram illustrating a representative deployment 1200 with multiple NDSSs deployment.

Referring to FIG. 12, the deployment 1200 with multiple NDSSs may include a WTRU 102, an AP 1205, and multiple NDSSs 1210-1, 1210-2 . . . 1210-N. For example the AP 1205 and the multiple NDSSs 1210-1, 1210-2 . . . 1210-N may be connected via Internet 1220 or another networked connection.

The NDSSs 1210-1, 1210-2 . . . 1210-N may be used by an AP 1205 to scale (e.g., easily scale) connection policy logic (e.g., while keeping the connection policy logic modular). After the WTRU 102 is identified by the AP 1205, the AP 1205 may check with any configured NDSSs 1210-1, 1210-2 and 1210-3 (e.g., all configured NDSSs) to determine which network the WTRU 102 is to select or should select.

In certain representative embodiments, the NDSS 1210-1, 1210-2 . . . 1210-N may be used for selection of networks for many different situations or conditions, such as for service provider partner networks, purchases (e.g., recent purchases) with a credit card associated with the WTRU 102, and/or through associations in social media. If multiple NDSSs 1210-1, 1210-2 . . . 1210-N select the WTRU 102, the AP 1205 may choose one network, and/or may choose some or all of these multiple networks. In certain embodiments, the WTRU 102 may only have one network for connection and in other embodiments, the network may defer the choice to the WTRU 102.

Representative NDSS Interface

Representative messages and data used in the NDSS interface may be defined as set forth below.

| | |
|---|---|
| Device Discovered Message | AP to NDSS |
| Input: | Router ID (BSSID) |
| | Device MAC Address |
| Output: | Connection Configuration Data (see below) or None |
| Description: | Reports that a new device looking for connectivity was discovered by the AP. |
| Device Connected | AP to NDSS |
| Input: | Router ID (BSSID) |
| | Device MAC Address |
| Output: | None |
| Description: | Reports that a device has connected to the AP. |
| Remove Device Message | NDSS to AP |
| Input: | Router ID (BSSID) |
| | Device MAC Address |
| Output: | None |
| Description: | Removes the connection given to the specified device. |
| Device Gone | AP to NDSS |
| Input: | Router ID (BSSID) |
| | Device MAC Address |
| Output: | None |
| Description: | Reports that a device that was connected is now gone. |
| Connection Configuration Data | |
| Defines how the AP may be configured to give the desired device a connection. For example: Create a new network with a given SSID and WPA-PSK security using a given key. Other possibilities include an EAP configuration. | |

AP Controller Interface Example

Examples for using a discovery network and/or network creation procedures are set forth below. For other procedures, it is contemplated that the interface may change. In certain representative embodiments, the hardware platform may be (e.g., always) abstracted from the logic.

| | |
|---|---|
| Find Devices | |
| Input: | SSID of network |
| Output: | List of MAC address |
| Description: | Returns list of the MAC address of the devices currently associated with the specified network. |
| Network Up | |
| Input: | SSID of network |
| | Security Configuration (WPA PSK for example) |
| Output: | Success/Failure |
| Description: | Brings up an additional network on the AP with the specified SSID and security configuration. |
| Network Down | |
| Input: | SSID of network |
| Output: | Success/Failure |
| Description: | Removes the specified network from the AP. |

Representative Home Network Sharing with Facebook

Requesting from a friend a WiFi network password may be an awkward experience and/or an annoying experience that may be familiar to some or all network users. Using Cloud-based Network Selection (CBNS) and Facebook, a new home router Home Network Sharing (HNS) system or apparatus may be implemented so that user's mobile devices may automatically and seamless connect when visiting their friends. Connectivity may be provided (e.g., may only be provided) for friends of the owner of the house (and for example, may not be provided for all Facebook users). Visitors who participate in HNS and are not friends of the HNS owner may not be given a network connection (e.g., any network connection) or their privileges after connection may be restricted or limited). Visitors that are friends with the owner and that do not and/or are not register with the HNS may not be given a connection. Those visitors may register (e.g., easily register) dynamically (e.g., on the spot). Devices that do not get a connection may behave normally (e.g. without authentication failures), and may be free to use other networks available to them, such as a cellular network. When configuring the router for a first time, the owner may have a procedure that includes signing into Facebook to associate the router with the owner. The devices may then be automatically associated with their owner, when the device is connected to the owners HNS router for the first time. For users without an HNS router that desire or wish to participate, a one-time manual configuration option via the web and/or a mobile application may be used (e.g., available for use).

In certain representative embodiments, an HNS router is contemplated to have one owner and sharing (e.g., all sharing) may be based on the association between different HNS router owners. It is contemplated that any number of devices may be associated with a particular HSN router, and one of skill understands how such a system is extendable to accommodate the more realistic likelihood of multiple device owners per household. For example, an association between devices and HSN routers may be stored in the cloud to enable connections based on device-specific information.

Although certain representative discovery network and network creation procedures are shown, it is contemplated that other procedures may be used and the router (e.g., only the router) may be changed to accommodate such procedures. Guest devices may be detected when the devices connect to the discovery network (HNS_NET). The devices may (e.g., may only) manually connect to this network once and, as it is configured as an open network, this may be a simple (e.g., very easy) process. If a device is registered with the HNS system and is determined to be one of the devices of a friend of the owner, the HNS router may bring up the device's home network. The device may sense its home network and may seamlessly connect. Once the device leaves the network, the network may be removed from the router. Guest networks may be isolated from the owner's home network so guests cannot access any devices and/or any services on the home network. In certain representative embodiments, guests may be given (e.g., only given) internet connectivity.

For certain friends (e.g., very close friends) one or more features may be enabled to have access to certain home network services including for example, network storage (locally) and/or local network virtualization (e.g., by tunneling to the friend's home network).

Figure 13:
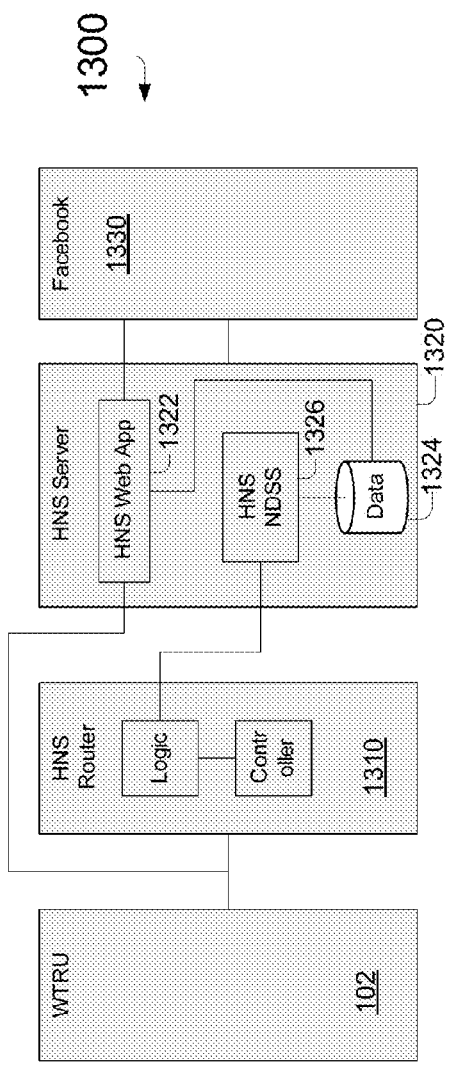
FIG. 13 is a diagram illustrating a system for Home Network Sharing (HNS)

FIG. 13 is a diagram illustrating a system 1300 for Home Network Sharing (HNS).

Referring to FIG. 13, the HNS system 1300 may include the following: (1) wireless devices and/or WTRUs 102 including mobile wireless devices such as smartphone, tablets and/or laptops; (2) an HNS router 1310 including a home WiFi router, for example with CBNS capability; (3) an HNS server 1320 that may implement a web site for router management and the NDSS for communication with the router; and/or (4) Facebook 1330 or another social media that may provide an API to allow user log in and to retrieve user profiles (e.g., their user profile) and friend lists. The HNS server 1320 may include a HNS Web App 1322, which executes on the HNS server 1320, a database 1324 to store information including users, networks, and friendship associations and/or a HNS NDSS 1326.

Representative Facebook Integration

A web application may be registered with Facebook and may be joined by the user to access Facebook's services. When a user logs into Facebook via the HNS web site, an access token may be returned. The access token may enable use of the Graph API to retrieve information such as a user's profile (name, and other profile information) and a friend list. The access token may expire after some time and the user may log into Facebook again to get another unexpired token. The access token may not be used from the HNS server while the user is not using the web application. The friendship associations may be read when a user configures their HNS router and may be stored locally in the HNS server. The friend associations (e.g., only the friend associations) with other router owners may be stored. If two router owners become friends after they have both configured their routers, then one or both of them may log into the Friend Network Application to update (e.g., refresh) their friend associations (e.g., stale or outdated friend associations). Storing the friendship associations locally may allow for specifying friends through other procedures in addition to and/or in lieu of Facebook.

Representative Web Interface

A web interface may be provided for user registration, access point configuration and/or network monitoring, among others. A dashboard may be displayed (for example, to a user, the network operator and/or the network owner, among others) indicating which devices and their users (e.g., shown using profile pictures) are currently in the network. The status of each device may be shown including whether for example: (1) a device has been detected and no user is registered to that device; (2) a device has been detected and is being avoided by the network; (3) a device is being shown the network (e.g., the network is being exposed) and the device has not associated yet; and/or (4) a device is associated with the network, among others. The display may provide visual indications of each status per device or may include multiple visual indications per device. For example, a device may include one visual indication for detection and a second visual indication for user registration.

The user of a device may configure their privacy profile settings so that their information is not shown to an owner of a network under certain rule-based conditions (e.g., for any network to which they cannot connect). For instance, a user may not want and/or desire to be visible to the network in the neighboring vicinity (for example a neighboring apartment). A user may choose to expose his/her information when making (e.g., only when making) a request to access the network.

The web interface may provide network history and statistics to the AP owner on user access, bandwidth used by the user (e.g., each user) during access periods, and/or network loading during the user access periods, among others.

A user may log into a web site through another network to configure a profile or determine current status of the user. The user may find out why his device is not being selected by a particular network.

Representative Process Flows

Figure 14:
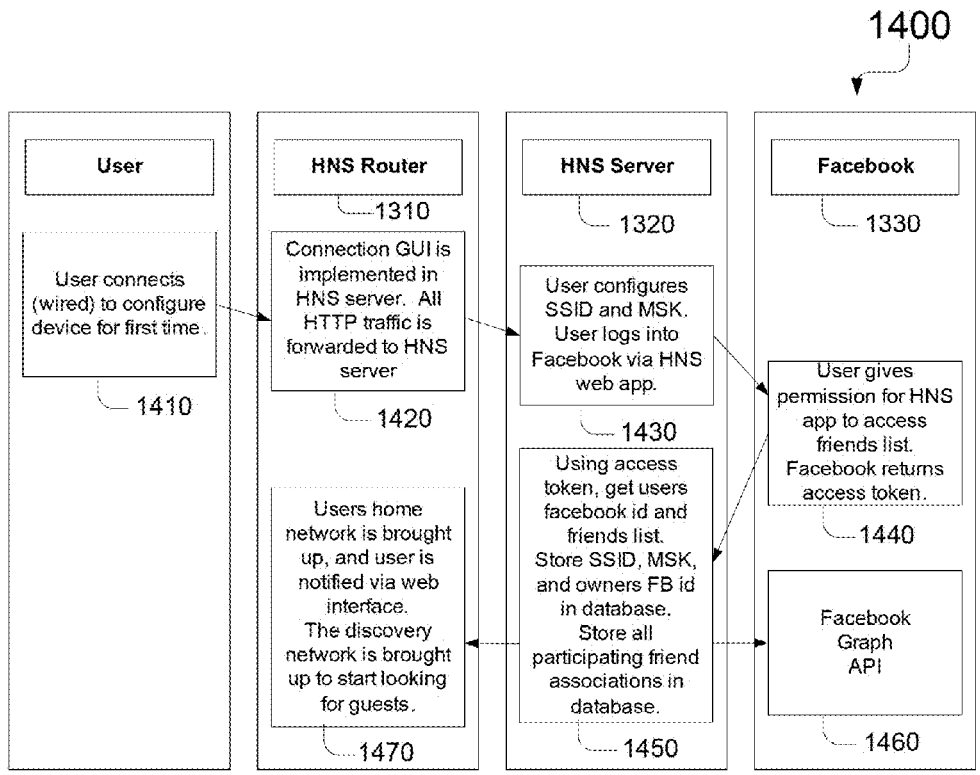
FIG. 14 is a diagram illustrating an HNS initial configuration process.

FIG. 14 is a diagram illustrating an HNS initial configuration procedure 1400. After the HNS router 1310 is first connected, at 1410, the owner may configure the HNS router 1310 using the HNS initial configuration procedure. For example, the user may configure the HNS router 1310 for the first time. At 1420, the HNS router 1310 may implement a connection graphical user interface (GUI) and may forward HTTP traffic to HNS server 1320. At 1430, the user configures SSID and MSK, the user may log into Facebook 1330 via the HNS web application 1322. At 1440, the user may give permission for the HNS web application 1322 to access Facebook's friends list of the user. Facebook 1330 may return an access token to allow access to the friends list and other information via an API (e.g., a Facebook API). At 1450 and 1460, using the received access token, the HNS server 1320 may get the user's Facebook ID and friends list, via the Facebook API, may store the SSID, the MSK and/or the owner's Facebook ID in a database 1324 and/or may store participating (e.g., all participating) friend associations in the database 1324. At 1470, the user's home network may be brought up and the user may be notified via a web interface of the procedure completion. The discovery network may also be brought up to start looking for guests matching the friends associations stored in the database 1324.

Representative Home Network Initial Connection

Figure 15:
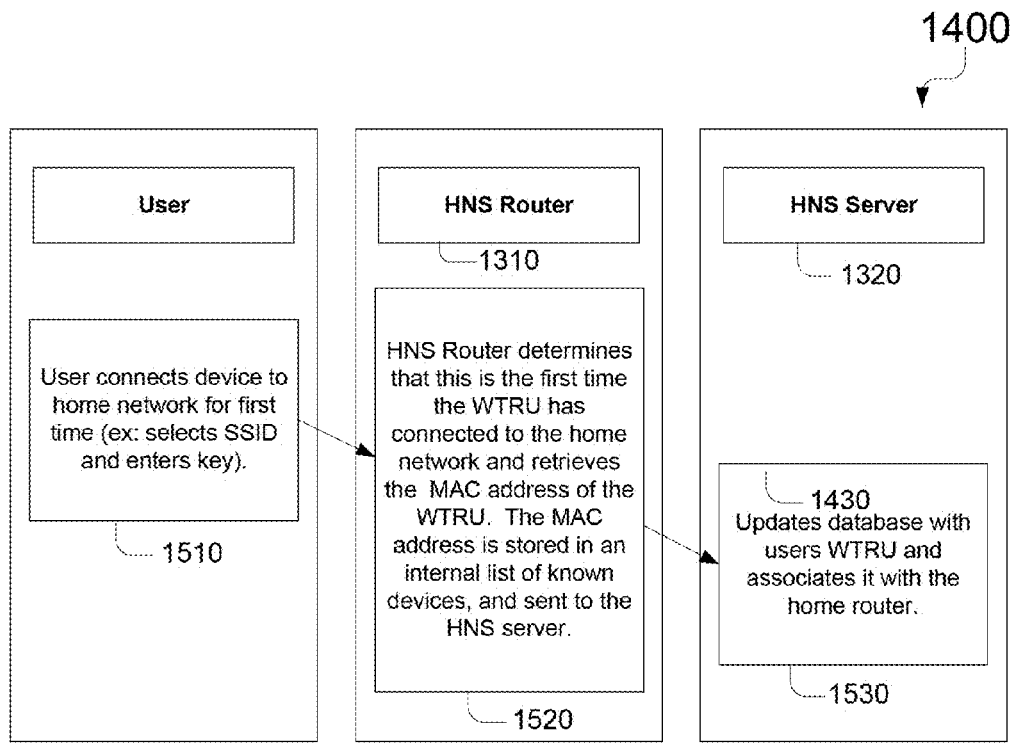
FIG. 15 is a diagram illustrating a representative procedure for HNS initial connection processing.

FIG. 15 is a diagram illustrating a representative procedure for HNS initial connection processing 1500.

Referring to FIG. 15, at 1510, as devices 102 (e.g., wired or wireless) in a house are connected to the home network for the first time, the devices 102 may be registered with the HSN server 1320 via the HNS router 1310. At 1520, the HNS router may determine that this is the first time the device/WTRU 102 has connected to the home network and may retrieve the MAC address of the WTRU 102. The MAC address may be stored in an internal list of known devices and may be sent to the HNS server 1320. At 1530, the HNS Sever 1320 may update the database 1324 with the user's WTRU 102 and may associate it with the HNS router 1310.

In certain representative embodiments, a captive portal may be used on the home network to present devices connecting for the first time with a web page that allows them to associate their device 102 with their Facebook identity (e.g., the Facebook ID) and may allow for multiple owners (e.g., devices) per household. The owner who configured the HNS router originally may act as the administrator and may approve (e.g., any) other owners (e.g., device users) that registered.

Representative Home Device Secondary Connection

Figure 16:
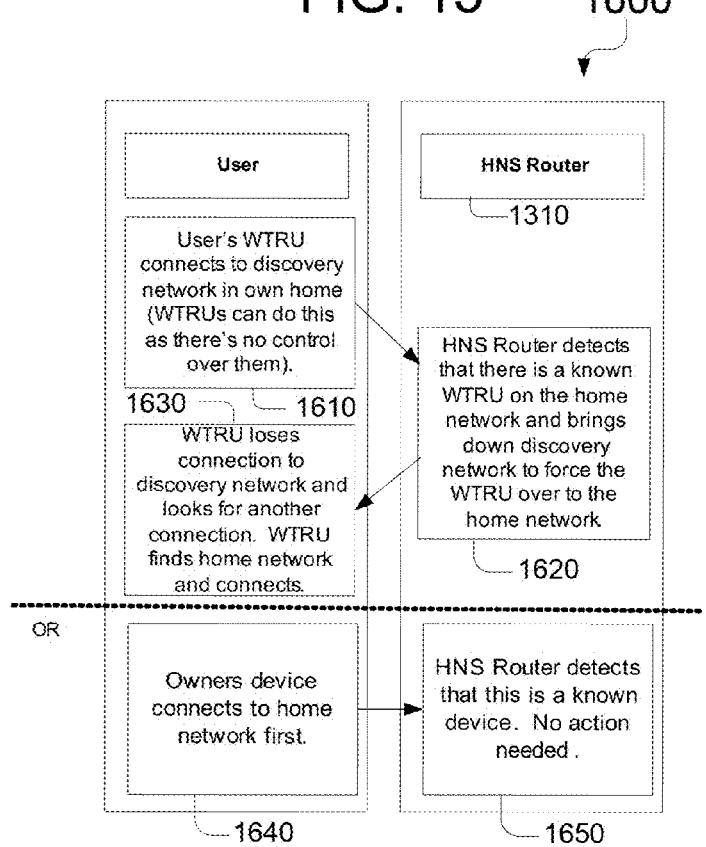
FIG. 16 is a diagram illustrating a representative procedure for home device secondary connection processing.

FIG. 16 is a diagram illustrating a representative procedure for Home device secondary connection processing 1600. Referring to FIG. 16, after devices/WTRUs 102 have connected to the home network and the discovery network, they may automatically connect to either one when entering their home again. At 1610, a homeowner's device/WTRU 102 may connect to a discovery network in the home or the owner. At, 1620, if a homeowner's device is detected to be connected to the discovery network, the network may be brought down to force the device to connect to the home network. At 1630, the device/WTRU 102 may find the home network and may connect to the home network. Once the device/WTRU 102 is connected to the home network, it may not switch back to the discovery network. In certain representative embodiments, the device/WTRU 102 may choose to connect to the home network first, then there may be no use in bringing down the discovery network. The HNS router 1310 may store known devices locally, or in addition to being stored locally or in lieu of being stored locally, the HNS router 1310 may check with the HNS server 1320 to determine if a device is an owner's device. At 1640, for example, a device/WTRU 102 (e.g., an owner's device) may connect to the home network first. At 1650, the HNS router 1310 may detect that the device 102 is a known device and may determine that no action is needed.

Representative Use Case with Two Guests (One is a Friend and One is not a Friend)

Figure 17:
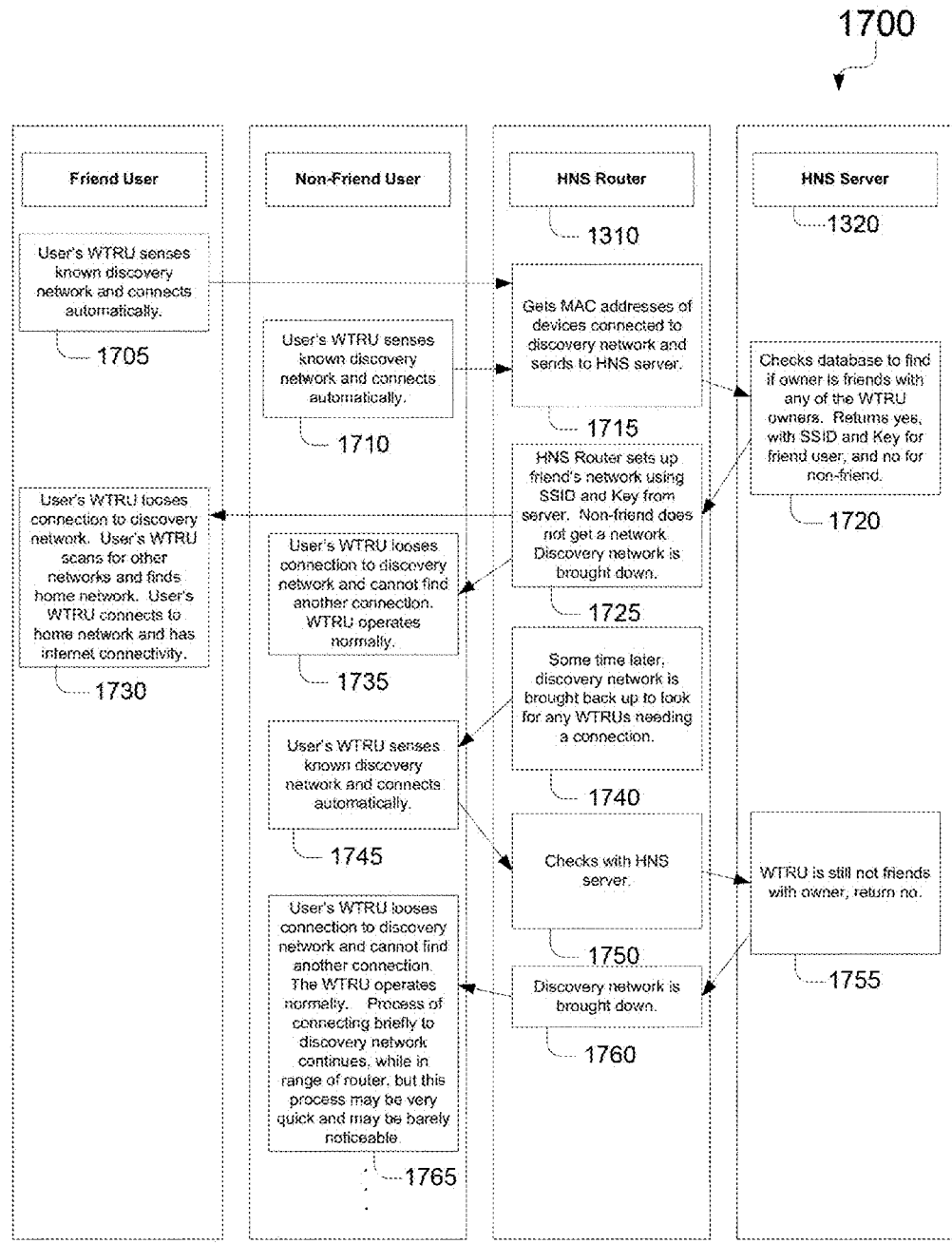
FIG. 17 is a diagram illustrating a representative procedure for HNS guest connection processing.

FIG. 17 is a diagram illustrating a representative procedure for HNS Guest connection processing 1700. Referring to FIG. 17, two or more guests, who have preconfigured their devices (and/or WTRUs) 102 with their home HNS routers 1310, may enter another house. One of the guests may be a friend of the owner and may be given internet connectivity seamlessly and the other guest may not be a friend of the owner. The other guest's device 102 may not get a network connection, but may operate normally without a connection.

At 1705, the Friend's WTRU 102 may sense a known discovery network and may connect automatically (e.g., without user intervention). At 1710, the WTRU of the non-Friend may sense the known discovery network and may connect automatically. At 1715, the HNS router 1310 may get the MAC addresses of the WTRUs (e.g., devices) 102 connected to the discovery network and may send the MAC addresses to the HNS server 1320.

At 1720, the HNS server 1320 may check its database 1324 to find if the owner is friends with any of the owners of the connected WTRUs 102. For example, the HNS server 1320 may return "yes" (e.g., indicate a friend user and/or provide the SSID and/or Key for such a friend user) or may return "no" (e.g., indicate a non-friend user without providing any SSID and/or Key for such a non-friend user).

At 1725, the HNS router 1310 may setup a friend's network using the SSID and/or Key from the HNS server 1320 for an indicated friend user. The HNS router 1310 may not setup any network for an indicated non-friend user. The Discovery network may be brought down. At 1730, the WTRU 102 of the friend user may lose connection to discovery network. The WTRU 102 of the friend user may scan for other networks and may find a home network. The WTRU 102 of the friend user may connect to the home network and may have Internet connectivity. At 1735, the WTRU 102 of the non-friend user may lose connection to the discovery network and may not find another connection and the WTRU of the non-friend user may operate normally without any connection or exposure to the home network.

At 1740, sometime later (e.g., after a delay period), the discovery network may be brought back up to look for any WTRUs 102 needing or desiring a connection. At 1745, the particular WTRU 102 of the non-friend user may sense a known discovery network and may connect automatically. At 1750, the HNS router 1310 may check with the HNS server 1320 whether the particular WTRU 102 is associated with a user that is a friend of the owner. At 1755, the HNS server 1320 may determine whether the particular WTRU 102 is associated with a user that is a friend of the owner. For example, the HNS server 1320 may determine that the WTRU 102 is not associated with a friend of the owner and may indicate so by returning as message indicating "no" to the HNS router 1310. At 1760, the HNS router 1310 may bring down the discovery network. At 1765, the particular WTRU 102 of the non-friend may lose connection to the discovery network and may not find another connection. The WTRU of the non-friend may operate normally. The procedure to connect (e.g., briefly connect) to discovery network may continue, while in range of HNS router 1310, but the procedure may be very quick and may be barely noticeable.

Representative Updating Friends

Figure 18:
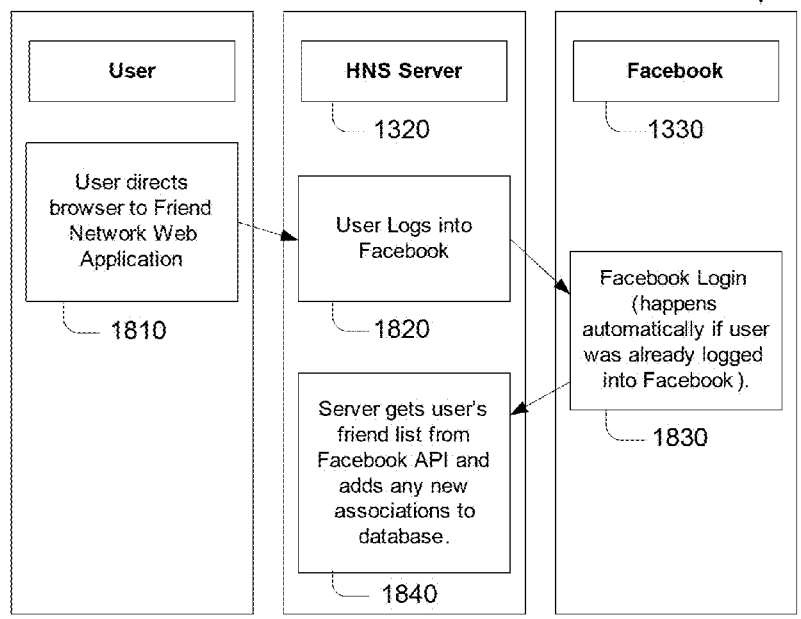
FIG. 18 is a diagram illustrating a representative procedure for a HNS friends update.

FIG. 18 is a diagram illustrating a representative procedure for a HNS friends update processing 1800. Referring to FIG. 18, friend associations may be stored in the HNS server 1320 (e.g., a friend network server) when each owner configures his corresponding HNS router 1310. If two owners become friends in Facebook 1330 after they have already configured their HNS routers 1310, one of the friends may go the Web Application 1322 and may choose to update their friends to update their friends association.

For example, at 1810, the user may direct a browser to a Friend Network Web Application 1322. At 1820, the user may log into Facebook 1330. At 1830, the Facebook login may happen automatically, if the user was already logged into Facebook 1330. At 1840, the HNS server 1330 may get the friend list of the user from the Facebook API and may add any new associations to the HNS database 1324.

If a user does not own an HNS router 1310 and may desire to register the user's WTRU/device 102 to get seamless connectivity while visiting friends with HNS routers 1310, the user may register (e.g., manually register) the device by manually entering user network information (e.g., SSID and/or Key, among others) and the MAC address or MAC addresses of the user's device or devices and/or automatically by downloading an application. The application may be used (e.g., only be used) to automatically configure the WTRU/device 102 (e.g., in the HNS system) and may run (e.g., may only run) once.

In certain representative embodiments, no applications, software and/or modification of any kind are required to execute on the devices 102 for the run time operation of the HNS.

Representative Database

Figure 19:
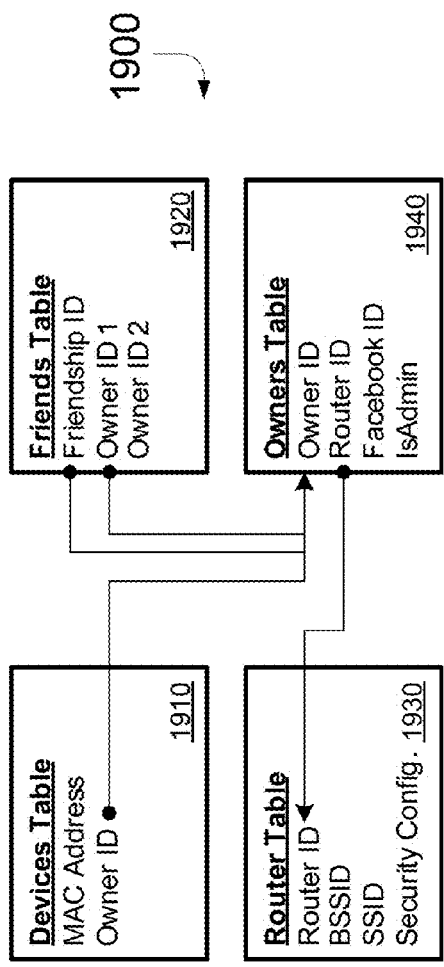
FIG. 19 is a diagram of a relational database, which may be used in an HNS database.

FIG. 19 is a diagram of a relational database 1900, which may be used, for example, in or for the HNS database 1324. One of skill understands that other (e.g., any other) database model may be used.

Referring to FIG. 19, the relational database 1900 may include a devices table 1910, a friends table 1920, a router table 1930 and/or an owners table 1940, for example as set forth below. The device table 1910 may include a MAC address field and/or an owner ID field. The friends table 1920 may include a friendship ID and/or Owner ID fields (e.g., Owner ID1, Owner ID2 etc.). The router table 1930 may include a router ID field, a basic service set identifier (BSSID) field, a SSID field and/or a security configuration field. The owners table 1940 may include an owners ID field, a router ID field, a Facebook ID field and/or an IsAdmin field. The details associated with each of these fields are set forth below.

| Representative Router Table | |
| --- | --- |
| Router ID (key) | Unique Router ID |
| BSSID (nullable) | Router's BSSID or MAC Address. May be null, if no router associated with network configuration as in case of non-HNS router owner. |
| SSID | SSID String of Router |
| Security Configuration | Security Configuration of Router (ex: WPA-PSK key) |

| Representative Owners Table | |
| --- | --- |
| Owner ID (key) | Unique Owner ID |
| Router ID (foreign key) | Reference to Owner's Home Router |
| Facebook ID | Reference to Owner's Facebook ID |
| IsAdmin | Boolean indicating if Owner has permission to administrate the router. |

| Representative Devices Table | |
| --- | --- |
| MAC Address (key) | MAC address of each device (unique by design) |
| Owner ID (foreign key) | Reference to device's owner |

| Representative Friends Table | |
| --- | --- |
| Friendship ID (key) | Unique Friendship Association ID |
| Owner ID 1 (foreign key) | Reference to one friend * |
| Owner ID 2 (foreign key) | Reference to another friend * |

In certain representative embodiments, a friendship may be reciprocal, so if a first person and a second person are friends then a two-way relationship between the first person and the second person may be implied and only one entry may be made per friendship. It is contemplated that friendships may be stored in the database (e.g., a local database) for various reasons including: that the retrieval of friend lists from Facebook (or other social media provider) may be done (may only be done) while a user is logged into Facebook or the other providers application via a web application and/or that such a process allows other ways to establish friendship associations (e.g., a local friendship application, other social media and/or friending establishment services).

Access Events

| | |
| --- | --- |
| Event ID (key) | Unique ID |
| Device | Reference to Device |
| Router ID | Reference to Router |
| Start Date Time | Start date and time of connection |
| End Date Time | End date and time of connection |

In certain representative embodiments, access events may be stored in the database as an added security measure to ensure that a malicious device is not trying to spoof a MAC address.

Example Database Operations

The following give example procedures for various database operations.

Configure router, first time.
Input:
    Router BSSID (MAC Address)
    SSID
    Security Configuration (WPA-PSK key for example)
    Facebook ID of owner (OwnerFBID)
    Facebook Friendlist of owner (list of Facebook IDs)
1) Create a new Network Table row (BSSID, SSID, Security Config.) and save RouterID
2) Create a new Owners Table row (RouterID, OwnerFBID, Yes) and save OwnerID
3) For each Facebook ID in FriendList:
    If Facebook ID in Owners table then
        Set friend owner ID to FriendID
        Look for friend association in Friends Table: (FriendID, OwnerID) or (OwnerID, FriendID)
        If not friends then:
            Add row to Friends Table (OwnerID, FriendID)
When device connects for first time.
Input:
    Mac address of device
    Router BSSID
1) Look up RouterID from BSSID
2) Look up OwnerID from RouterID
3) Create a new Devices table entry (MAC address, OwnerID)
Look up guest device
Input:
    Router ID
    MAC address of guest device
1) Lookup Owner ID from MAC Address using Devices table and save as GuestID
2) Lookup Owner ID from Router ID in Owners table and save as OwnerID
3) If GuestID equals OwnerID then,
    return "Device belongs to owner"
4) Look for friend association in Friends Table: (GuestID, OwnerID) or (OwnerID, GuestID)
5) If found not found then
    return "Device is not a friend's"
6) Lookup Router ID from GuestID in Owners Table save as GuestRouterID
7) Lookup SSID and Security Config from Router Table using GuestRouterID
8) return "Friend" with Network Information (SSID and Security Config)

Figure 20:
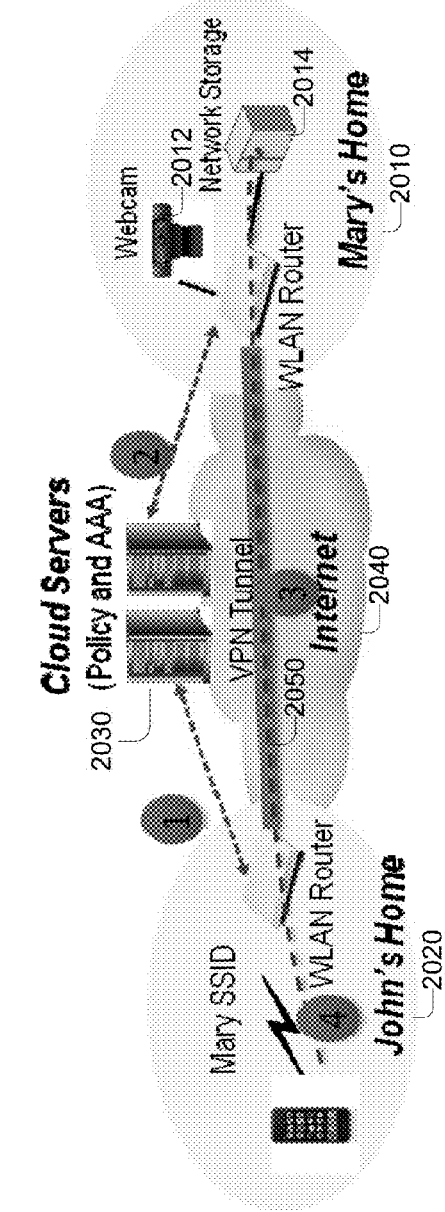
FIG. 20 is a diagram illustrating a representative architecture for tunneling between a home network and a visited home network.

FIG. 20 is a diagram illustrating a representative architecture 2000 for tunneling between a home network 2010 and a visited home network 2020.

Referring to FIG. 20, the representative architecture 2000 may include the home network (HN) (e.g., Mary's HN)

2010, the visited HN (e.g., John's HN) 2020, one or more cloud servers 2030 providing a cloud service and/or a virtual private network or Internet 2040 providing a connection between the HN 2010 and the visiting HN 2020.

In certain representative embodiments, a tunnel 2050 may be created to the guest's own HN/AP 2010 so that a guest may access their HN services. A security procedure may be implemented in which Mary, as a guest, may be able to securely access her HN/AP 2010 from John's home (e.g., HN) 2020, via the tunnel 2050 therebetween and may enjoy the services she normally has at Mary's home (e.g., webcam services via a webcam 2012 and/or network storage services via network storage 2014, among others).

Figure 21:
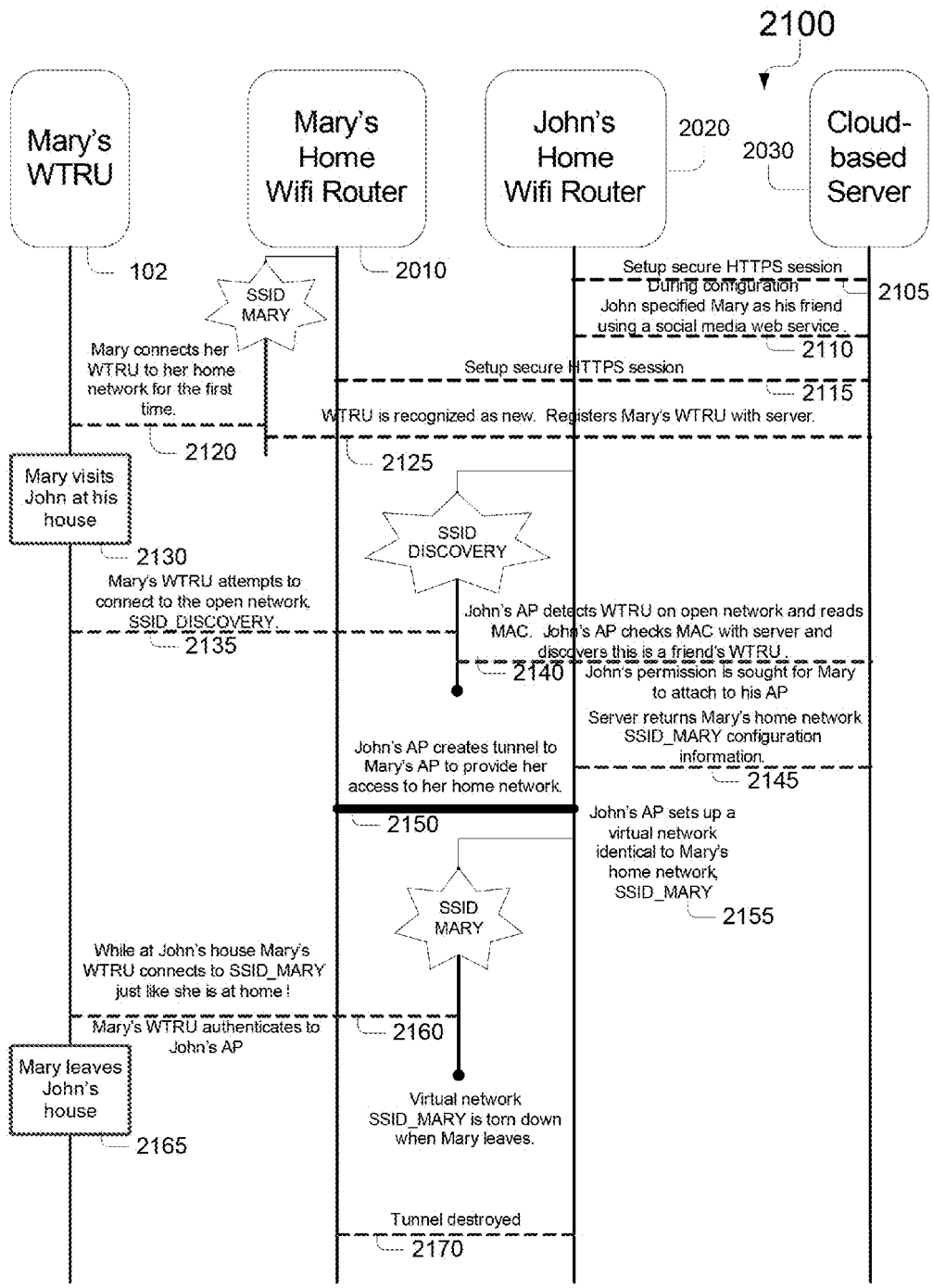
FIG. 21 is a diagram illustrating a representative procedure using the architecture of FIG. 20 to tunnel between the home network and the visited home network.

FIG. 21 is a diagram illustrating a representative procedure 2100 using the architecture of FIG. 20 to tunnel between the HN/AP 2010 and the visited HN/AP 2020 by a user for secure access to the HN 2010. The processes/procedures/steps to perform authentication and secure delivery of configurations and/or setup a secure connection for Mary at John's house may include the following.

At 2105, John's AP (e.g., Home WiFi router) at the visited HN 2020 and the cloud-based server 2030 may setup a secure channel between John's HN/AP 2020 and the cloud service (e.g., a HTTPS session). At 2110, during configuration, John may have specified Mary as his friend using a social media web service such that John's HN/AP 2020 may determine via the cloud-based server 2030 that Mary is a friend. At 2115, Mary's HN/AP 2010 (e.g., Home WiFi router) and the cloud-based server 2030 may setup a secure channel between Mary's HN/AP 2010 and the cloud service (e.g., a HTTPS session). At 2120, Mary may connect her WTRU 102 to a network (e.g., SSID_MARY) provided by her HN/AP 2010 for the first time. At 2125, Mary's WTRU 102 may be recognized as a new WTRU and may be registered with the cloud-based server 2030.

At 2130, Mary may visit John at John's home. At 2135, Mary's WTRU 102 may attempt to connect to an open network (e.g., SSID_DISCOVERY) of the visited HN 2020. At 2140, John's HN/AP 2020 may detect Mary's WTRU 102 when Mary's WTRU 102 attempts to attach to the SSID_DISCOVERY network. John's HN/AP 2020 may communicate with the cloud-based server 2030 (e.g., via a cloud service such as a Facebook Application, Policies, and/or AAA server/service, among others) to verify that Mary's WTRU 102 is authorized to obtain WLAN access via John's HN/AP 2020. At 2145, the cloud service may confirm that the WTRU 102 attempting access is the WTRU of the friend of John (e.g., Mary's WTRU 102) and may allow access. The cloud server/service 2030 may send the configuration parameters and/or information for Mary_SSID to John's HN/AP 2020 (e.g., to virtualize Mary's HN 2010).

In certain representative embodiments, John's permission may be sought for Mary's WTRU 102 to attach to John's HN/AP 2020. If John's permission is provided, the cloud-based server 2030 may return Mary's HN SSID_MARY configuration parameters and/or information.

At 2150, the configuration parameters and/or information may be used to setup a secure tunnel 2050 (e.g., virtual private network (VPN) tunnel) to Mary's HN/AP 2010 to enable secure access to Mary's home services. The cloud service may send to Mary's HN/AP 2010 the configuration parameters (e.g., John's AP IP address, preshared key (MSK), and/or certificate, among others) used to setup a secure VPN tunnel 2050 to John's AP to enable secure access to Mary's home services. The secure VPN tunnel 2050 (e.g., IPsec and/or SSL) may be dynamically established between John's HN/AP 2020 and Mary's HN/AP 2010.

At 2155, John's HN/AP 2020 may setup a virtual network identical to Mary's HN SSID_MARY. At 2160, John's HN/AP 2020 may allow Mary's WTRU 102 to connect to John's HN/AP 2020 using Mary_SSID after authenticating Mary's WTRU 102 based on the attributes received from the cloud service (e.g., the MSK and/or 802.1x/EAP, for example). In the case of using 802.1x/EAP, an AAA server may be involved as part of the authentication procedure. After successful authentication, Mary, via her WTRU 102, may be able to securely access the Internet 2040 and her HN 2010 and/or home services from John's HN/AP 2020. Security over the air may be achieved using WPA/2-PSK and/or WPA/2-Enterprise.

Security over the Internet 2040 to Mary's HN/AP 2010 may be achieved using a VPN tunnel 2050 between the two sites. Other security measures may be used (e.g., using end-to-end secure socket layer (SSL)) from Mary's WTRU 102 to the home service (e.g., a webcam service and/or a network storage service) or verifying Mary's HN integrity through a Trusted Platform Module (TPM), for example before granting Mary's WTRU access to Mary's home services.

At 2165, when Mary leaves John's home or disconnects, John's HN/AP 2020 may clear the virtual network (e.g., SSID_MARY network). At 2170, the VPN tunnel 2050 established between Mary's HN/AP 2010 and John's HN/AP 2020 may be torn down.

Representative WiFi Router

A WiFi-router may use selective probe responses to implement CBNS (e.g., the network edge portion of CBNS). WTRUs 102 may connect and register at any router, for example, via a captive portal. Once a WTRU 102 is registered, by selectively sending or avoiding sending of a probe response, exposure of the WTRU 102 to the network may be select or avoid when the WTRU 102 is in the router's coverage area.

Representative Communication Architecture

FIG. 22 is a diagram illustrating a representative communication architecture 2200 including a CBNS WiFi-Router 2210. Multiple CBNS enabled routers 2210 may communicate with a CBNS server 2270 in the cloud (e.g., as a cloud type service) to report which WTRUs 102 are present and/or determine which WTRUs 102 are to be or should be given a connection (e.g., exposure to the network to gain a connection). Each CBNS WiFi router 2210 may include a CBNS Access Point (CBNS AP) component 2215 (e.g., functional, logical, software and/or hardware component) that interfaces with a network stack 2230.

The CBNS AP component 2215 may include a selection handler module 2216, a select cache module 2217, a select worker module 2218, a reporter module 2219, a cloud client module 2220, a HTTP redirector module 2221, a firewall 2222, and/or a domain whitelister module 2223.

A system using a Linux based OS may use the tools Hostapd and Iptables to interface with the network stacks 2230. The WiFi router 2210 may have an Ethernet network interface (eth0) 2240 and an 802.11 wireless network interface (wlan0) 2250. The Ethernet network interface (eth0) 2240 may be connected to the internet 2250 via a local network (e.g., providing or serving DHCP addresses). The wireless network interface (wlan0) 2250 may act as a gateway for the wireless network provided by the AP. The wireless LAN may run as its own local network assigning addresses using a DHCP server. One eth0 IP address may be shared by the connected WTRUs 102 (e.g., all connected wireless devices) using Network Address Translation (NAT).

The CBNS WiFi router 2210 may provide, for example an SSID of 'cbns' corresponding to a particular hidden network to one or more selected WTRUs 102 (although any other SSID string can be configured). The WTRUs 102 can be configured to connect to the hidden network using the SSID. The configuration may be done manually, programmatically and/or through a configuration file depending on the platform (e.g., operating system) of the WTRU 102. The hidden network may be configured with or without security. Although the MAC address may be used to identify WTRUs 102, it is contemplated that other unique identifiers of a WTRU 102 may also be used.

Representative Modification to WiFi Upper MAC

The 802.11 network stack 2260, for example, may be modified to selectively respond to probe requests for a hidden network. In Linux OS, the functionality may be found in the hostapd daemon. The logic described in the pseudo code below maybe inserted into the processing path that handles a probe request:

If the probe request is for an SSID in the set of CBNS SSIDs: (1) a message may be sent to the CBNS AP component 2215 with a MAC address of requesting WTRU 102; (2) the CBNS WiFi router 2210 may wait for a response from the CBNS AP component 2215 (e.g., the CBNS WiFi router 2210 may set a timeout); (3) if the response from the CBNS AP component 2215 is 'yes' (e.g., a first logic level), the CBNS WiFi router 2210 may return a probe response to the WTRU 102 with the MAC address; and/or (4) if the response from the CBNS AP component 2215 is 'no' (e.g., a second logic level) or if the response is not returned (e.g., has timed-out), a probe response may not be returned to the WTRU 102.

Representative Network Stack

The representative network stack 2230 may be configured with the following rules. The rules may be applied in an order shown (e.g., a priority order) or in another order. In a Linux system, the rules may be configured using Iptables/Netfilter. The rules include providing and/or allowing any of: (1) IP forwarding between eth0 2240 and wlan0 2250; (2) NAT (or IP Masquerading) for the eth0 2240; (3) a table of whitelisted MAC addresses; (4) a table of whitelisted destination IP addresses; (4) some or all traffic from whitelisted MAC addresses and/or to whitelisted IP addresses to pass; (5) forwarding of some or all HTTP traffic (port 80) to the HTTP re-director module 2221 (e.g., an HTTP re-director server) in the CBNS AP component 2215; (6) forwarding of some or all DNS traffic (port 53) to the domain whitelister 2223 in the CBNS AP component 2215; and/or (7) blocking of some or all other traffic.

Representative CBNS Server

The representative CBNS server 2270 may implement a variation of messages of the NDSS interface that may allow clients to run behind a firewall. The same information may be conveyed and, in certain representative embodiments, periodic reporting may be used to give the CBNS server 2270 an opportunity to send (e.g., effectively send) messages to clients behind the firewall. The CBNS server 2270 may provide these functions through a Restful/JSON API.

Representative messages may include:

| AP to Server | |
|---|---|
| Device Discovered Message | |
| Input: | Router ID (BSSID) Device MAC Address |
| Output: | Yes, No, or Unregistered |
| Description: | Given a Router ID and a Device ID, the server responds with a Yes if the device should be shown the network; No if the device should be avoided by the network; or Unregistered if the device should be allowed to register. |
| Report Devices Connected | |
| Input: | Router ID (BSSID) Device MAC Address |
| Output: | Devices to be Removed List |
| Description: | Reports which devices that are associated with the AP are to be removed. This message may be sent periodically. Any reported devices that are no longer to be associated are returned in the response. The server may respond with a list of devices to be removed (e.g., which is a subset of the associated list sent by the AP). |

Representative CBNS AP Component

The representative CBNS AP component 2215 may include the logic (e.g., all logic) used on the network edge side. This logic includes caching device selection responses from the CBNS server 2270, reporting connected devices, and/or implementing a captive portal for new device registration. The internal modules of the CBNS AP 2215 may include the following.

For wireless devices which may not or do not offer a user interface with a web browser, such as sensors and/or home automation machines, registration may be done and/or completed via the cloud (e.g., a cloud service). The device may be configured and/or preconfigured, for example by a manufacturer, to automatically connect to the CBNS network. The cloud service may recognize the device and may identify the device to the AP owner. The AP owner may use a cloud-based service to associate the specific device with their social network ID. After the device is associated with the AP owner, the selection logic may expose (e.g., always expose) the network to the device.

Representative Select Handler Module

The representative select handler module 2216 may communicate with the CBNS functionality inserted into the wireless network stack. Messages may be received by the select handler module 2216 from the modified WiFi upper MAC network stack 2260 when probe requests for the hidden network are received. The select cache module 2217 (e.g., select cache module) may be checked for a response (e.g., yes/no and/or corresponding logic levels), and the response may be returned to the modified WiFi upper MAC network stack 2260. The procedure can run quickly, as the modified WiFi upper MAC network stack 2260 may be blocking, while waiting for a response.

Representative Select Cache Module

The representative select cache module 2217 may include a cache container data object that may map device ID (MAC address) to a data structure including one or more of the following: (1) an enumeration indicating the response from the server: (i) Yes (Y); (ii) No (N) or Unregistered (U), among others; and/or (2) a timestamp, and/or a NULL, if waiting for a response from the CBNS server 2270 for the first time.

Figures 23, 24:
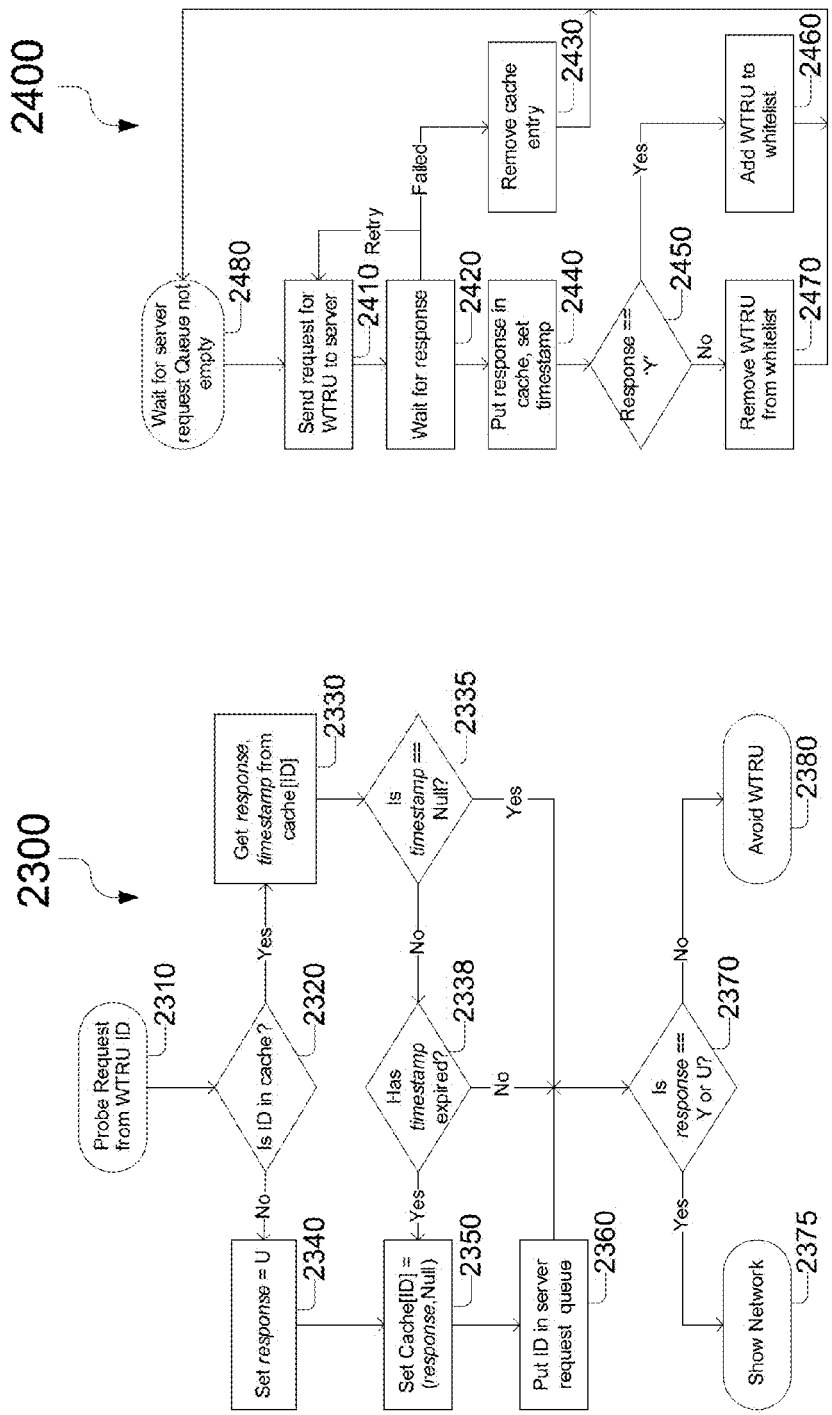
FIG. 23 is a diagram illustrating a representative process for exposing/hiding a network from a WTRU.
FIG. 24 is a diagram illustrating a representative process for whitelisting/dewhitelisting WTRUs.

FIG. 23 is a diagram illustrating a representative process 2300 for exposing and/or hiding a network from a WTRU 102 (e.g., a device with a device ID). At 2310, a probe request from a WTRU 102 with a WTRU ID may be received. At 2320, a cache may be checked to determine if the cache contains or includes a cached response for the WTRU 102 (e.g., a device ID). The cached response may have an associated timestamp when the cached response was cached. The cache may contain or include the cached response for the WTRU 102. The cached response may or may not be used based on, for example, whether the timestamp associated with the WTRU ID has expired. If the cache does not contain or include a cached response for the WTRU 102, at 2340, a response of "U" indicating an unregistered WTRU 102 may be set and the response may be entered into the cache at 2350 with the timestamp set to null. At 2360, a message may be queued up for a worker thread to check the status (e.g., "U", "Y" or "N") of the WTRU 102 with the CBNS server 2270. The worker thread may update the cache, when a response is received from the CBNS server 2270. At 2370, the CBNS WiFi router 2210 may determine whether the cached response indicates: (1) "U" for unregistered or "Y" for yes (e.g., to indicate that the network is to be exposed to the WTRU 102). If so, at 2375 the WTRU 102 (with a response of either "Y", indicating that the network is to be exposed to the WTRU 102 or a "U" for unregistered, may be or should be shown the network (e.g., sent or returned a probe response). If not, at 2380, the WTRU 102 (with a response of "N" for no, indicating that the network is not to be exposed to the WTRU 102) may be or should be avoided (e.g., not shown the network (e.g., not sent or returned a probe response)).

If the WTRU ID is in the cache, at 2330, the associated timestamp may be retrieved from the cache. At 2335, if the associated timestamp is a null value, processing moves to 2370. If the associated timestamp is not a null value, at 2338, the associated timestamp may be checked to determine if it has expired. If the associated timestamp has expired, the response in the cache may be stale (e.g., too old or older than a threshold based on a timestamp associated with the cached WTRU ID) and processing may move to 2350. At 2360, a new request to the CBNS server 2270 may be queued up to refresh the cache. If the associated timestamp is not expired, the response may or should be used and processing may move to 2370. In certain representative embodiments, if one or more probe requests are received while the worker thread is waiting (e.g., still waiting) for a response from the CBNS server 2270, a cached response of "U" may be used and the network exposed to the WTRU 102. In other representative embodiments, when a relevant response is stale, the network may remain hidden.

The hiding of a network generally refers to any of: (1) the disassociation/disconnection of a device from a network where an association/connection exist and then not responding by the network (e.g., the AP of the network) to request for reassociation/reconnection; and/or (2) not exposing the network to a WTRU/device which is not already associated/connected with the network, for example by not responding by the network (e.g., the AP of the network) to request for an association/connection.

Representative Select Worker Module

FIG. 24 is a diagram illustrating a representative process 2400 for whitelisting/dewhitelisting WTRUs 102 (e.g., devices). The select worker module 2218 may implement a separate worker thread that may wait for WTRU IDs to be placed in a queue. When the queue is not empty, the WTRU ID may be removed and may be sent to the cloud service to determine if that WTRU 102 is to be able or should be able to see (e.g., be exposed to) the network (for example, the WTRU has knowledge of the networks existence). The response from the service may update the cache. If the server cannot be reached after one or several retries, the worker may give up and may remove the entry from the cache. It is contemplated that if multiple requests are in the queue, the process may be optimized by sending all the WTRUs to the server at once.

Referring to FIG. 24, at 2410, a request to determine whether to send a probe response may be sent from the CBNS WiFi router 2210 to the CBNS server 2270. At 2420, the CBNS WiFi router 2210 may wait for a response to the request. If the CBNS WiFi router 2210 does not receive a response after a delay period has expired, processing may move back to 2410 and the request may be retried. If the number of retries reaches a predetermined or dynamically set threshold, at 2430, the cache entry associated with the particular WTRU/device 102 may be removed from the cache (e.g., the CBNS WiFi router 2210 may have determined that the response to the request has failed). Processing from 2430 may move to 2480 and the CBNS WiFi router 2210 may wait for the server request queue to empty. If a successful response to the request is received by the CBNS WiFi router 2210, at 2440, the response or information associated with the response may be put into the cache and associated with the particular WTRU/device 102 and a timestamp may be set (for example to the reception time for the response). At 2450, the CBNS WiFi router 2210 may determine whether the response from the CBNS server 2270 indicates to: (1) expose the network; or (2) hide the network from the WTRU/device 102. If the response indicates that the network is to be exposed (e.g., a "Y"), at 2460, the WTRU/device 102 may be added to the whitelist. If the response indicates that the network is not to be exposed (e.g., an "N"), at 2470, the WTRU/device 102 may be removed from the whitelist. After 2460 or 2470, processing may move back to 2480 (e.g., to repeat the request/response process).

Representative Reporter Module

Figure 25:
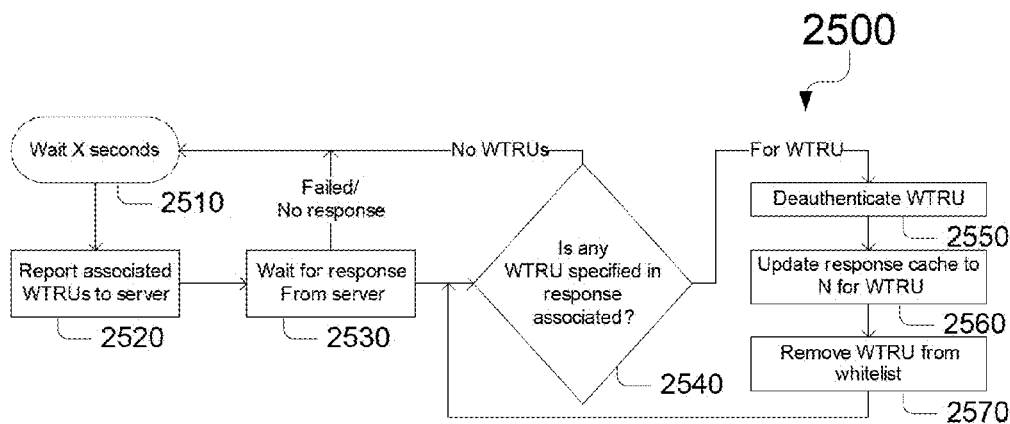
FIG. 25 is a diagram illustrating a representative reporting procedure.

FIG. 25 is a diagram illustrating a reporting procedure 2500 in accordance with certain representative embodiments. The reporter module 2219 may periodically or at dynamically set times get information indicating the WTRUs/devices 102 associated with the wireless network, and may report the WTRUs/devices 102 to the cloud (e.g., the CBNS server 2270), for example, using a cloud client 2220. The CBNS server 2270 may return a list of any WTRUs/devices 102 to be removed from the network. For each WTRU/device 102 in the returned list, the WTRU/device 102 may be removed from the network by sending a deauthenticate frame and/or the WTRU/device 102 may be removed from a whitelist using the firewall 2222. In a Linux OS, the hostapd daemon may be used to get the associated devices and send the deauthenticate and/or disassociation frames.

Referring to FIG. 25, at 2510, the reporter module 2219 may wait a period of time after sending an associated device report to send the next report. After waiting the period of time, at 2520, the reporter module 2219 may send the next associated device report (e.g., indicating WTRUs/devices 102 that are associated with the wireless network) to the CBNS server 2270. At 2530, the reporter module 2219 may wait for a response from the CBNS server 2270. At 2540, the reporter module 2219 of the CBNS WiFi router 2210 may determine from the response whether any WTRUs/devices 102 are to be or are not to be associated with the network (e.g., based on a report from the CBNS server 2270 of the WTRUs/devices 102 that are to be or should be associated with the wireless network and/or WTRUs/devices 102 that are not to be or should not be associated with (e.g., disassociated from) the wireless network). If no WTRU/device 102 is to be disassociated from the wireless network, processing moves to 2510. If one or more WTRUs/devices 102 are to be disassociated from the wireless network, processing moves to 2550, 2560 and 2570 such that for each WTRU 102 that is to be disassociated, the WTRU 102 may be deauthenticated at 2550, the response cache may be updated to "N" for the WTRU/device 102 at 2560 and/or the WTRU/device 102 may be removed from the whitelist at 2570. After 2570, processing may move to 2540.

Representative Cloud Client Module

The cloud client module 2220 may handle communications (e.g., all communications) to the cloud server (e.g., CBNS server 2270) via a secure RESTful/JSON API.

Representative Domain Whitelister Module

The Domain Whitelister module 2223 may implement a DNS proxy that may whitelist the resolved addresses of domains (e.g., all domains) in a specified list. This may be useful as some domains may resolve to different address based on time and location. In certain representative embodiments, this process may be used (e.g., only used) for WTRUs/devices 102 running in the captive portal. Domains used in the captive portal may be or should be whitelisted.

Representative Firewall

The firewall 2222 may provide functions to add and/or to remove WTRUs/devices 102 from the firewall whitelist. A whitelisted WTRU/device 102 may access the Internet 2250, and whereas a WTRU/device 102 that is not whitelisted may be redirected to the captive portal.

Representative HTTP Redirector Module

The HTTP redirector module 2221 may intercept HTTP requests to domains, which are not whitelisted, or from devices, which are not whitelisted, and may return HTTP redirect responses to the captive portal URL on the cloud server 2270.

Figure 26:
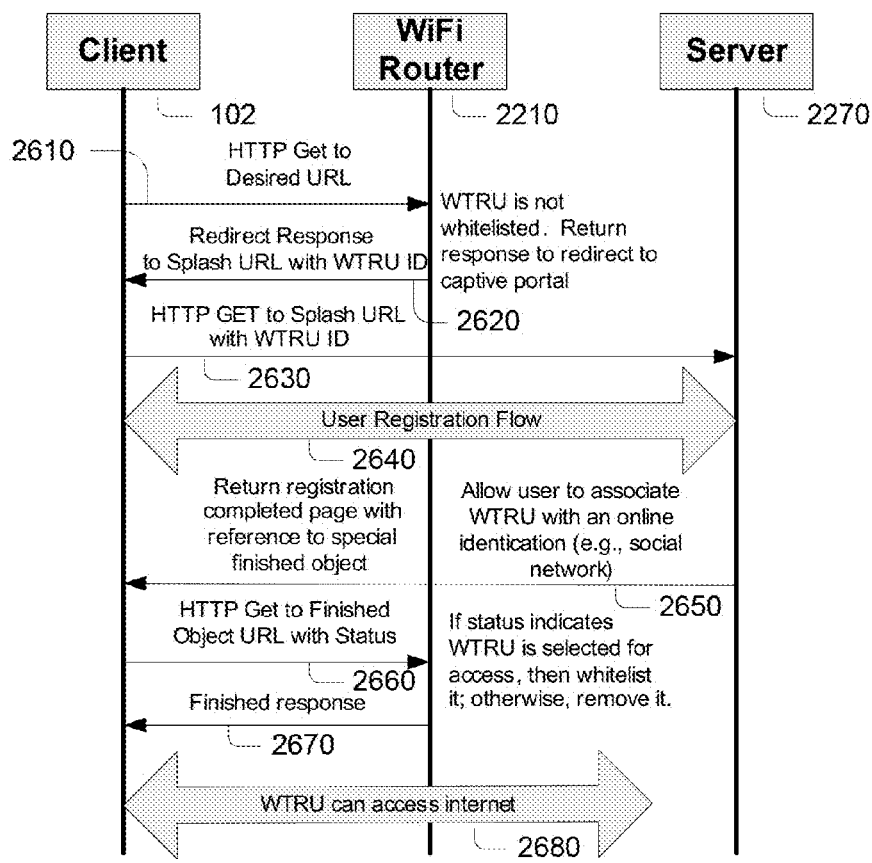
FIG. 26 is a diagram illustrating a procedure for redirecting a new client to the captive portal to register the new client and give the new client access to the Internet.

FIG. 26 is a diagram illustrating a procedure 2600 for redirecting a new client to the captive portal to register and given access to the Internet 2250. The client device (e.g., the WTRU 102) may be configured for the hidden network. After associating to the network for the first time, any HTTP requests from the client device 102 may be redirected to the captive portal splash page. The intercepted or desired URL may be saved. If the client device 102 was already registered and selected, the client device 102 may be given direct access to the Internet 2250 (e.g., immediate access to the Internet 2250). The HTTP redirector module 2221 of the CBNS WiFi router 2210 may check with the cloud server (e.g., CBNS server 2270) to determine if a client device (e.g., the WTRU 102) is to be or should be whitelisted. If the client device 102 is to be or should be whitelisted, the CBNS WiFi router 2210 or HTTP redirector module 2221 of the CBNS WiFi router 2210 may whitelist the client device 102 and may return a redirect to the desired URL. If the client device 102 is not to be or should not be whitelisted, the user may interact with the cloud server 2270 (e.g., directly with the cloud server 2270) to register. The HTTP requests to the cloud server 2270 may be whitelisted so that the requests are not intercepted. The client device identification (e.g., the MAC address) may be included by the CBNS WiFi router 2210 in the request for registration. During registration, the client device 102 may be associated with an online identification (e.g., (1) a social network identity such as a Facebook ID, or a Linked-In ID, (2) a credit card ID, (3) a corporate ID, and/or any other unique online ID, among others). After registration is complete, the last web page may include or contain a link to the intercepted URL and/or a link to resource referred to as the finished object.

The client device 102 may load the finished object from the CBNS WiFi router 2210 and may signal the CBNS WiFi router 2210 that the client device 102 may be removed or whitelisted based on the cloud selection logic. It is contemplated that the client device 102 may be whitelisted and may access the Internet 2250 directly. If a device (e.g., the client device 102) was not selected, a web page may indicate that the device 102 is to be removed from the network. The device 102 may be disconnected the next time the reporter module 2219 runs or executes. If the cloud server 2270 cannot be reached, a web page indicating this failure state may be served via the captive portal.

Referring to FIG. 26, at 2610, the client device (e.g., WTRU) 102 may provide an HTTP Get (e.g., a Get command) to a desired URL. The WiFi router 2210 may receive the HTTP Get and, at 2620, if the WTRU 102 is not whitelisted, the WiFi router 2210 may return a response to redirect the WTRU 102 to a captive portal (for example, associated with a server (e.g., the CBNS server 2270)) with a parameter indicating the client device's MAC address. At 2630, the client device 102 may send to the server (e.g., having the captive portal) a HTTP Get to a splash URL with a parameter indicating the client device's MAC address. At 2640, the client device 102 and the CBNS server 2270 may communicate to enable user registration. At 2650, the CBNS server 2270 may return a registration completed page with a reference to a finished object (e.g., a special finished object). At 2660, an HTTP Get may be sent from the client device 102 to the Finished Object URL via the CBNS WiFi router 2210 and may include or indicate a status. At 2670, a finished response may be sent from the WiFi router 2210 to the WTRU 102. If the status indicates that the client device (e.g., the WTRU 102) is selected for access, the WTRU 102 may be whitelisted and, otherwise the WTRU 102 may be removed from the whitelist.

If the status indicates that the client device (e.g., the WTRU 102) is selected for access to the network, at 2680, the WTRU 102 may access the Internet 2250.

Representative CBNS M2M Use Case

CBNS may be used to identify and connect devices, such as machine-to-machine (M2M) devices and/or user-to-users or users to a network. Users may manually configure devices (e.g., WiFi devices) with their SSID/Passkey. CBNS may enable or allow for much easier configuration of M2M devices, and may reduce the price of hardware (HW) by removing any components that are used (e.g., only used or needed) for configuration (e.g., a USB port). For example, a user may buy, rent or use a new WiFi-enabled device (e.g., scale, thermostat or other consumer product, among others). The user may power-up the scale, thermostat or other consumer product in his home for first time. The scale, thermostat or other consumer product may associate with the CBNS AP and may request use of a network. The user may receive and/or may get a notification that the WiFi-enabled device (such as the scale) wants or desires to use the network. The user may approve or disapprove the exposure of the network to the WiFi-enabled device for connection of the device to the network. For example, the scale may be given exposure to the network and/or eventually provided a connection.

In certain representative embodiments, a neighbor may use CBNS and the CBNS may determine which CBNS network to use for particular devices. For example, the user may put an AP in a device discovery mode. The AP may accept (e.g., may only accept) requests from devices when in this mode. The AP may exit the device discovery mode: (1) after a predetermined period of time; (2) after a predetermined period of time after accepting a device; and/or (3) after accepting a single device.

In certain representative embodiments, a user may configure the AP for a device, a device class and/or a device service. The user may link a CBNS identity server with the device, for example, when subscribing to a related service. The service may make any of their devices friends at first, then may associate device with owner/AP afterwards. In certain representative embodiments, if a neighbor causes interference with the CBNS procedures, the user may get feedback (e.g., immediate feedback) that their device did not associate correctly.

Representative Procedures for Minimally Modified Devices

Various procedures may be implemented for devices with some modification (e.g., minimal modification). In certain representative embodiments, the procedures may still keep the connection logic in the cloud and may emphasize enhanced security.

Virtual Home Networks for Visiting Devices

Figure 27:
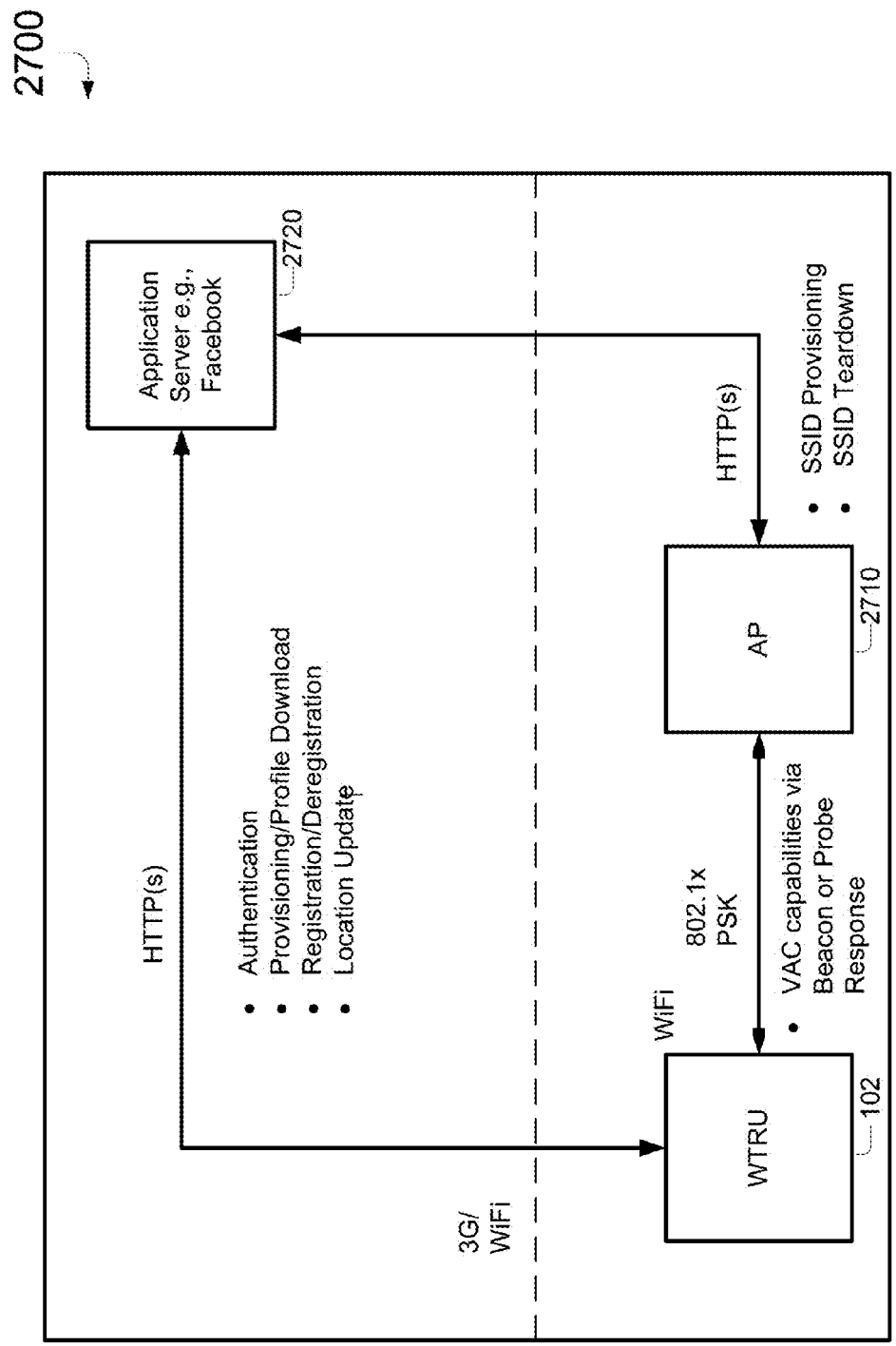
FIG. 27 is a block diagram of various system components of a 3G/WiFi system.

FIG. 27 is a block diagram of various system components of a WiFi system 2700.

Referring to FIG. 27, the WiFi system 2700 may include a WiFi AP 2710 and an application server 2720. The WTRU 102 may communicate with the WiFi AP 2710 via an 802.1X protocol and the WiFi AP 2710 and application server 2720 may communicate via an HTTP protocol. HTTP commands may be used between the application server 2720 and the WTRU 102 for functions/procedures such as: (1) authentication; (2) provisioning; (3) profile download; (4) registration; (5) deregistration and/or (6) location update, among others. HTTP commands may be used between the WiFi AP 2710 and the application server 2720 for functions/procedures such as: (1) SSID provisioning and/or (2) SSID teardown, among others. WiFi may be used between the WiFi AP 2710 and the WTRU 102 for functions/procedures such as: (1) preshared keys (e.g., 802.1x PSKs) and/or (2) VAC capabilities (e.g., via Beacon and/or Probe Responses), among others.

Figure 28:
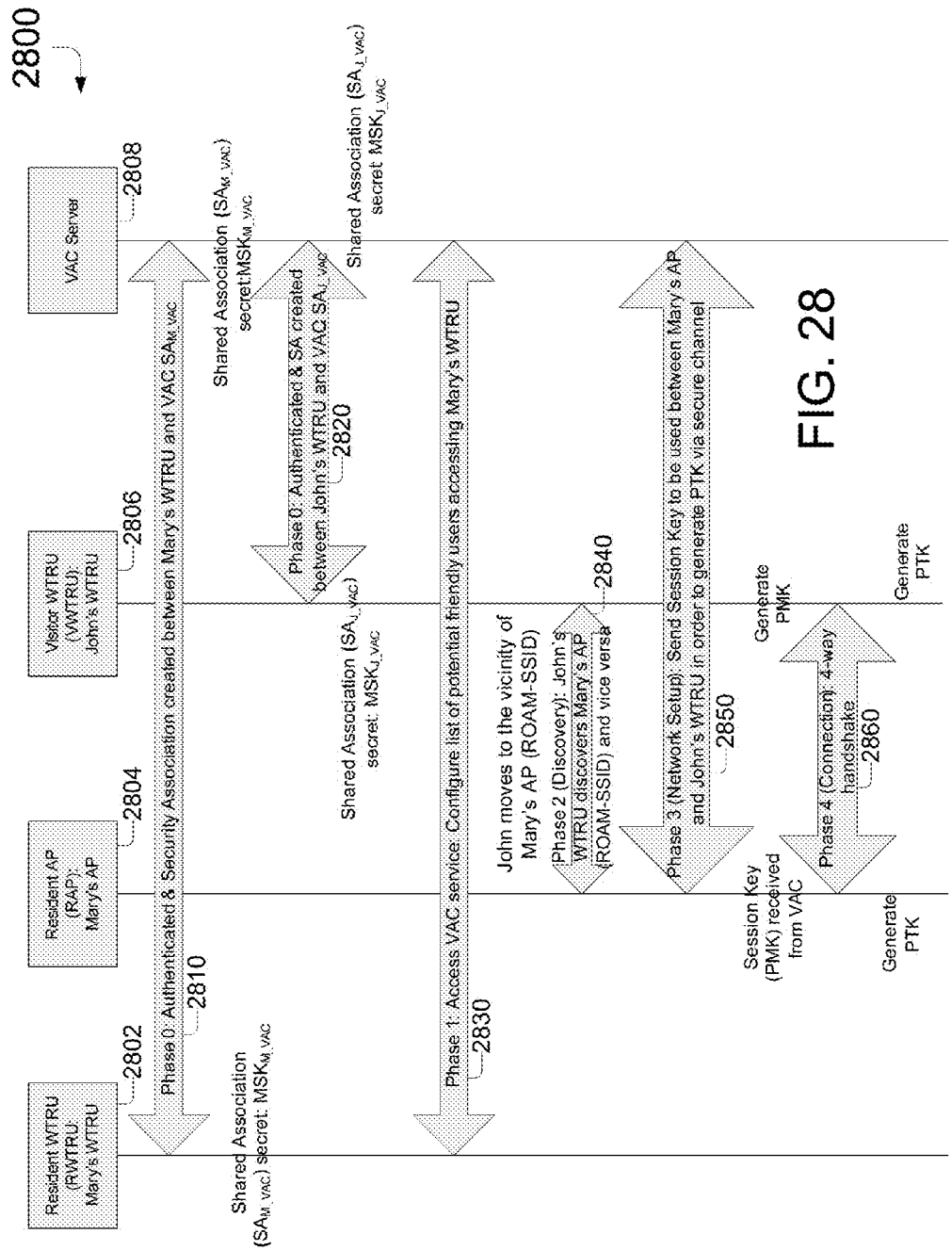
FIG. 28 is a diagram of a basic call flow for secure connection to a visitor network.

FIG. 28 is a diagram of a basic call flow 2800 for secure connection to a visitor network.

Referring to FIG. 28, the basic call flow 2800 may include a plurality of phases (e.g., phases 0 though phase 4). At 2810, a resident WTRU (RWTRU) 2802 of Mary may be authenticated and a security association ($SA_{M\_VAC}$) may be created between the RWTRU 2802 and an application server and/or other server such as a VAC server 2808 (e.g., which may provide a certain service that a requester uses and that has with an identity associated with the requester) with a shared Long-Term Secret (LTS). A session-specific key may be derived out of the Security Association based on the Long-term Secret that may be shared between Mary's WTRU (e.g., the RWTRU 2802) and the VAC server 2808. The session-specific key, for example a master session key ($MSK_{M\_VAC}$) may be derived for use between the RWTRU 2802 and the VAC server 2808, (e.g., as a result of or as a part of a successful authentication or mutual authentication of the RWTRU 2802 of Mary to the VAC server 2808. In certain representative embodiments, the $MSK_{M\_VAC}$ may be derived by the VAC server 2808 and provided to the RWTRU 2802 of Mary. In other representative embodiments, the derived shared session keys may be derived in a format suitable for a WPA2-PSK passphrase based key derivation function (e.g., PBKDF2) such that the passphrase may be communicated to the RWTRU 2802 of Mary and/or the VAC server 2808 from which the MSK may be derived. A passphrase may be used interchangeably with the MSK in the following descriptions. In certain representative embodiments, the RWTRU 2802 of Mary may be authenticated to the VAC server 2808 using a public key certificate associated with the RWTRU 2802 of Mary and the session specific $MSK_{M\_VAC}$.

At 2820, a visitor WTRU (VWTRU) 2806 of John may be authenticated based on a LTS that is shared between the VWTRU 2806 of John and the VAC server 2808 and a security association ($SA_{J\_VAC}$) may be created between the VWTRU 2806 and the VAC server 2808. A master session-specific master session key ($MSK_{J\_VAC}$) may be provided or derived between them. In other representative embodiments, the derived shared session keys may be derived in a format suitable for the WPA2-PSK passphrase based key derivation function (e.g., the PBKDF2) such that the passphrase may be communicated to the VWTRU 2806 and/or the VAC server 2808. In certain representative embodiments, the VWTRU 2806 may be authenticated to the VAC server 2808 using a public key certificate associated with the VWTRU 2806 of John and the session specific $MSK_{J\_VAC}$.

At 2830, Mary using RWTRU 2802 may configure a list of potentially friendly users by accessing information on the VAC server 2808. John and the VWTRU 2806 may move into the vicinity of the RAP 2804 of Mary (e.g., resident AP (RAP) 2804) (e.g., within the range of a ROAM-SSID network associated with RAP 2804). At 2840, the VWTRU 2806 and the RAP 2804 may discover each other. At 2850, the VAC server 2808 may send, via a secure channel, a session key (e.g., a pairwise master key (PMK)) to the RAP 2804 of Mary and/or the VWTRU 2806 of John, for example, to be used between the RAP 2804 and the VWTRU 2806. In certain representative embodiments, the VWTRU 2806 may derive the PMK from the $MSK_{J\_VAC}$ in lieu of or in addition to receiving the PMK from the VAC server 2808 in order to generate a pairwise transient key (PTK). For example, at 2860, the RAP 2804 may receive the session key (e.g., PMK) from the VAC server 2808 and may generate a PTK and the VWTRU 2806 may receive the session key (e.g., PMK) and/or may generate the session key (PMK) using the shared secret $MSK_{J\_VAC}$ and, then, may generate the PTK using the PMK and/or to enable a four way handshake for connection of the VWTRU 2806 via the RAP 2804. Security of the communications between the RAP 2804 and VWTRU 2806 is achieved through the generation of the PTK. Also, an implicit mutual authentication between the RAP 2804 with the VWTRU 2806 is achieved. Since the VAC server 2808 does not know certain information used in the Key Derivation Function (KDF) to derive the PTK, the VAC server 2808 may not be able to decrypt information encrypted using the PTK and sent between the RAP 2804 and the VWTRU 2806.

For example, with reference to FIGS. 27 and 28, a user may wish to access a WiFi AP belonging to a friend the user is visiting and/or an Enterprise network (e.g., a home or office network). Although this example is described for two friends (e.g., John and Mary), who share a common application service such as Facebook, it is illustrative and expandable to other scenarios including access to Enterprise networks and/or WiFi hotspots.

As another example, John may wish to setup his smartphone device for secure automated access to WiFi services at his friend's homes and most places John visits (e.g., regularly visits). Instead of manually configuring the networks, John may go to Facebook to setup a network profile.

Facebook may provide John with a connectivity service (e.g., wherever John goes) and may provide authentication information not only for the networks John connects to at home but also when John is traveling so that John may gain secure, seamless and automated access to any local WiFi service.

Although FIG. 28 may provide for the use of various keys (passphrases, MSKs, PMKs and/or PTKs) to provide access from the VWTRU 2806 to the ROAM-SSID network associated with the RAP 2804, it is contemplated that the 4-way handshake procedure may be used to establish a service between associated (e.g., friendly, contractual and/or, business) entities, for example, to use web services, to access/use particular resources (printers, equipment, devices and/or stored content thereon, among others) and/or other services that may be authorized via the VAC server 2808.

Representative Initial Setup Process

To secure access to John's home network, John may access Facebook via a Web browser on his computer and may log in to Facebook. A HTTPS connection may be established between John's computer and Facebook. Upon successful authentication, a secure channel may be setup between John's computer and Facebook. John may be navigated to the authenticated page. John may go to the "Network Setup" profile settings to provision network information such as, for example, the SSID, the type of authentication procedure to use, a passphrase, and/or security keys, among others for the various networks John wishes to access on a routine basis. The provisioning may include parameters (e.g., all parameters) for John's home network HOME-SSID, including a passphrase if the HOME-SSID uses pre-shared key (WPA2-PSK) based access, an enterprise network (ENTERPRISE-SSID) and/or other pre-configured network settings such as a roaming network (ROAM-SSID). The roaming network may serve, in the visited network, to notify John's presence and/or for requesting connection service, as a communication channel between the VWTRU 2806 of John and Facebook to obtain access configurations and derive dynamic keys used in the visited network, and/or as a single SSID with a unique per user, per session key, which may provide enhanced security over a plain IEEE 802.11 WPA(2)-PSK procedure. John may use the derived dynamic keys and/or the single SSID for access to his friends WiFi APs, for example, when John visits (e.g., without interfering with other users). After completing the profile page, John may click on "Download Configurations" and the Facebook server may securely send the configured WiFi list to John's computer, which may securely configure the SSID settings on his home AP. In certain representative embodiments, the secure configuration of the SSID settings on John's home AP may be done by the Facebook server instead of by John's computer or smartphone.

The Facebook application on the VWTRU 2806 of John may be sent the new network SSID configurations. If the Facebook application is not activated on VWTRU 2806, Facebook may schedule a download when John launches (e.g., next launches) Facebook on the VWTRU 2806. The VWTRU 2806 may identify John's home AP and may automatically connect using the HOME-SSID configuration.

In certain representative embodiments, John may have displayed the downloaded and configured WiFi list and may have manually selected the HOME-SSID from the WiFi list for connection.

Through the configuration and provisioning, both Facebook and John's AP may possess the same security key (e.g., a LTS or a derivative of the LTS), which may be used to establish a secure connection between the two parties (e.g., Facebook and John's AP. This security key may have an associated key lifetime according to policies set by John and/or Facebook. The security key may be derived based on an existing (e.g., fresh) security association.

In one example, John may wish to ensure that John has the highest security (e.g., RSNA/WPA2) on his home network such that unique session keys may be established for users (e.g., every user) on John's network. The unique session keys may be established through the establishment of a unique security association between a user/device combination and Facebook. An application layer authentication (or another authentication procedure, such as Extensible Authentication Protocol (EAP) may be utilized to generate the security association and a common set of keys to facilitate (e.g., later facilitate) the generation of session keys. John's configuration setup may have included setting up of policies, which may dictate the provisioning of new session keys every time John connects to his home AP. For example, Facebook may facilitate the establishment of a session key to be communicated securely to John's AP to enable a secure channel to be setup between John's AP and the VWTRU 2806 of John (e.g., VWTRU 2806). The channel between John's AP and Facebook may be secured over HTTPS through an authentication and secure channel setup procedure. Other mechanisms to secure the channel between John's AP and Facebook such as IPSec or secure sockets may also be used.

After the connection has been successfully established, the Facebook application may update John's status by logging his current location along with the registration request/result including or containing the SSID and/or BSSID and/or IP address of John's home AP and VWTRU 2806 of John on the Facebook server. If this is the first time John is attaching to his home network, if John had not supplied his AP's MAC address or the MAC address of the VWTRU 2806 earlier, John may be requested or asked to verify one or more of these MAC addresses and may be requested to confirm the configuration update for John's HOME-SSID WiFi profile. John may confirm the update. In certain representative embodiments, if EAP is used, a mechanism for authentication of the MAC address of VWTRU 2806 of John may be carried out via EAP messages.

John's devices may be setup with a ROAM-SSID (e.g., in a similar manner) to enable John to visit John's friends and automatically attach to their networks. When John leaves his home to visit his friend Mary, the Facebook application may update his log history to include the deregistration from John's home AP. Mary may go through a similar setup of the RAP 2804.

Representative Discovery Process

John may be visiting John's friends home (e.g., Mary's home) and may desire or wish to connect to the RAP 2804 of Mary. To gain access, John may have already pre-configured the ROAM-SSID setting on the VWTRU 2806 of John (which is the device that John desires to setup a secure session with the RAP 2804 of Mary), for example, subject to Mary's consent (e.g., pre-established consent) using a friend association. The consent may be implicit or explicit. In certain representative embodiments, an app (such as a Facebook app) on the VWTRU 2806 of John may perform the pre-configuration of the ROAM-SSID in the VWTRU 2806 of John with, for example, the aid of the Facebook server.

The VWTRU 2806 of John may scan for beacons and may identify the ROAM-SSID, as being available. The Facebook application or a connection manager on the VWTRU 2806 of John may extract the available SSIDs and/or the associated BSSIDs. If the beacons include the BSSID of an AP, the BSSID may be used to determine if the AP belongs to Mary (e.g., whether the AP is the RAP 2804 of Mary). If the AP is determined to be the RAP 2804 of Mary, appropriate measures may be taken to connect with the RAP 2804. If the AP is not the RAP 2804 of Mary, the connection procedure to connect the VWTRU 2806 of John with the RAP 2804 of Mary may be skipped. In certain representative embodiments, the VWTRU 2806 may be configured with a list of APs and their associated BSSIDs.

The VWTRU 2806 of John may attempt to connect with the ROAM-SSID network on the RAP 2804 of Mary. The RAP 2804 of Mary may recognize that a connection is being attempted to Mary's network by John.

Mary may filter out those connection attempts based on MAC addresses of the WTRU and only those WTRUs that have been authorized to connect may be processed. In certain representative embodiments, the RAP 2804 of Mary may be pre-provisioned with the MAC address of the VWTRU 2806 of John and/or a list of MAC addresses associated with devices that are authorized by Mary.

The RAP 2804 of Mary may reach out to (e.g., request information from) Facebook to facilitate authentication and/or connection with the VWTRU 2806 of John. The Facebook server may perform a search among John's friends to identify the RAP 2804 of Mary and Mary's Facebook identifier (e.g., Facebook ID).

In certain representative embodiments, the VWTRU 2806 of John may use another channel such as an existing cellular link to connect with Facebook to facilitate connection with the RAP 2804 of Mary.

Representative Decision Process

Mary may set up her friends' permission policies to allow John automatic access to the RAP 2804 of Mary. In certain representative embodiments, if John was not provisioned for automatic access, the Facebook application may ask John if he desires to send a message to Mary to request permission to connect to the RAP 2804 of Mary. Upon receiving the message, Mary may allow or disallow access to John. Mary may specify other connection parameters such as, for example, a length of time John may connect and/or bandwidth limitations of the connection. At all times, Mary may act as a policy decision point and may have control to allow or disallow John authorization to access Mary's network. If Mary allows the connection to be setup, the attachment procedure may proceed.

Representative Network Setup Process

Upon consent from Mary (e.g., preconfigured or otherwise), the Facebook server having authenticated John, may use the secure association to dynamically derive a session key shared by the VWTRU 2806 of John and Facebook. In certain representative embodiments, the Facebook server may send the derived session key to the VWTRU 2806 of John. Facebook may securely push the session key to the RAP 2804 of Mary through the previously setup secure HTTPS connection between Facebook and the RAP 2804 of Mary or using other secure channels between the RAP 2804 of Mary and the Facebook server.

In certain representative embodiments, the VAC server 2808 may be owned or operated by a social networking owner or operator. For example, the Facebook server herein may be owned or operated by Facebook and may include some or all of the functionality disclosed herein for the VAC server 2808. "Facebook server" and "VAC server" are sometimes used interchangeably.

It is contemplated that variations are possible for the setup of the network that may involve authentication and generation of session keys in different ways and using single and/or multiple SSIDs in the visited network. In certain representative embodiments, mechanisms that leverage a pre-established security association may be implemented to dynamically establish and/or verify possession of unique session keys. The various mechanisms may include any of: (1) mutual authentication using a procedure such as EAP; (2) mutual authentication using WPA(2)-PSK; (3) using public key certificates; (4) password and/or (5) using a pre-existing security association between John and Facebook, among others.

In certain representative embodiments, procedures may include mutual authentication using a procedure such as EAP to derive session keys dynamically, which may be transported to the RAP 2804 of Mary by Facebook for the RAP 2804 of Mary and the VWTRU 2806 of John may then complete a 4-way handshake with the RAP 2804 of Mary and connect securely.

Figure 29:
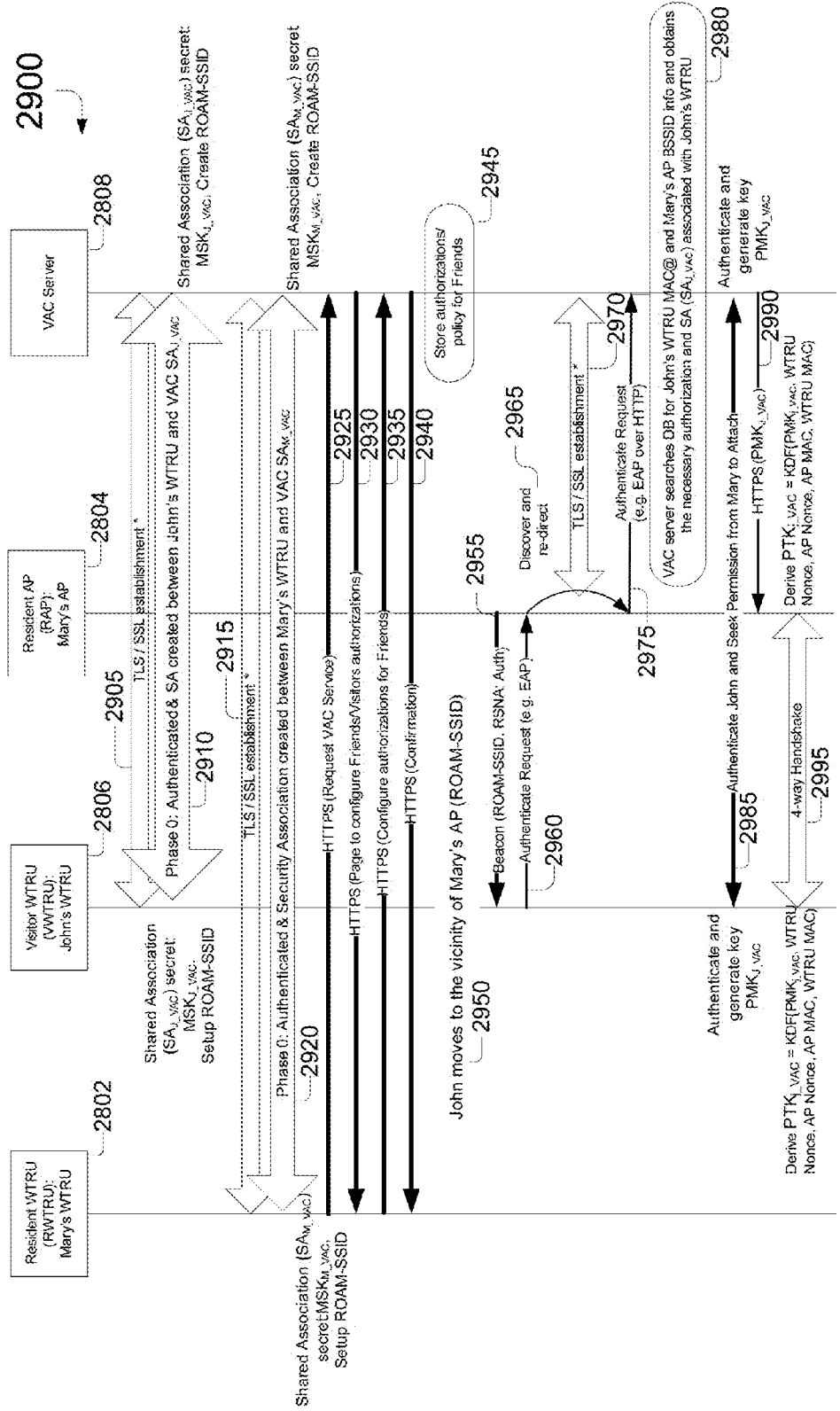
FIG. 29 is a diagram illustrating authentication and secure connection to a visitor network.

FIG. 29 is a diagram illustrating a procedure for secure authentication and connection setup of the VWTRU 2806 to a visitor network. Referring to FIG. 29, the procedure 2900 illustrates a variant of the EAP mutual authentication, which may use single SSID (e.g. ROAM-SSID), and the WPA(2)-PSK authentication with a unique key per user for the key generation process, and which may use Facebook to deliver a session key shared by John and Facebook to the RAP 2804 of Mary. The RAP 2804 of Mary may perform WPA(2)-PSK based authentication. This variant, which may provide an independence of the security association from others who share the RAP 2804 of Mary, may eliminate the use of multiple SSIDs in the visited network, may leverage the trust that John has in Facebook to facilitate a secure session setup, and may be supported by protocols of the baseline WPA(2)-PSK (e.g., there may be no requirement for devices to support protocols beyond the baseline WPA(2)-PSK). In certain representative embodiments, the master session keys (MSKs) and/or pairwise master keys (PMKs) may be generated by using the pre-configured passphrase as an input to a Key Derivation Function (KDF) (e.g., similar in approach to the generation of pre-shared key (MSK) from a passphrase using the PBKDF2 key generation function). For example, the derived session keys may be formatted as a hexadecimal alphanumeric string and encapsulated, as a passphrase. The passphrase may be delivered to the WTRU (for example, in the network configuration information which may include the SSID etc.) to subsequently generate the MSK. Facebook may generate an identical MSK and deliver the MSK or passphrase (including network information) to the AP. If the passphrase is sent then the AP may derive the MSK in a similar manner to that of the WTRU.

For example, at 2905, a secure connection may be established via Transport Layer Security (TLS)/Secure Sockets Layer (SSL) between the VWTRU 2806 and the VAC server 2808. At 2910, the VWTRU 2806 of John may be authenticated and a security association ($SA_{J\_VAc}$) may be created between the VWTRU 2806 and a VAC server 2808. If John or the VWTRU 2806 is authenticated, a shared secret ($MSK_{J\_VAC}$) may be derived between the VWTRU 2806 and the VAC server 2808 or provided by the VAC server 2808 to the VWTRU 2806. A ROAM-SSID may be created or determined by the VAC server 2808 and may be sent to the VWTRU 2802 to enable network setup. At 2915, a secured connection (e.g., via TLS/SSL) may be established between the RWTRU 2802 and the VAC server 2808. At 2920, the RWTRU 2802 of Mary may be authenticated and a security association ($SA_{M\_VAC}$) may be created between the RWTRU 2802 and the VAC server 2808. If Mary and/or the RWTRU 2802 is authenticated, a shared secret ($PSK_{M\_VAC}$) may be provided between the RWTRU 2802 and the VAC server 2808. In certain representative embodiments, the $MSK_{J\_VAC}$ may be derived on both the VWTRU 2806 and the VAC server 2808. The ROAM-SSID may also be sent to the RWTRU 2802 to enable network setup. At 2925, the RWTRU 2802 may send a request to the VAC server 2808 for a service (e.g., a VAC service), for example, via a HTTPS protocol (e.g., via a secure connection) to gain access to a friend's network, or any other service. At 2930, the VAC server 2808 may send to the RWTRU 2802 a page to configure authorization for friends/visitors, for example via the secure connection. At 2935, Mary via her RWTRU 2802 may securely configure authorizations for friends (e.g., the VWTRU 2806 of John via a device identifier and/or MAC address, among others). At 2940, the VAC server 2808 may confirm, for example via the secure connection to the RWTRU 2802 the received authorizations for the friends (e.g., one or more particular friends, a group of friends and/or a list of friends, which may be grouped for particular access to a network associated with the RWTRU 2802). At 2945, the VAC server 2808 may store authorizations/policy for the friends. At 2950, the VWTRU 2806 of John may move to the vicinity of the RAP 2804 of Mary (e.g., move into coverage area of the ROAM-SSID network associated with the RAP 2804).

If the RAP 2804 is an open network, at 2955 the RAP 2804 may send a beacon that may include the name of the network (e.g., ROAM-SSID) and the type of authentication used (e.g., Robust Security Network Association (RSNA), or EAP, among others). In certain representative embodiments, the network may be hidden. In such cases, information may be previously provided to the VWTRU 2806 to enable the VWTRU 2806 to send a probe request to the hidden network such that the network responds with a probe response (e.g., with a beacon response). At 2960, the VWTRU 2806 may send an authentication request using for example RSNA or EAP). For EAP, a user may request a connection through the RAP 2804 and may provide an identifier (e.g., a MAC address and/or an identifier of John to the VAC server 2808 and/or any other identifier for the VWTRU 2806). At 2965, the RAP 2804 may discover and redirect the authentication request to the VAC server 2808. At 2970, a secured connection (e.g., via TLS/SSL) may be established. The secure connection 2970 may be created on-demand or may be a persistent connection. At 2975, the authentication request may be sent over or redirected over the secured connection to the VAC server 2808. At 2980, the VAC server 2808 may search a database, memory and/or storage unit at or associated with the VAC server 2808 for the MAC address or other device identifier of the VWTRU 2806 of John and/or the BSSID information and/or IP address of the RAP 2804. The VAC server 2808 may obtain the authorization (e.g., appropriate policies configured by Mary and/or necessary authorization) and SA ($SA_{J\_VAC}$) associated with the VWTRU 2806 of John.

In certain representative embodiments, the RAP 2804 may discover or check a list of friend identifiers and/or friend's WTRU identifiers that it may maintain and/or may lookup or request keys from the VAC server 2808.

At 2985, the VAC server 2808 may authenticate John and may seek permission from Mary for the VWTRU 2806 of John to attach to the RAP 2804. The authentication may be through direct or alternate channels (3G or other WiFi connection etc). The authentication process at 2985 may be a light-weight authentication process such as One-Round Trip Authentication (ORTA) or EAP-RP or any other light-weight or re-authentication protocol. In certain representative embodiments, the permission may be dynamic by contacting the RWTRU 2802 of Mary or other communications device of Mary for permission and/or the permission may be predetermined based on a friends list from a social network provider, such as Facebook or other business association list provided via the network and/or based on network exposure rules, among others. The session key $PMK_{J\_VAC}$ may be derived from the authentication between the VAC server 2808 and the VWTRU 206 of John. When the authentication is not carried out, the session key, $PMK_{J\_VAC}$ may be derived from the $MSK_{J\_VAC}$ at the VAC server 2808 and John's VWTRU 206 or generated at the VAC server and communicated to John's VWTRU 2806.

Over a secure connection, at 2990, the $PMK_{J\_VAC}$ may be sent to the RAP 2804 of Mary (e.g. using the secure connection established at 2970). The session key $PMK_{J\_VAC}$ may be used between the VWTRU 2806 of John and the RAP 2804 of Mary. The PTK at the RAP 2804 and at the VWTRU 2806 may be derived based of a KDF using the $PMK_{J\_VAC}$, a WTRU nonce, an AP nonce, the RAP MAC address and/or the VWTRU MAC address, among others. At 2995, a 4-way handshake may occur based on a derived $PTK_{J\_VAC}$. After the 4-way handshake, the VWTRU 2806 may be attached to the RAP 2804 and may be provided with network services from the RAP 2804, which may be based on the permission provided by Mary. For example, Mary may provide complete access to all service to the VWTRU 2806 or only a portion of such service (e.g., printing, storage, internet connection, and/or certain web-based services, among others).

In certain representative embodiments, Mary may setup classes of permissions for different groups of visitors such that a particular set of visitors may be provided the same services via the RAP 2804.

Figure 30:
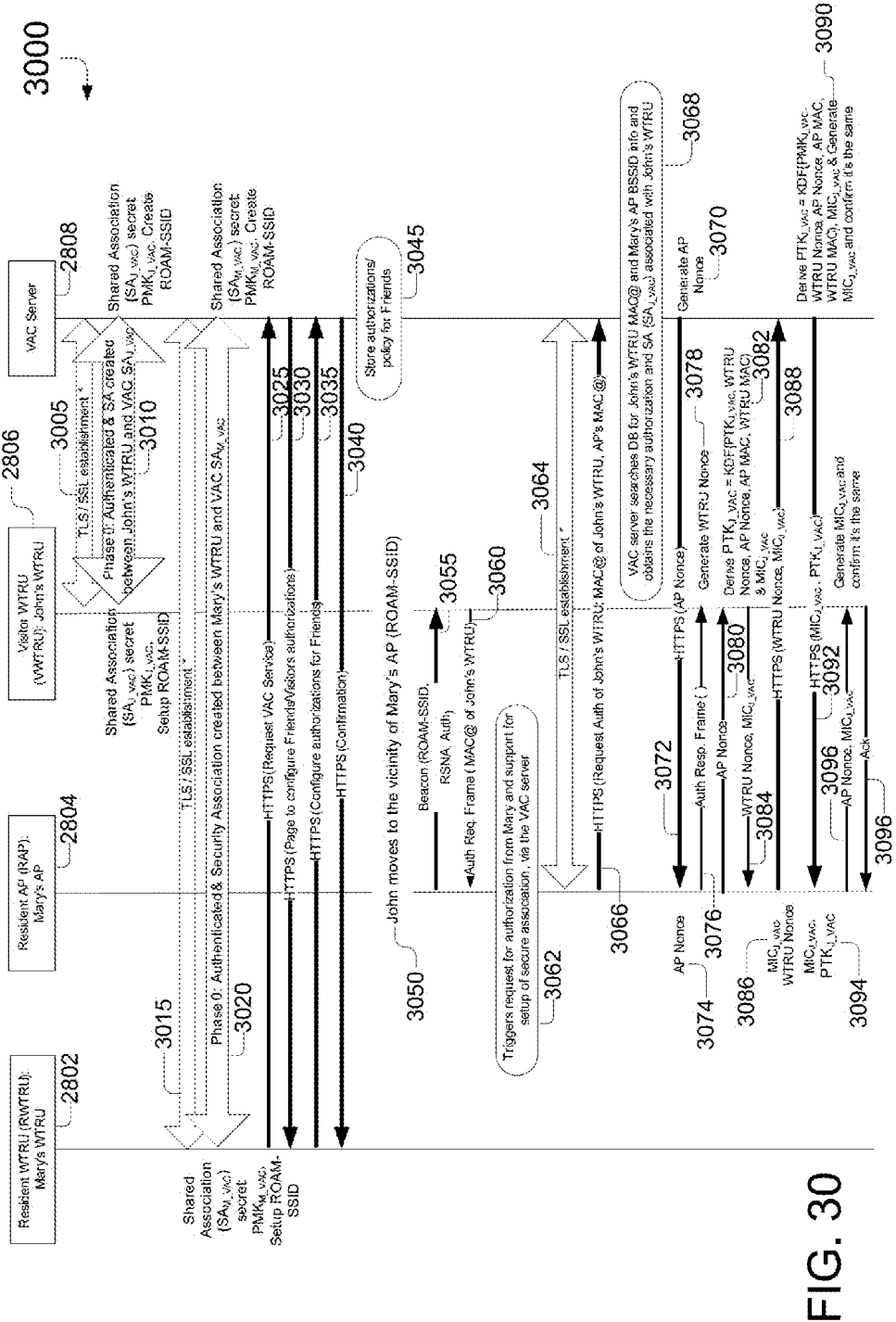
FIG. 30 is a diagram illustrating authentication and secure sessions at a visitor network using WPA(2)-PSK.

FIG. 30 is a diagram illustrating a procedure for authentication and secure sessions setup of the VWTRU 2806 to a visitor network using WPA(2)-PSK. Referring to FIG. 30, the procedure 3000 illustrates mutual authentication using WPA(2)-PSK between Facebook (e.g., the Facebook server 2808) and the VWTRU 2806 of John to derive session keys (e.g., MSK, and PMK) and perform a 4-way handshake, with the assistance of the RAP 2804, to generate a PTK, which may be transported securely to the RAP 2804 of Mary by Facebook. This approach may exhibit the same or similar properties as mutual authentication using EAP above, may use a split protocol between the AP and Facebook and may eliminate exposure of the keys (MSK, and PMK), shared between the VWTRU 2806 of John and Facebook, to the visited AP. Since the keys MSK and PMK are the result of a single authentication/association, they are used interchangeably herein.

In WPA2-PSK, the PMK may be set to MSK, however it is contemplated that in some representative embodiments a unique PMK per user per session may be implemented.

The MSK/PMK may be generated at the VAC server 2808 and at the VWTRU 2806 using similar procedures, functionality, and/or means such as using a password, certificates and/or pre-existing security keys along with random values (e.g., nonces) generated at each or on one of the entity (e.g., the Facebook server and/or the VWTRU of John, as inputs to the KDF. In certain representative embodiments, the derived shared session keys may be derived in a format suitable for the WPA2-PSK passphrase based key derivation function, PBKDF2 such that the passphrase and/or derived keys may be communicated by the application on the VWTRU 2806 and then to the processor (e.g., a WiFi processor) of the VWTRU 2806 and/or used by the VAC server 2808.

In certain representative embodiments, the shared session key (e.g., a MSK and/or a preshared session key) may be generated at the VAC server 2808, after authentication and communicated to the VWTRU 2806.

Although a split protocol (in which processing of the WPA2-PSK protocol is accomplished on the VWTRU 2806 and the RAP 2002 in a split manner with the VAC server 2808) is illustrated, in certain representative embodiments, changes at the VWTRU 2080 may be minimized, for example changes at the WiFi modem, and the conventional WPA2-PSK authentication procedure may be executed on the VWTRU 2806. For example, passphrase based SSID info may be sent from the application layer of the VWTRU 2806 to the WiFi modem to enable it to run the conventional WPA2-PSK protocol without any changes. In certain representative embodiments, the MSK may be communicated to the WiFi modem, in lieu of or in addition to the passphrase.

For example, at 3005, a secure connection may be established, via TLS/SSL, between the VWTRU 2806 and the VAC server 2808. At 3010, the VWTRU 2806 of John may be authenticated and a security association ($SA_{J\_VAC}$) may be created between the VWTRU 2806 and the VAC server 2808. If John and/or the VWTRU 2806 of John are authenticated, a shared secret ($MSK_{J\_VAC}$) may be derived between the VWTRU 2806 and the VAC server 2808. In certain representative embodiments, the $MSK_{J\_VAC}$ may be derived by the VAC server 2808 or provided to the VWTRU 2806 of John by the VAC server 2808. A ROAM-SSID, which may be used to setup a network, may be created and/or determined by the VAC server 2808 and may be sent to the VWTRU 2806. At 3015, a secure connection (e.g., via TLS/SSL) may be established between the RWTRU 2802 and the VAC server 2808. At 3020, Mary and/or the RWTRU 2802 of Mary may be authenticated and a security association ($SA_{J\_VAC}$) may be created between the RWTRU 2802 and the VAC server 2808. If a successful authentication was carried out a session key ($MSK_{M\_VAC}$), may be derived between the RWTRU 2802 and the VAC server 2808 or provided to RWTRU 2802 by the VAC server 2808. The ROAM-SSID may also be sent to the RWTRU 2802 to enable network setup. At 3025, Mary using the RWTRU 2802 (e.g., via user input) may send a request to the VAC server 2808 for a service (e.g., a VAC service), for example, via a HTTPS protocol (such as a secure connection to gain access to a friend's network, or any other service). At 3030, the VAC server 2808 may send to the RWTRU 2802 a page to configure authorization for friends/visitors, for example via the secure connection. At 3035, Mary using the RWTRU 2802 may securely configure the authorizations for the friends (e.g., using an identity of John associated with the VAC server 2808 or the VWTRU 2806 of John via a device identifier and/or MAC address, among others). At 3040, the VAC server 2808 may securely confirm the received authorizations for the friends (e.g., one or more particular friends, a group of friends and/or a list of friends, which may be grouped for particular access to the network ROAM_SSID associated with the RWTRU 2802). At 3045, the VAC server 2808 may store authorizations/policy for the friends. At 3050, John using the VWTRU 2806 may move to the vicinity of the RAP 2804 of Mary (e.g., move into coverage area of the ROAM-SSID network associated with the RAP 2804).

If the RAP 2804 is an open network, at 3055, the RAP 2804 may send a beacon that may include the name of the network (e.g., ROAM-SSID) and the type of authentication used (e.g., Robust Security Network Association (RSNA), or EAP, among others). In certain representative embodiments, the network may be hidden. In such cases, information may be previously provided to the VWTRU 2806 to enable the VWTRU 2806 to send a probe request to the hidden network such that the network may response with a probe response (e.g., with a beacon response). At 3060, the VWTRU 2806 may send an authentication request (e.g., authentication request frame using for example RSNA or EAP). For EAP, a user may request a connection through the RAP 2804 and provide an identifier (e.g., a MAC address for the VWTRU 2806). In certain representative embodiments, at 3062, the RAP 2804 may trigger a request for authorization from Mary (e.g., via RWTRU 2802) and may provide support for the setup of a secure association, via the VAC server 2808. At 3064, the RAP 2804 and the VAC server 2808 may establish a secure connection (e.g., via TLS/SSL). At 3066, the RAP 2804 may send an Authorization Request to the VAC server 2808 via the secure connection and indicate one or more of: (1) the VWTRU 2806 of John; (2) a MAC address or other device identifier of the VWTRU 2806 of John and/or a MAC address or other device identifier of the RAP 2804, or John's identity, among others.

At 3068, the VAC server 2808 may search a database, memory and/or storage unit at or associated with the VAC server 2808 for the MAC address or other device identifier of the VWTRU 2806 of John and/or the BSSID information or IP address of the RAP 2804. The VAC server 2808 may obtain the authorization (e.g., appropriate and/or necessary authorization) and SA ($SA_{J\_VAC}$) associated with the VWTRU 2806 of John.

At 3070, the VAC server 2808 may generate an AP nonce. At 3072, the VAC server 2808 may send the generated AP nonce to the RAP 2804 via the secure connection. At 3074, the RAP 2804 may store the received AP nonce. At 3076, the RAP 2804 may send an Authorization Response Frame to the VWTRU 2806. At 3078, the VWTRU 2806 may generate a WTRU nonce. At 3080, the RAP 2804 may send the AP nonce to the VWTRU 2806. In certain representative embodiments, if a side-channel is available, the VAC server 2808 may send the AP nonce directly to the VWTRU 2806. At 3082, the VWTRU 2806 may derive, via a KDF, a $PTK_{J\_VAC}$ based on the WTRU nonce, the AP Nonce, the MAC address of the RAP 2804, the MAC address of the VWTRU 2806 and/or a Message Integrity Code between the VWTRU 2806 and the VAC server 2808 (e.g., $MIC_{j\_VAC}$), among others. At 3084, the VWTRU 2806 may send a message to the RAP 2804 including or indicating the WTRU nonce and/or the $MIC_{j\_VAC}$ among others. At 3086, the RAP 2804 may store the received information (e.g., the WTRU nonce and/or the $MIC_{j\_VAC}$ among others). At 3088, the VWTRU 2806 may send a secure message to the VAC server 2808 including or indicating the WTRU nonce and/or the $MIC_{j\_VAC}$ among others.

At 3090, the VAC server 2808 may derive, via the KDF, the $PTK_{J\_VAC}$ based on the WTRU nonce, the AP Nonce, the MAC address of the RAP 2804, the MAC address of the VWTRU 2806 and/or the $MIC_{J\_VAC}$, among others. At 3092, the VAC server 2808 may send a message to the RAP 2804 including or indicating the $MIC_{j\_VAC}$ and/or the $PTK_{J\_VAC}$ among others. At 3094, the RAP 2804 may store the $MIC_{j\_VAC}$ and/or the $PTK_{J\_VAC}$ among others. At 3096, the RAP 2804 may send to the VWTRU 2806 the $MIC_{j\_VAC}$, among others. At 3098, the VWTRU 2806 may generate the $MIC_{J\_VAC}$ and may confirm that it is the same as the received $MIC_{J\_VAC}$. If so, at 3098, the VWTRU 2806 may generate and send an ACK to the RAP 2804. If the generated $MIC_{J\_VAC}$ is not the same as (e.g., does not match) the received $MIC_{J\_VAC}$. 30, a NACK may be sent to the RAP 2804.

In certain representative embodiments, certain messages herein may be provided via the RAP 2804, which may act as an intermediary. At the end, the check of the MIC may be used to confirm possession of the same keys and may be done at the VAC server 2808 by the RAP 2804 relaying the data to the VAC server 2808.

It is contemplated that the procedure 3000 may be used, for example, when the VWTRU 2806 communicates via the RAP 2804 (e.g., only via the RAP 2804), for example prior to attachment with any network.

Figure 31:
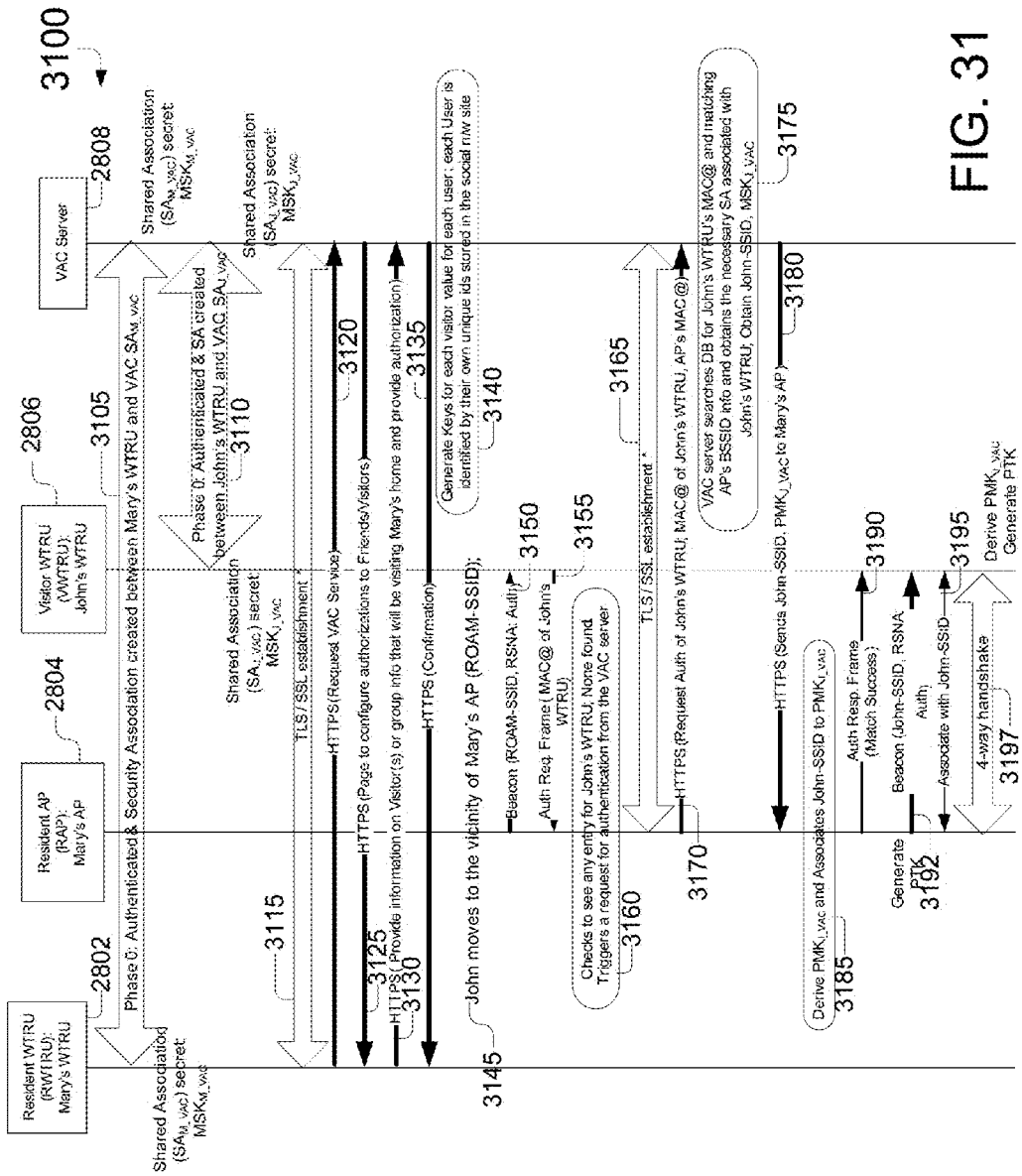
FIG. 31 is a diagram illustrating secure group sessions at a visitor network using WPA(2)-PSK.

FIG. 31 is a diagram illustrating a procedure 3100 for secure user and group sessions at a visitor network using WPA(2)-PSK. Referring to FIG. 31, the procedure 3100 illustrates the use of a pre-existing security association between John and Facebook that may be used to derive session keys (MSK) and to configure a network John-SSID, for John at the RAP 2804 of Mary (e.g., which is transported to the RAP 2804 of Mary by Facebook). John may connect with Facebook through the ROAM-SSID or through an alternate channel (3G or other WiFi connection) to provision the John-SSID and corresponding matching MSK at the RAP 2804 of Mary. The RAP 2804 of Mary and the VWTRU 2806 of John may complete a 4-way handshake and connect securely. Key confirmation of John/John's WTRU and the RAP 2804 of Mary may be determined after the derivation of the PTK and 4-way handshake. A similar process may follow for any of John's family members who may desire or wish to use the John-SSID network configuration.

In certain representative embodiments, the derived shared session keys at a social media provider (e.g., Facebook) may be derived in a format suitable for the WPA2-PSK passphrase based key derivation function, PBKDF2 such that the passphrase may be communicated to the VWTRU 2806 and/or the RAP 2804, which may then derive the MSK using the PBKDF2 function used in WPA2-PSK based authentication. In the following descriptions, the MSK delivered to the VWTRU 2806 and/or the RAP 2804 may be substituted by the passphrase derived in this manner so that either the VWTRU 2806 and/or the RAP 2804 may use the native WPA2-PSK key derivation functions for deriving the MSK Changes at the VWRTU 2806 and/or RAP 2804 may be minimized, for example, to run the conventional WPA2-PSK protocol at the WiFi modem on the VWTRU 2806 and/or RAP 2804. It is contemplated that a passphrase may be sent based on the SSID information from the VAC server 2808 to the application layer of the VWTRU 2806 and/or RAP 2804 and then to the WiFi modem. In certain representative embodiments, the MSK may be communicated by the VAC server 2808 to the VWTRU and/or RAP 2804 and then to the WiFi modem, in lieu of or in addition to the passphrase.

For example, at 3105, the RWTRU 2802 of Mary may be authenticated and a security association ($SA_{J\_VAC}$) may be created between the RWTRU 2802 and the VAC server 2808. If Mary and/or the RWTRU 2802 of Mary are authenticated, a shared secret ($MSK_{M\_VAC}$) may be derived between the RWTRU 2802 and the VAC server 2808. At 3110, John and/or the VWTRU 2806 of John may be authenticated and a security association ($SA_{J\_VAC}$) may be created between the VWTRU 2806 and the VAC server 2808. If John and/or the VWTRU 2806 are authenticated, a shared secret ($MSK_{J\_VAC}$) may be derived between the VWTRU 2806 and the VAC server 2808. In certain representative embodiments, the shared secret may be provided by the VAC server 2808 to the VWTRU 2806. At 3115, a secure connection may be established via TLS/SSL between the RWTRU 2802 and the VAC server 2808.

At 3120, Mary, using the RWTRU 2802 may send a request to the VAC server 2808 for a service (e.g., a VAC service), for example, via a HTTPS protocol (such that a secure connection is established to gain access to a friend's network, or any other service). At 3125, the VAC server 2808 may securely send to the RWTRU 2802 a page to configure authorization for friends/visitors. At 3130, Mary, using the RWTRU 2802 may securely provide information about one or more visitors or one or more groups of visitors that will be visiting Mary's home (e.g., in the vicinity of or in a coverage area of the RAP 2804 of Mary) and may provide authorizations for those visitors or groups. The information and authorizations may include group information, which may allow for particular authorization/permissions of visitors/friends by class and/or group. At 3135, the VAC server 2808 may confirm, for example via the secure connection to the RWTRU 2802, the received authorizations for the friends/visitors (e.g., one or more particular friends, a group of friends and/or a list of friends, which may be grouped for particular access to a network associated with the RWTRU 2802). At 3140, the VAC server 2808 may generate security keys for each visitor value (e.g., each individual visitor or each group of visitors have a unique visitor value or visitor class) for the users (e.g., each user). Each user may be identified by their own unique identifier (ID) and/or MAC address stored, for example, in a social networking site.

At 3145, the VWTRU 2806 of John may move to the vicinity of the RAP 2804 of Mary (e.g., move into coverage area of the ROAM-SSID network associated with the RAP 2804). If the RAP 2804 is an open network, at 3150 the RAP 2804 may send a beacon that may include the name of the network (e.g., ROAM-SSID) and the type of authentication used (e.g., Robust Security Network Association (RSNA), or EAP, among others). In certain representative embodiments, the network may be hidden. In such embodiments, information may be previously provided to the VWTRU 2806 to enable the VWTRU 2806 to send a probe request to the hidden network such that the network may respond with a probe response (e.g., with a beacon response). At 3155, the VWTRU 2806 may send an authentication request (e.g., authentication request frame) using, for example, WPA(2)-PSK, RSNA or EAP. For EAP, a user may request a connection through the RAP 2804 and provide an identifier (e.g., a MAC address for the VWTRU 2806). At 3160, the RAP 2804 may check whether any entry is stored at the RAP 2804 for the VWTRU 2806 of John. If no entry for the VWTRU 2806 is found, a request may be triggered for authentication of the VWTRU 2806 by the VAC server 2808. At 3165, a secured connection (e.g., via TLS/SSL) may be established between the RAP 2804 and the VAC server 2808. At 3170, the RAP 2804 may send an Authorization Request to the VAC server 2808 via the secure connection and may indicate one or more of: (1) the VWTRU 2806 of John; (2) a MAC address or other device identifier of the VWTRU 2806 of John; and/or (3) a MAC address or IP address or other device identifier of the RAP 2804, among others. At 3175, the VAC server 2808 may search a database, memory and/or storage unit at or associated with the VAC server 2808 for the MAC address or other device identifier of the VWTRU 2806 of John and/or the corresponding BSSID information of the RAP 2804. The VAC server 2808 may obtain the SA ($SA_{J\_VAC}$) associated with the VWTRU 2806 of John, a network identifier associated with John (e.g., John-SSID) and/or $MSK_{J\_VAC}$.

At 3180, the VAC server 2808 may send to the RAP 2804 of Mary, the network identifier (e.g., John-SSID) and/or the session key (e.g., $PMK_{J\_VAC}$). At 3185, the RAP 2804 may associate the network identifier of John-SSID to the session key $MSK_{J\_VAC}$ and derive the $PMK_{J\_VAC}$. At 3190, the RAP 2804 may send an Authorization Response Frame to the VWTRU 2806. At 3192, the RAP 2804 may send another beacon that may include the identifier or name of the network (e.g., John-SSID) and the type of authentication used (e.g., WPA(2)-PSK, RSNA, or EAP, among others). The RAP 2804 may derive the $PMK_{J\_VAC}$ from the $MSK_{J\_VAC}$ and generate a PTK using, for example, the $PMK_{J\_VAC}$. At 3195, the VWTRU 2806 may associate with the network John-SSID of the RAP 2804. At 3197, the VWTRU 2806 may generate the PTK using the $PMK_{J\_VAC}$, derived from the $MSK_{J\_VAC}$ and then complete a 4-way handshake with the RAP 2804. In certain representative embodiments, a VAC server may generate a unique MSK (for a shared SSID) that may be shared by visitors (e.g., all visitors) of a family (or group) to Mary's home and may be refreshed (e.g., periodically refreshed). The MSK may be transported to the visitor's WTRU when visiting Mary's home through direct or alternate channels. The MSK may be transported through direct or alternate channels (3G or other WiFi connection) to other visitors to Mary's home. The MSK may be refreshed (e.g., periodically) based on Mary's policies, VAC server policies or a combination thereof and a new PMK may be re-generated. Refresh of the MSK may invalidate previously issued (e.g., all previously issued) keys.

In certain representative embodiments, a common $MSK_1$ may be shared between a family and/or group visiting Mary's home while another common $MSK_2$ may be shared between another family and/or group visiting Mary's home. One $MSK_1$ may be associated with John-Family-SSID (shared by John, John's wife and/or daughter each having their own WTRUs) and another $MSK_2$ may be associated with Alice-Family-SSID (shared by Alice, her husband and/or son). Each MSK associated with each of the SSIDs may be refreshed (e.g., periodically) based on Mary's policies, VAC server policy or a combination thereof.

Figure 32:
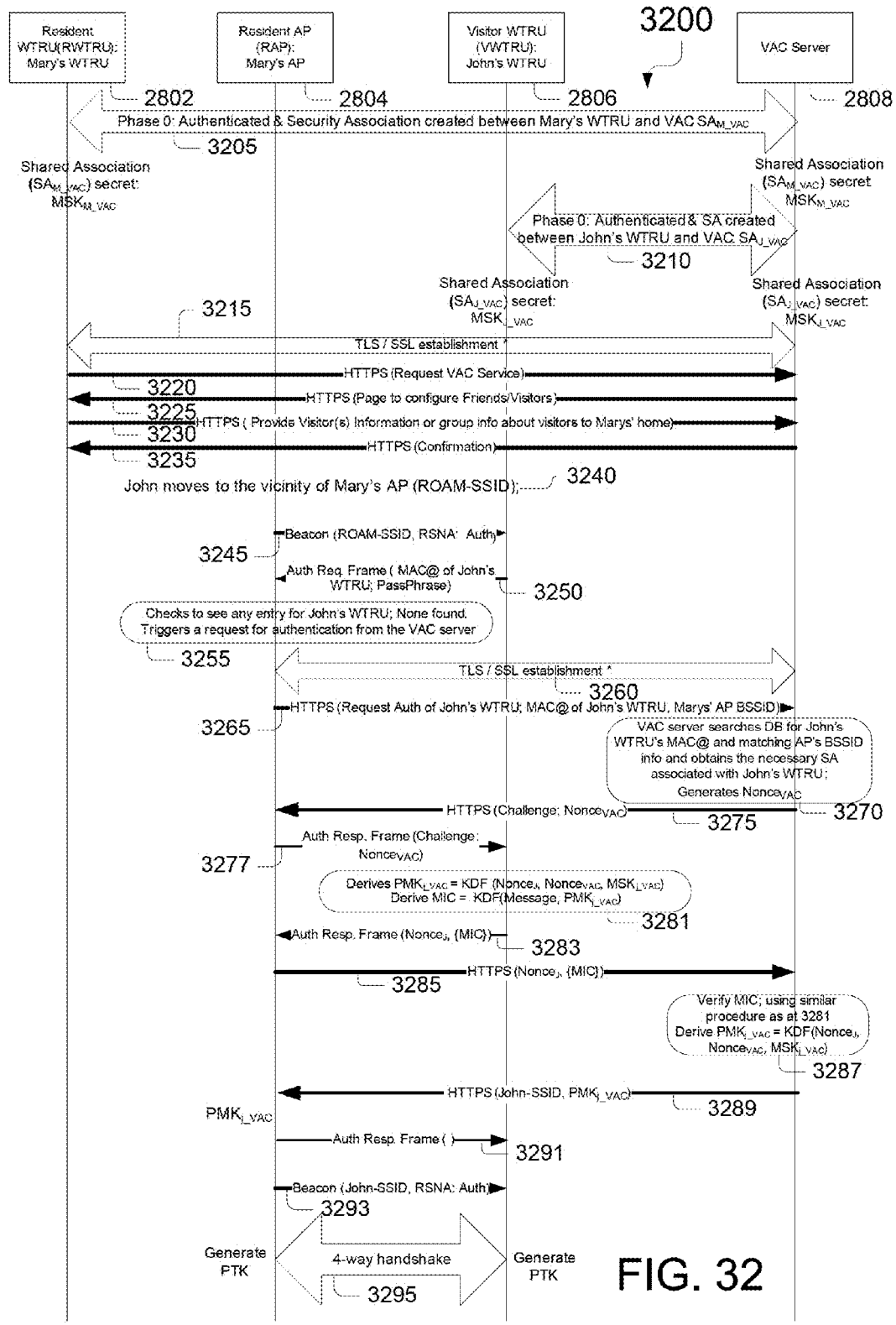
FIG. 32 is a diagram illustrating authentication and secure connection to a visitor network using WPA(2)-PSK.

FIG. 32 is a diagram illustrating a procedure for an authentication and secure connection to a visitor network using WPA(2)-PSK, for example, for which the authentication may be performed at the VAC server 2808.

Referring to FIG. 32, the procedure 3200 illustrates the use of a pre-existing security association between John and Facebook that may be used to enable authentication and dynamic derivation of session keys (PMKs) when John visits Mary and to configure an SSID (e.g., John-SSID) for John at the RAP 2804 of Mary (which may be transported to the RAP 2804 of Mary by Facebook). Authentication of John/John's WTRU may be performed by the VAC server 2808 similar to an 802.1x (EAP) authentication. The RAP 2804 of Mary and the VWTRU 2806 of John may complete a 4-way handshake and connect securely.

For example, at 3205, the RWTRU 2802 of Mary may be authenticated and a security association ($SA_{J\_VAC}$) may be created between the RWTRU 2802 and the VAC server 2808. If Mary and/or the RWTRU 2802 is authenticated, a shared secret ($MSK_{M\_VAC}$) may be derived between the RWTRU 2802 and the VAC server 2808 or provided by the VAC server 2808 to the RWTRU 2802. At 3210, John and/or the VWTRU 2806 of John may be authenticated and a security association ($SA_{J\_VAC}$) may be created between the VWTRU 2806 and a VAC server 2808. If John and/or the VWTRU 2806 is authenticated, a shared secret ($MSK_{J\_VAC}$) may be provided or derived between the VWTRU 2806 and the VAC server 2808. At 3215, a secure connection may be established, via TLS/SSL, between the RWTRU 2802 and the VAC server 2808.

At 3220, Mary, using the RWTRU 2802 (e.g., via user input), may send a request to the VAC server 2808 for a service (e.g., a VAC service), for example, via a HTTPS protocol (such that a secure connection is established to gain access to a friend's network, or any other service). At 3225, the VAC server 2808 may securely send to the RWTRU 2802 a page to configure friends/visitors. At 3230, Mary, using the RWTRU 2802, may securely provide information about one or more visitors or one or more groups of visitors to Mary's home (e.g., in the vicinity of or in a coverage area of the RAP 2804 of Mary). The information may include user and/or group information, which may allow for particular authorization/permissions of visitors/friends by class and/or by group. At 3235, the VAC server 2808 may confirm, for example via the secure connection to the RWTRU 2802, the received information about the friends/visitors (e.g., one or more particular friends, a group of friends and/or a list of friends, which may be grouped for particular access to a network associated with the RWTRU 2802). At 3240, the VWTRU 2806 of John may move to the vicinity of the RAP 2804 of Mary (e.g., move into coverage area of the ROAM-SSID network associated with the RAP 2804). If the RAP 2804 is an open network, at 3245 the RAP 2804 may send a beacon that may include the name of the network (e.g., ROAM-SSID) and the type of authentication used (e.g., WPA2-PSK, RSNA, or EAP, among others). In certain representative embodiments, the network may be hidden. In such embodiments, information may be previously provided to the VWTRU 2806 to enable the VWTRU 2806 to send a probe request to the hidden network such that the network may response with a probe response (e.g., with a beacon response). At 3250, the VWTRU 2806 may send an authentication request (e.g., authentication request frame) using for example RSNA or EAP). For EAP, a user may request a connection through the RAP 2804 and provide an identifier (e.g., a MAC address for the VWTRU 2806 and/or a passphrase). At 3255, the RAP 2804 may check whether any entry is stored at the RAP 2804 for the VWTRU 2806 of John. If no entry for the VWTRU 2806 is found, a request may be triggered for authentication of the VWTRU 2806 by the VAC server 2808. At 3260, a secured connection (e.g., via TLS/SSL) may be established between the RAP 2804 and the VAC server 2808. At 3265, the RAP 2804 may send an Authorization Request to the VAC server 2808 via the secure connection and may indicate one or more of: (1) the VWTRU 2806 of John; (2) a MAC address; John's ID or other device identifier of the VWTRU 2806 of John or John's ID; and/or (3) a MAC address, BSSID, IP address or other device identifier of the RAP 2804, among others. At 3270, the VAC server 2808 may search a database, memory and/or storage unit at or associated with the VAC server 2808 for the MAC address or other device identifier of the VWTRU 2806 of John and/or the corresponding BSSID information of the RAP 2804. The VAC server 2808 may obtain the shared association ($SA_{J\_VAC}$) associated with John and the VWTRU 2806 of John and may generate a nonce associated with the VAC (e.g., $nonce_{VAC}$).

At 3275, the VAC server 2808 may send over the secured connection to the RAP 2804 of Mary, a message including a challenge and the nonce$_{VAC}$. At 3277, the RAP 2804 may send an Authorization Request Frame to the VWTRU 2806 including the challenge and the nonce$_{VAC}$. At 3281, the VWTRU 2806 may derive: (1) via a KDF, the PMK$_{J\_VAC}$ based on a nonce associated with John (e.g., nonce$_J$), the nonce$_{VAC}$, the MSK$_{J\_VAC}$, and/or (2) via another KDF, a MIC based on a message and the derived PMK$_{J\_VAC}$. At 3283, the VWTRU 2806 may send an Authorization Response Frame to the RAP 2804 including the nonce$_J$ and the derived MIC. At 3285, the RAP 2804 may send a message to the VAC server 2808 including the nonce$_J$ and the derived MIC.

At 3287, the VAC server 2808 may verify the received MIC (e.g., using similar procedure as at 3281 and may derive the PMK$_{J\_VAC}$ via the KDF based on the nonce$_J$, the nonce$_{VAC}$, and/or the MSK$_{J\_VAC}$.

At 3289, the VAC server 2808 may send a message to the RAP 2804 including or indicating the network identifier (e.g., John-SSID) and the PMK$_{J\_VAC}$, among others and the RAP 2804 may store, for example, the PMK$_{J\_VAC}$. At 3291, the RAP 2804 may send to the VWTRU 2806 another Authorization Response Frame. At 3293, the RAP 2804 may send to the VWTRU 2806 another beacon that may include the identifier or name of the network (e.g., John-SSID) and the type of authentication used (e.g., Robust Security Network Association (RSNA), or EAP, among others). At 3295, the RAP 2804 may generate a PTK using, for example, the stored PMK$_{J\_VAC}$ and the VWTRU 2806 may generate the PTK using, for example, the derived PMK$_{J\_VAC}$ to enable a 4-way handshake, for example to provide attachment of the VWTRU 2806 to John-SSID of the RAP 2804.

Representative Connection Process

A 4-way handshake may be performed to confirm that the RAP 2804 of Mary and the VWTRU 2806 of John both possess the same session keys. After the connection has been successfully established, The RAP 2804 of Mary may notify the Facebook application, which may update John's status by logging his current location along with the registration request/result containing or including the SSID and/or the BSSID of the RAP 2804 of Mary on the Facebook server.

Representative Connection Termination Process

When John is finished visiting Mary and leaves, the VWTRU 2806 of John may disconnect from the RAP 2804 of Mary and the Facebook server may be notified by the RAP 2804 of Mary that John is no longer connected to the RAP 2804 of Mary. The session keys may be discarded by the RAP 2804 of Mary (and depending upon the variation described above, if a unique SSID for John, such as John-SSID, had been setup, it may be removed), if the permission for John was for a single session. In certain representative embodiments, the keys may be retained for an authorized period of time to enable John to re-authenticate to the RAP 2804 of Mary at a later stage subject to the allowed duration as per the policy setup by Mary.

Figure 33:
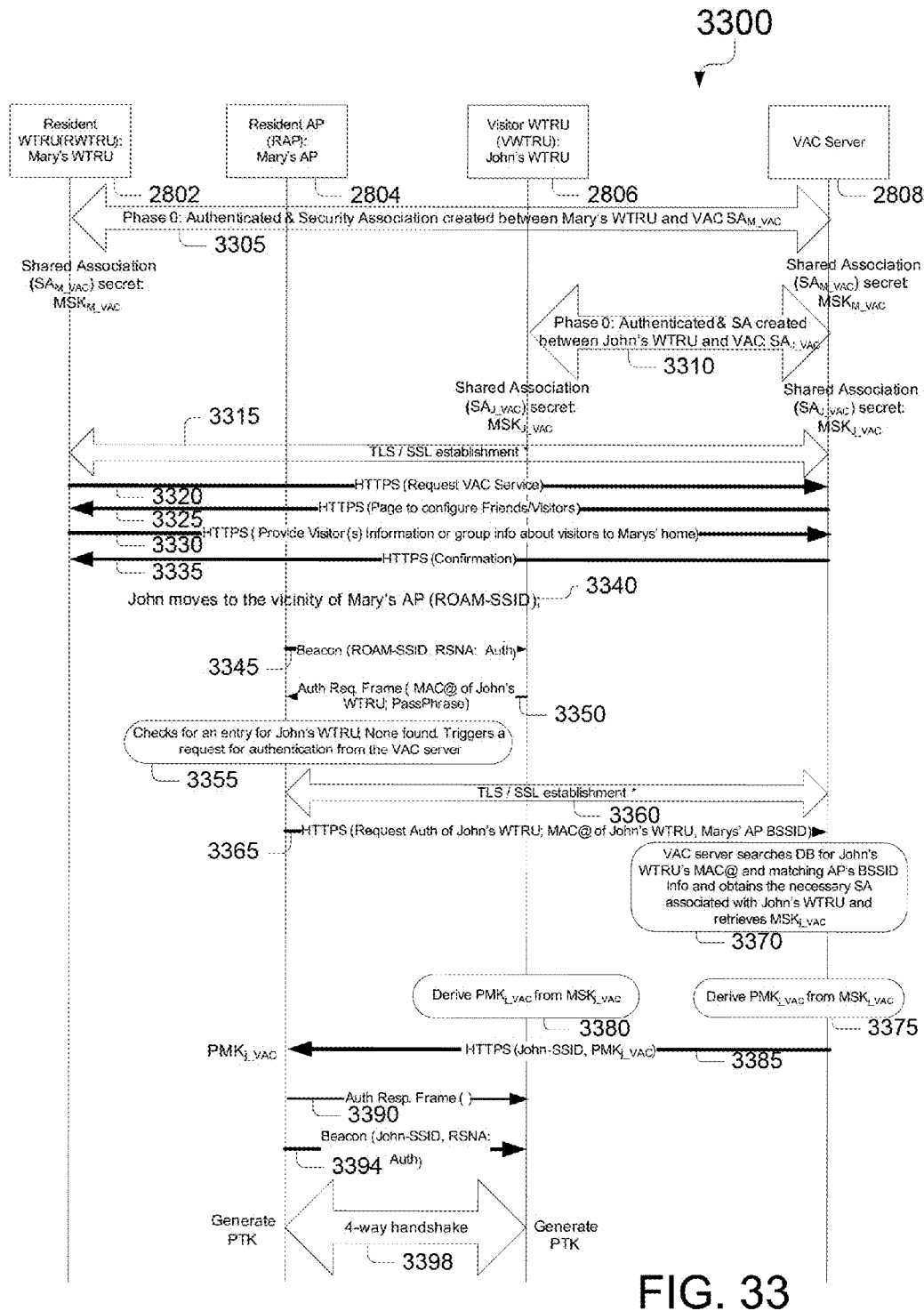
FIG. 33 is a diagram illustrating authentication and secure connection to a visitor network using WPA(2)-PSK.

FIG. 33 is a diagram illustrating another procedure for an authentication and secure connection to a visitor network using WPA(2)-PSK.

Referring to FIG. 33, the procedure 3300 illustrates the use of a pre-existing security association between John and Facebook that may be used to enable authentication and dynamic derivation of session keys (PMKs) when John visits Mary and to configure an SSID (e.g., John-SSID) for John at the RAP 2804 of Mary (which may be transported to the RAP 2804 of Mary by Facebook). Authentication of John/John's WTRU may be performed by the VAC server 2808. The RAP 2804 of Mary and the VWTRU 2806 of John may complete a 4-way handshake and connect securely.

For example, at 3305, the RWTRU 2802 of Mary may be authenticated and a security association (SA$_{M\_VAC}$) may be created between the RWTRU 2802 and the VAC server 2808. If Mary and/or the RWTRU 2802 is authenticated, a shared secret (MSK$_{M\_VAC}$) may be derived between the RWTRU 2802 and the VAC server 2808 or provided by the VAC server 2808 to the RWTRU 2802. At 3310, John and/or the VWTRU 2806 of John may be authenticated and a security association (SA$_{J\_VAC}$) may be created between the VWTRU 2806 and a VAC server 2808. If John and/or the VWTRU 2806 is authenticated, a shared secret (MSK$_{J\_VAC}$) may be provided or derived between the VWTRU 2806 and the VAC server 2808.

At 3315, a secure connection may be established, via TLS/SSL, between the RWTRU 2802 and the VAC server 2808. At 3320, Mary, using the RWTRU 2802 (e.g., via user input), may send a request to the VAC server 2808 for a service (e.g., a VAC service), for example, via a HTTPS protocol (such that a secure connection is established to gain access to a friend's network, or any other service). At 3325, the VAC server 2808 may securely send to the RWTRU 2802 a page to configure friends/visitors. At 3330, Mary, using the RWTRU 2802, may securely provide information about one or more visitors or one or more groups of visitors to Mary's home (e.g., in the vicinity of or in a coverage area of the RAP 2804 of Mary). The information may include user and/or group information, which may allow for particular authorization/permissions of visitors/friends by class and/or by group. At 3335, the VAC server 2808 may confirm, for example via the secure connection to the RWTRU 2802, the received information about the friends/visitors (e.g., one or more particular friends, a group of friends and/or a list of friends, which may be grouped for particular access to a network associated with the RWTRU 2802). At 3340, the VWTRU 2806 of John may move to the vicinity of the RAP 2804 of Mary (e.g., move into coverage area of the ROAM-SSID network associated with the RAP 2804). If the RAP 2804 is an open network, at 3345 the RAP 2804 may send a beacon that may include the name of the network (e.g., ROAM-SSID) and the type of authentication used (e.g., WPA2-PSK, RSNA, or EAP, among others). In certain representative embodiments, the network may be hidden. In such embodiments, information may be previously provided to the VWTRU 2806 to enable the VWTRU 2806 to send a probe request to the hidden network such that the network may response with a probe response (e.g., with a beacon response). At 3350, the VWTRU 2806 may send an authentication request (e.g., authentication request frame) using for example RSNA, WPA(2)-PSK or EAP). For EAP, a user may request a connection through the RAP 2804 and provide an identifier (e.g., a MAC address for the VWTRU 2806). At 3355, the RAP 2804 may check whether an entry is stored at the RAP 2804 for the VWTRU 2806 of John. If no entry for the VWTRU 2806 is found, a request may be triggered for authentication and/or information of the VWTRU 2806 by the VAC server 2808. At 3360, a secured connection (e.g., via TLS/SSL) may be established between the RAP 2804 and the VAC server 2808. At 3365, the RAP 2804 may send an Authorization Request to the VAC server 2808 via the secure connection and may indicate one or more of: (1) the ID of the VWTRU 2806 of John; (2) a MAC address of the VWTRU 2806 of John; (3) John's ID or other device identifier of the VWTRU 2806 of John and/or John's ID; and/or (4) a MAC address, BSSID, IP address or other device identifier of the RAP 2804, among others. At 3370, the VAC server 2808 may search a database, memory and/or storage unit at or associated with the VAC server 2808 for the MAC address or other device identifiers of the VWTRU 2806 of John and/or the corresponding BSSID information of the RAP 2804. If the VWTRU 2806 and RAP 2804 information sent by the RAP 2804 matches to information stored at or stored by the VAC server 2808 from the search, the VAC server 2808 may obtain John's ID and the shared association ($SA_{J\_VAC}$) associated with John and the passphrase and/or the $MSK_{J\_VAC}$.

At 3375, the VAC server 2808 may derive: (1) via a KDF or otherwise, the $PMK_{J\_VAC}$ based on the $MSK_{J\_VAC}$. At 3380, the VWTRU 2806 may derive: (1) via a KDF or otherwise, the $PMK_{J\_VAC}$ based on the $MSK_{J\_VAC}$. In certain representative embodiments, the derivation of the $PMK_{J\_VAC}$ by the VWTRU 2806 may use conventional WPA2-PSK procedures.

At 3385, the VAC server 2808 may send an identifier or name of the unique network associated with the VTWRU's 2806's network (e.g., John-SSID) and the derived session key $PMK_{J\_VAC}$ to RAP 2804 of Mary via the secure connection there between. At 3390, the RAP 2804 may send to the VWTRU 2806 another Authorization Response Frame. At 3394, the RAP 2804 may send to the VWTRU 2806 another beacon that may include the identifier or name of the network (e.g., John-SSID) and the type of authentication used (e.g., Robust Security Network Association (RSNA), WPA(2)-PSK or EAP, among others). At 3298, the RAP 2804 may generate a PTK using, for example, the received $PMK_{J\_VAC}$ and the VWTRU 2806 may generate the PTK using, for example, the derived $PMK_{J\_VAC}$ to enable a 4-way handshake, for example to provide attachment of the VWTRU 2806 to John-SSID that was advertised as part of the beacon from the RAP 2804.

A 4-way handshake may be performed to confirm that the RAP 2804 of Mary and the VWTRU 2806 of John both possess the same PTK transient keys. After the connection has been successfully established, The RAP 2804 of Mary may notify the Facebook application, which may update John's status by logging his current location along with the registration request/result containing or including the SSID and/or the BSSID of the RAP 2804 of Mary on the Facebook server.

When John is finished visiting Mary and leaves, the VWTRU 2806 of John may disconnect from the RAP 2804 of Mary and the Facebook server may be notified by the RAP 2804 of Mary that John is no longer connected to the RAP 2804 of Mary. The session keys may be discarded by the RAP 2804 of Mary (and depending upon the variation described above, if a unique SSID for John, such as John-SSID, had been setup, it may be removed), if the permission for John was for a single session. In certain representative embodiments, the keys may be retained for an authorized period of time to enable John to re-authenticate to the RAP 2804 of Mary at a later stage subject to the allowed duration as per the policy setup by Mary.

Figure 34:
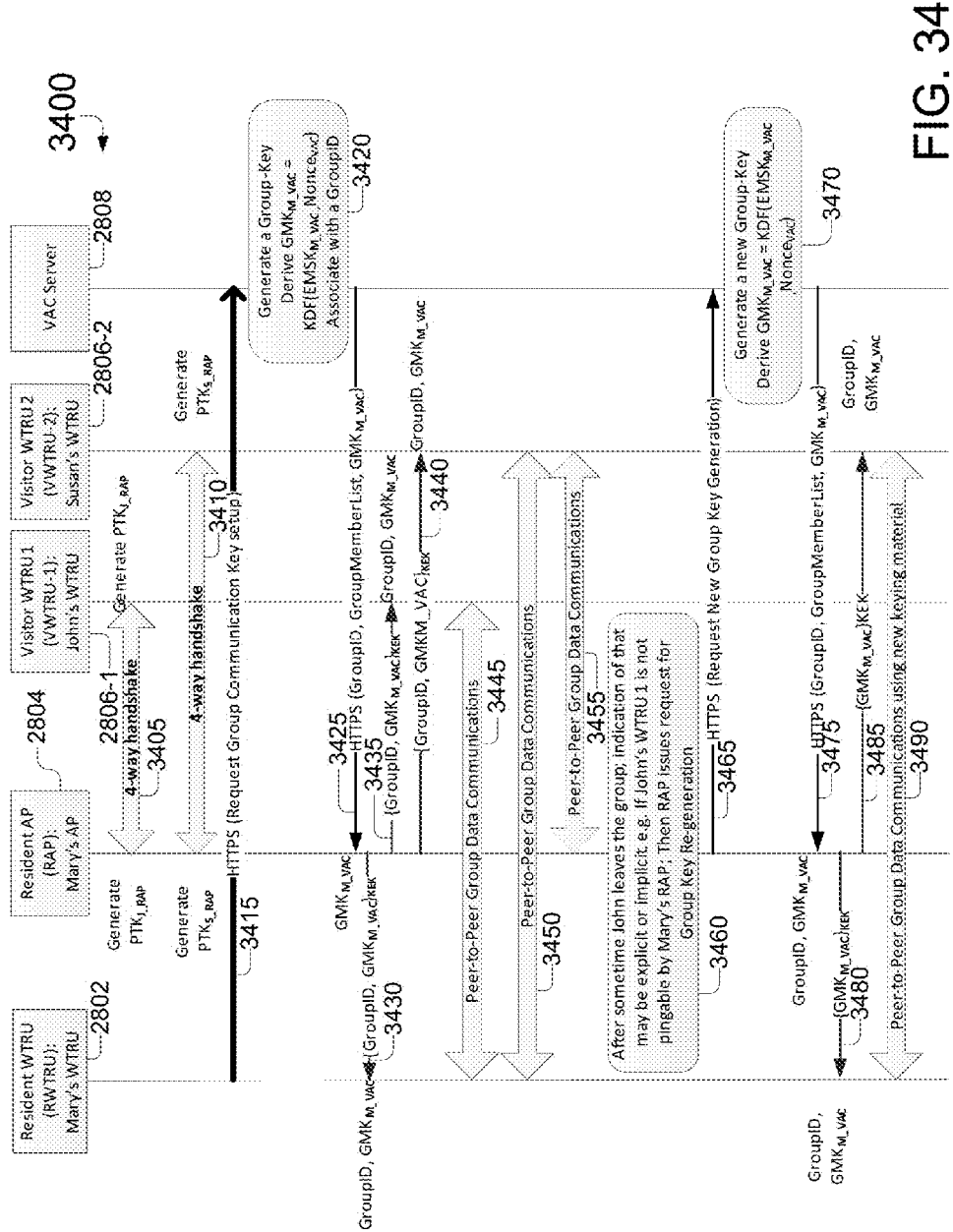
FIG. 34 is a diagram illustrating a procedure for setting up peer-to-peer or group communications using previously established security associations.

FIG. 34 is a diagram illustrating a procedure for setting up peer-to-peer or group communications using previously established security associations.

The security context and keys that have been derived and setup may be used to primarily secure communications of the 802.11 WiFi radio link between a VWTRU 2806-1 (e.g., John's WTRU) and the RAP 2804 of Mary. The security context may enable John and/or Mary to communicate with the Internet. The protection of the application layer beyond the protection afforded to the radio interface may be left to an application to provide. If Mary and John are to collaborate and work together in a peer-to-peer manner, Mary and John via the RWTRU 2802 and VWTRUs 2806-1 may communicate directly (e.g., not via the RAP 2804). A separate radio interface (e.g., a WiFi Direct link or an additional regular WiFi 802.11n) on the RWTRU 2802 and the VWTRUs 2806-1 may be used to create a peer-to-peer connection and/or a group data connection between (e.g., directly between) the RWTRU 2802 and the VWTRU 2806-1 without going through or having to go through the RAP 2804 of Mary.

It is contemplated that each WTRU may have more than one radio interface on board (e.g., installed and/or configured) and at least one of the radio interfaces may be operable in a peer-to-peer manner. Mary via her RWTRU 2802 may configure one or more groups in an on-demand basis or may pre-configure the one or more groups (e.g., a priori configuration). Mary may configure groups for which Mary is not part of the group (for example, John's family group in which members of John's family (e.g., John, Abe and Jacob) may use the peer-to-peer group communications directly between them without the data traveling (e.g., being communicated) via the RAP 2804.

Referring to FIG. 34, the procedure 3400 illustrates, at 3405, the VWTRU 2806-1 of John and the RAP 2804 of Mary (e.g., Mary Jones in this representative embodiment) performing a 4-way handshake and deriving appropriate and/or necessary keys. Procedures to enable the 4-way handshake are provided herein. It is contemplated that John and/or the VWTRU 2806-1 of John has been authenticated by the VAC server 2808 and that John (or the VWTRU 2806-1 of John) and the RAP 2804 have in their possession a valid and fresh $PMK_{J\_VAC}$ (e.g., not stale $PMK_{J\_VAC}$). John and/or the VWTRU 2806-1 may use the derived keys to connect to the Internet via the RAP 2804.

At 3410, the VWTRU 2806-2 of Susan and the RAP 2804 of Mary may perform a similar 4-way handshake and may derive appropriate and/or necessary keys based on a session key (e.g., $PMK_{s\_VAC}$). Susan, similar to John, may be able to connect to the Internet via the RAP 2804.

At 3415, the RWTRU 2802 of Mary may send a request to the VAC server 2808 for the provisioning of group communication keys via a secure connection. The request may configure friends and/or colleagues that may be part of the group. The request from Mary using RWTRU 2802 may be performed in an on-demand basis or may be performed on an a priori or predetermined basis or during the initial Visitor information configured at 3325 by Mary using the RWTRU 2802.

In certain representative embodiments, communications may be (e.g., may only be between members of a single group. In other representative embodiments, communications may be between anyone authorized by Mary, as part of the group setup. For example, Mary may create a single group or multiple groups and members (e.g., only members) of each group may communicate with one another or members of a group may communicate across groups. Members may belong to multiple groups.

Mary may configure that: (1) a family, (2) a group of friends; and/or (3) a class of users, among others, may have a peer-to-peer group communications Group ID. For example, the Group ID table below sets forth a first Group ID associated with Mary's Friends and a second Group ID associated with John's Family. Mary's Friends include a first Member ID of John-Smith@facebook.com, a second Member ID of SusanBlack@facebook.com and a third Member ID of MaryJones©facebook.com. Each record associated with a Member ID includes a WTRU identifier (which may generally be the MAC address of the WTRU) associated with or owned by the member and a group key uniquely associated with the Group ID. The Group Key may be used to setup permissions associated with members of the group.

| Group ID | Member id | WTRU MAC@ | Group Key |
|---|---|---|---|
| Mary's Friends | John-Smith@facebook.com | 23479badg . . . | 43292382349242042 42 . . . |
|  | SusanBlack@facebook.com | 823d23422 . . . |  |
|  | MaryJones@facebook.com | 23222644 . . . |  |
| John's Family | John-Smith@facebook.com | 23479badg . . . | 78572d77bad3574912 . . . |
|  | Abe-Smith@facebook.com | 9236712fd . . . |  |
|  | Jacob-Smith@facebook.com | 45812389 . . . |  |

At 3420, the VAC server 2808 may derive and/or generate a Group Master Key (GMK) and may associate the GMK with a Group ID. The GMK may be generated or pre-configured. As one example, a GMK may be derived using a KDF based on an Extended MSK (e.g., an additional key that may be derived as a result of and/or from an authentication process (e.g., an 802.11i authentication process). For example, the GMK may be derived according to the following:

$$GMK_{M\_VAC}=KDF(EMSK,Nonce)$$

It is contemplated that other keys may also be used in lieu or in addition to the GMK. A similar key may be generated using a Generic Bootstrapping Architecture (GBA), EAP or other authentication processes.

As another representative embodiment, the MSK may be used in place of EMSK and/or derivative keys of the EMSK and/or the MSK may be used in lieu of or in addition to the EMSK.

As another representative embodiment, additional information such as a string, random numbers, a MAC address of the WTRU requesting group keying may be included in computation of the $GMK_{M\_VAC}$ At 3425, the VAC server 2808 may send the $GMK_{M\_VAC}$ along with the Group ID to the RAP 2804 of Mary over a secure connection. The message may include a Group Member List (GML), which may contain or include a list of the MAC addresses of each of the group members (e.g., WTRUs identifiers associated with or owned by group members). At 3430, the RAP 2804 may send the received $GMK_{M\_VAC}$ to the RWTRU 2802 of Mary. At 3435 and 3440, the RAP 2804 may send the received $GMK_{M\_VAC}$ to each of the MAC addresses listed within the Group Member List. For example, at 3435, the RAP 2804 may send the received $GMK_{M\_VAC}$ to the MAC addresses listed within the Group Member List. For example, as illustrated in the Group ID table, the GML may include a first set of group members (Susan Black and John Smith and Mary Jones) and a second set of group members (John Smith, Abe Smith and Jacob Smith). The $GMK_{M\_VAC}$ may be sent to one set of group members, certain select groups of members or all group members. For example, when the $GMK_{M\_VAC}$ VAC is sent to the first group's members to enable group communication therebetween (e.g., to Mary Jones' RWTRU 2802, John Smith's VWTRU 2806-1 and Susan Black's VWTRU 2806-2), at 3445, 3450 and 3455, direct (peer-to-peer) data communications may be established. Data may be transmitted and/or received between each of the group members via their WTRUs 2802, 2806-1 and/or VWTRU 2806-2 directly in a peer-to-peer manner using an interface that is different from the radio interface that is used to connect to Mary's RAP 2804.

At 3460, John may leave the first group. Notification of John leaving the group may be sent explicitly by John via the application layer or messaging via 802.11 layer. In certain representative embodiments, Mary Jones' RAP 2804 may determine and/or infer when John Smith has left the first group based on an expiration and non-renewal of the key or keys (e.g., $MSK_{J\_VAC}$, $RMK_{J\_VAC}$ and/or $PTK_{J\_VAC}$ that is associated between John (e.g., John Smith's WTRU VWTRU 2806-1 and the RAP 2804. In another embodiment, Mary Jones' RAP 2804 may send a message directly to the VWTRU 2806-1 or the group requesting group participation notification on a regular basis (e.g., as a heart-beat message or within a certain time frame). Once RAP 2804 infers either through direct (e.g., implicitly and/or explicitly) and/or indirect means (e.g., from the VAC server 2808) that John Smith (e.g., via the VWTRU 2806-1) does not want to be part of the first group or may not be in the vicinity of the RAP 2804 or is not authorized to be part of the group after a certain interval and may not or cannot take part in direct Peer-to-peer group communications, at 3465, the RAP 2804 may send a message to the VAC server 2808 to request new group keys and/or re-keying of the $GMK_{M\_VAC}$.

At 3470, the VAC server 3470 may perform a new key generation process or a re-keying process. The process may include the new $GMK_{M\_VAC}$ being derived using a KDF based on any one of: (1) the $EMSK_{M\_VAC}$, (2) the $nonce_{VAC}$, (3) the Old $GMK_{M\_VAC}$, (4) the $EMSK_{M\_VAC}$ XOR with the Old $GMK_{M\_VAC}$, and/or any other re-keying process that ensures that the entropy for deriving is maintained and also ensures the use of a very good Random number generator for deriving the Nonce, among others. For example the $GMK_{M\_VAC}$ may be derived as follows:

$$GMK_{M\_VAC}=KDF(EMSK_{M\_VAC},NonceVAC) \text{ or}$$

$$\text{New } GMK_{M\_VAC}=KDF(Old\ GMK_{M\_VAC},NonceVAC)$$
or $$\text{New } GMK_{M\_VAC}=KDF((EMSK_{M\_VAC}\ XOR\ Old\ GMK_{M\_VAC}),Nonce_{VAC})$$

At 3475, the new $GMK_{M\_VAC}$ may be sent to the RAP 2804 along with the new GML identified by the Group ID or Group IDs.

At 3480, the RAP 3480 may forward the $GMK_{M\_VAC}$ to the WTRUs having MAC address that are in the GML. Since John's VWTRU 2806-1 is not included in the new GML (e.g., new list), the new $GMK_{M\_VAC}$ may be sent or forwarded in a secure manner to the RWTRU 2802 of Mary Jones and the VWTRU 2806-2 of Susan Black.

The VWTRU 2806-2 of Susan Black and the RWTRU 2802 of Mary Jones may now use the newer keying information (e.g., keying material) to communicate data in a peer-to-peer manner between themselves in a secure manner.

FIG. 35 is a flow diagram of a representative method 3500 for managing an exposure of a network to a WTRU 102-1.

Referring to FIG. 35, the representative method 3500 may include, at block 3510, an AP (e.g., CBNS AP 2210) of the network receiving information associated with the WTRU 102-1. At block 3520, the AP 2210 may selectively expose the network.

In certain representative embodiments, the receiving of the network information may include that the AP 2210 may receive an identifier of the WTRU 102-1.

In certain representative embodiments, the selectively exposing of the network may include that the AP 2210 may selectively expose the network based on the received identifier.

In certain representative embodiments, the selectively exposing of the network may include that the AP 2210 may selectively expose the network to the WTRU 102-1 based on: (1) an indicator from a network entity (e.g., CBNS server 2270) or (2) one and/or more network exposure rules.

In certain representative embodiments, the selectively exposing of the network may include that the AP 2210 may one of: (1) expose the network to the WTRU 102-1; or (2) hide the network from the WTRU 102-1.

In certain representative embodiments, the hiding the network from the WTRU 102-1 may include that the AP may disassociate the WTRU 102-1 from the network and/or may halt communication to the WTRU 102-1.

In certain representative embodiments, the selectively exposing of the network may include that the AP 2210 may determine to expose the network to the WTRU 102-1 on condition that the received information associated with the WTRU 102-1 satisfies one or more network exposure rules and may expose the network to the WTRU 102-1.

In certain representative embodiments, the selectively exposing of the network may include that the AP 2210 may determine to hide the network from the WTRU 102-1 on condition that the received information associated with the WTRU 102-1 does not satisfy one or more network exposure rules and may hide the network from the WTRU 102-1.

In certain representative embodiments, the AP 2210 may send an identifier of the WTRU 102-1 to a network entity 2270; and may receive a message indicating whether or not to expose the network to the WTRU 102-1.

In certain representative embodiments, the selectively exposing of the network may include that the AP 2210 may expose the network to the WTRU 102-1 on condition that the message indicates to expose the network to the WTRU 102-1, and may hide the network from the WTRU 102-1 on condition that the message indicates to not expose the network to the WTRU 102-1.

In certain representative embodiments, the AP 2210 may determine whether to expose the network to or hide the network from the WTRU 102-1 based on any of: (1) the received information from the WTRU 102-1 and/or (2) one or more network exposure rules.

In certain representative embodiments, the determining of whether to expose or hide the network may include that the AP 2210 may determine a Quality of Service (QoS) level to be used by the WTRU 102-1.

In certain representative embodiments, the selectively exposing of the network may include that the AP 2210 may expose the network to the WTRU 102-1 on condition that the QoS level exceeds a QoS threshold level, and may hide the network from the WTRU 102-1 on condition that the QoS level does not exceed the QoS threshold level.

In certain representative embodiments, the determining of whether to expose or hide the network may include that the AP 2210 may determine a capacity of the network.

In certain representative embodiments, the selectively exposing of the network may include that the AP 2210 may expose the network to the WTRU 102-1 on condition that the capacity of the network will not be exceeded if the WTRU 102-1 is connected to the network, and may hide the network from the WTRU 102-1 on condition that the capacity of the network will be exceeded if the WTRU 102-1 is connected to the network.

In certain representative embodiments, the selectively exposing of the network may include that the AP 2210 may selectively expose the network to the WTRU 102-1 based on load balancing rules such that the network is exposed to the WTRU 102-1 to move or shift the WTRU 102-1 to the network to redistribute load to the network In certain representative embodiments, the selectively exposing of the network may include that the AP 2210 may selectively expose the network to the WTRU 102-1 based on load balancing rules such that the network is hidden from the WTRU 102-1 to move the WTRU out of the network to redistribute load to one or more further networks in accordance with the load balancing rules.

In certain representative embodiments, the determining of whether to expose the network to the WTRU 102-1 may include that the AP 2210 may determine whether any of: (1) the WTRU 102-1 is a preferred device; (2) a user of the WTRU 102-1 is a preferred user; and/or (3) the WTRU 102-1 is executing a preferred application, as a determined result. The selectively exposing of the network may include that the AP 2210 may expose the network to the WTRU 102-1 based on the determined result.

In certain representative embodiments, the AP 2210 may hide the network from the WTRU 102-1 on condition that the WTRU 102-1 is no longer executing the preferred application. In certain representative embodiments, the determining of whether to expose the network to the WTRU 102-1 may include that the AP 2210 may determine, using a friend association list, whether the WTRU 102-1 is authorized to access the network. The selectively exposing of the network may include that the AP 2210 may assign automatic access by the WTRU 102-1 to the network on condition that the WTRU 102-1 is authorized to access the network.

In certain representative embodiments, the AP 2210 may receive further information associated with a further WTRU 102-2 and may determine using the friend association list whether the further WTRU 102-2 is listed in the friend association list.

In certain representative embodiments, the AP 2210 may on condition that the further WTRU 102-1 is not listed in the friend association list, determine whether the further WTRU 102-1 is any of: (1) associated with the WTRU 102-1 listed in the friend association list; or (2) associated with a home network of the WTRU 102-1 listed in the friend association list.

In certain representative embodiments, the AP 2210 may on condition that the further WTRU 102-1 is any of: (1) listed in the friend association list; (2) associated with the WTRU 102-1 listed in the friend association list; or (3) associated with the home network of the WTRU 102-1 listed in the friend association list, expose the network to the further WTRU 102-2.

In certain representative embodiments, the AP 2210 may expose the network to the further WTRU 102-2 on condition that: (1) the WTRU 102-1 is associated with the WTRU 102-1; and (2) the WTRU 102-1 is within range of the network and/or the WTRU 102-1 is connected to the network.

In certain representative embodiments, the AP 2210 may be configured by itself or via a network entity (e.g., the CBNS server 2270) to allow a further WTRU 102-2 to be exposed to the network via a further friend association list that is associated with: (1) the WTRU 102-1; and/or (2) a user of the WTRU 102-1.

In certain representative embodiments, the AP 2210 may be configured by itself or via a network entity (e.g., the CBNS server 2270) to allow the WTRU 102-1 to be exposed to the network, which is a hidden network, via a friend association list.

In certain representative embodiments, the AP 2210 may send to another WTRU 102-2 associated with the network, a notification that the WTRU 102-1 listed in the friend association list is to be given, is being given, or has been given exposure to the network.

In certain representative embodiments, the AP 2210 may receive a message indicating one of: (1) a pre-approval of the exposure of the network to the WTRU 102-1; (2) a post-approval of the exposure of the network to the WTRU 102-1 or (3) a disapproval of the exposure of the network to the WTRU 102-1 and may initiate, continue or halting exposure of the network to the WTRU 102-1 based on the indication in the received message.

In certain representative embodiments, the WTRU 102-2 is associated with a further network (e.g., the home network 2010 of Mary) and may include an associated network configuration. The AP 2210 may virtualize the further network 2010, using the associated network configuration, on the network (the home network of John 2020).

FIG. 36 is a flow diagram of a representative method 3600 for managing an exposure of a network to a WTRU 102-1.

Referring to FIG. 36, the representative method 3600 may include, at block 3610, a network entity (NE) (e.g., CBNS server 2270) receiving, from the AP 2210 of the network, information associated with the WTRU 102-1. At block 3620, the NE 2270 may determine whether to expose the network to, or hide the network from, the WTRU 102-1 based on any of: (1) the received information from the AP 2210; and/or (2) one or more network exposure rules. At block 3630, the NE 2270 may send to the AP 2210, a message to control selective exposure of the network.

In certain representative embodiments, the NE 2270 may retrieve, a user profile associated with the user of the WTRU 102-1 and may determine whether to expose the network to the WTRU based on the retrieved user profile and the one or more network exposure rules.

In certain representative embodiments, the determining of whether to expose the network to the WTRU 102-1 may include that the NE 2270 may send to the WTRU 102-1 a notification to confirm terms for exposing and/or accessing the network.

In certain representative embodiments, the determining of whether to expose the network to the WTRU 102-1 may include that the NE 2270 may include determining a priority of the WTRU 102-1 and other WTRUs 102-2 and 102-3 connected to, associated with or in range of the network.

In certain representative embodiments, the sending of the message to control selective exposure of the network may include that the NE 2270 may send the message indicating to expose the network to the WTRU 102-1 on condition that capacity of the network is sufficient to serve capacity requirements of a group of highest priority WTRUs 102-1 and 102-2 that include the WTRU 102-1.

FIG. 37 is a flow diagram of a representative method 3700 for managing a connection to a network by a WTRU 102-1.

Referring to FIG. 37, the representative method 3700 may include, at block 3710, an AP (e.g., CBNS AP 2210) of the network determining, using a friend association list associated with the network, whether the WTRU 102-1 is authorized to access the network. At block 3720, the AP 2210 may assign automatic access by the WTRU 102-1 to the network, when the WTRU 102-1 is authorized to access the network.

In certain representative embodiments, the assigning of automatic access by the WTRU 102-1 to the network, when the WTRU is authorized to access the network may include that the AP 2210 may, after determining that the WTRU is authorized to access the network: (1) configure itself to expose the network to the WTRU 102-1; (2) accept an attachment of the WTRU 102-1 to the network; and/or (3) control access of the WTRU 102-1 using network access policies.

In certain representative embodiments, the friends association list may be a friends list of a social network service.

In certain representative embodiments, the AP 2210 may receive from the social network service an access token to access the friends list associated with the network.

In certain representative embodiments, the AP 2210 may obtain the friends list from the social network service using the received access token.

In certain representative embodiments, obtaining the friends list may include the AP 2210 storing the friends list locally.

In certain representative embodiments, the AP 2210 may receive the friend association list via a social networking service and the determining of whether the WTRU 102-1 is authorized to access the network may include that the AP 2210 may compare an identifier associated with the WTRU 102-1 with one or more identifiers in the friend association list.

In certain representative embodiments, the assigning of automatic access by the WTRU 102-1 to the network when the WTRU 102-1 is authorized to access the network may include that responsive to the identifier associated with the WTRU 102-1 corresponding to one of the identifiers in the friend association list, the AP 2210 may expose the network to the WTRU 102-1.

In certain representative embodiments, the assigning of automatic access by the WTRU 102-1 to the network when the WTRU 102-1 is authorized to access the network may include that responsive to the identifier associated with the WTRU 102-1 not corresponding to any identifiers in the friend association list, the AP 2210 may not expose the network to the WTRU 102-1.

In certain representative embodiments, the AP 2210 may obtain connection policies for connection to the network and the determining of whether the WTRU 102-1 is authorized to access the network may be based on the friend association list and the obtained connection policies.

In certain representative embodiments, the friend association list may include information accumulated while one or more users are using a social networking service. The social networking service may include any of: Facebook, Twitter, Linked-in, Instagram, Snapchat, Wanelo, Vine, Skype, Pinterest, Tumblr, Oovoo, Path, Keek, My Space, My Flickr, google+, gmail, yahoo and/or Happy Flickr.

In certain representative embodiments, the WTRU 102-1 may be associated with a home network and the AP 2210 may establish a tunnel (e.g., tunnel 2050) between the network and the home network to enable the WTRU 102-1 to execute a service offered by the home network via the established tunnel 2050.

In certain representative embodiments, the assigning of automatic access by the WTRU to the network may be based on policies.

In certain representative embodiments, the assigning of automatic access by the WTRU 102-1 to the network may be triggered based on any of: (1) a credit or debit card purchase; (2) a ticket purchase; (3) payment for a rental of a hotel; (4) a purchase of a service or a good and/or (5) card access to a building.

FIG. 38 is a flow diagram of a representative method 3800 for managing a network connection by a WTRU 102-1.

Referring to FIG. 38, the representative method 3800 may include, at block 3810, an AP (e.g., CBNS AP 2210) receiving from the WTRU 102-1 a probe including information identifying the WTRU 102-1. At block 3820, the AP 2210 may determine whether the WTRU 102-1 is authorized for a network connection based on the received probe At block 3830, the AP 2210 may expose a hidden network to the WTRU 102-1 or may initiate a new network for the WTRU 102-1 based on the information in the received probe. At block 3840, the AP 2210 may send configuration information to enable the WTRU 102-1 to automatically connect to the hidden network or the newly initiated network.

In certain representative embodiments, the newly initiated network may be a hidden WiFi network serving only the WTRU 102-1.

In certain representative embodiments, the AP 2210 may configure the newly initiated network as a single WTRU serving network such that when each WTRU 102-1, 102-2 or 102-3 is to connect via the AP 2210, a respectively different network is initiated for each respective WTRU 102-1, 102-2 or 102-3.

In certain representative embodiments, the establishing of the new network may include that the AP 2210 may configure a time period for a pre-established network in accordance with a predetermined policy.

In certain representative embodiments, the shutting down of the pre-established network may include that the AP 2210 may disconnect the WTRU 102-1 from the pre-established network.

In certain representative embodiments, the sending of configuration information may include that the AP 2210 may send network information to identify the newly initiated network to the WTRU 102-1.

In certain representative embodiments, the AP 2210 may shut down a pre-established network to force the WTRU 102-1 to automatically reconnect to the newly initiated network.

In certain representative embodiments, the AP 102-1 may terminate the network connection including the AP 2210 disconnecting the WTRU 102-1 from the pre-established network by the shutting down of the pre-established network.

FIG. 39 is a flow diagram of a representative method 3900 for associating a WTRU 102-1 or an AP 2210 itself with a user of a social media service.

Referring to FIG. 39, the representative method 3900 may include, at block 3910, an AP 2210 configuring a home network at the AP 2210 while a user of a social media service is signed into the social media service. At block 3920, the AP 2210 may automatically associate one or more identifiers of WTRUs that have been connected to the AP with an identifier of the user of the social media service, as association information. At block 3930, the AP 2210 may store the association information.

In certain representative embodiments, the AP 2210 may update the association information on condition that the WTRU 102-1 connects to the home network of the AP 2210.

FIG. 40 is a flow diagram of a representative method 4000 for managing a connection to a network by a WTRU 102-1 and/or a user.

Referring to FIG. 40, the representative method 4000 may include, at block 4010, an AP 2210 of the network determining whether the WTRU 102-1 or the User is authorized to expose a hidden network or initiate a new network. At block 4020, the AP 2210 may expose the hidden network to the WTRU 102-1 or initiating the new network for the WTRU 102-1, when the WTRU or the user is authorized for the hidden network or the newly initiated network.

In certain representative embodiments, the AP 2210 may obtain owner authorization information from a cloud service seeking explicit or pre-provisioned authorization from the owner for access by the WTRU 102-1 and/or User.

In certain representative embodiments, the AP 2210 may automatically access the hidden network or the newly initiated network. The automatic access to the hidden network or the newly initiated network may include that the AP 2210 may receive a session key known by the WTRU 102-1 and other network configuration information, which may enable secure communications connectivity to be setup between the WTRU 102-1 and the AP 2210.

In certain representative embodiments, the session key may be derived from a security association between the WTRU/User and a cloud service.

FIG. 41 is a flow diagram of a representative method 4100 for establishing a secure connection between a WTRU 2806 and an AP 2804 associated with a Wireless Network (WN).

Referring to FIG. 41, the representative method 4100 may include, at block 4110, an AP 2804 receiving information for authenticating the WTRU 2806 or a user of the WTRU 2806. At block 4120, the AP 2804 may determine from the received information any of: (1) an identity of the WTRU 2806, (2) an identity of the user of the WTRU 2806; and/or (3) a MAC address of the WTRU 2806. At block 4130, the AP 2804 may send received information to a network entity (NE) 2808 to enable authentication of the WTRU 2806 and setup a secure connection. In certain representative embodiments, the authentication may be a mutual authentication of the AP 2804 and the NE 2808. At block 4140, the AP 2804 may receive from the NE 2808 a security key associated with the WTRU 2806 and the AP 2804.

At block 4150, the AP 2804 may derive a transient key or use the received security key, as a transient key, associated with a session between the WTRU 2806 and the AP 2804. At block 4160, the AP 2804 may perform a 4-way handshake operation to confirm the secure connection between the WTRU 2806 and the AP 2804 and to verify mutual possession of the transient key (e.g., PTK).

In certain representative embodiments, the AP 2804 may discover the NE 2808, which may facilitate authentication of any of: (1) the WTRU 2806, or (2) the user of the WTRU 2806, using at least the determined identity or identities of the WTRU 2806 or the user;

In certain representative embodiments, the AP 2804 may receive from the NE 2808 a passphrase, which may be a phrase belonging to the English language, randomly created nonsensical text and/or cryptographically derived; and may derive, at the AP 2804, the security key using the passphrase.

In certain representative embodiments, the AP 2804 may receive from the NE 2808 the security key directly from the NE 2808.

In certain representative embodiments, the AP 2804 may obtain a new passphrase and/or a new security key for each session established between the WTRU 2806 and the AP 2804.

In certain representative embodiments, the AP 2804 may refresh the passphrase and/or the security key (1) after each use; (2) periodically, (3) on demand from the NE 2808; (4)

based on security policies at the AP 2804, and/or (5) based on security policies at the NE 2808.

In certain representative embodiments, the AP 2804 may establish communications with the WTRU 2806, exclusive of the NE 2808, for performing the authentication and derive one or more transient keys from the security key such that the one or more transient keys are not derivable by the NE 2808.

In certain representative embodiments, the AP 2804 may establish communications with the WTRU 2806 via the NE 2808 and may receive the session key that is known to the NE 2808.

In certain representative embodiments, the AP 2804 may control access to one or more services available on the wireless network (WN) that is associated with the AP 2804 based on access control policies.

In certain representative embodiments, the WTRU 2806 may be associated with a second network different from the WN of the AP 2804 and the AP 2804 may receive configuration information associated with the WTRU 2806.

In certain representative embodiments, the AP 2804 may virtualize the second network on the WN of the AP 2804 or may tunnel to the second network to provide services available on the second network to the WTRU 2806 based on the received configuration information.

FIG. 42 is a flow diagram of another representative method 4200 for facilitating an establishment of a secure connection between a WTRU 2806 and an AP 2804 associated with a WN.

Referring to FIG. 42, the representative method 4200 may include, at block 4210, a NE 2808 receiving from the AP 2804, any of: (1) an identity of the WTRU 2806; (2) an identity of the user of the WTRU 2806; and/or (3) a MAC address of the WTRU 2806. At block 4220, the NE 2808 may perform an authentication of the WTRU 2806 using the received information. At block 4230, the NE 2808 may derive a security key associated with the WTRU 2806 and the AP 2804. At block 4240, the NE 2808 may send to the AP 2804, the derived security key to facilitate a 4-way handshake operation between the WTRU 2806 and the AP 2804.

Certain Representative Embodiments

In a first embodiment, a method of managing an exposure of a network to a WTRU may comprise: receiving, by an access point (AP) of the network, information associated with the WTRU; and/or selectively exposing, by the AP, the network.

In a second embodiment, a method of managing an exposure of a network to a wireless transmit/receive unit (WTRU) may comprise: receiving, by a network entity (NE) from an access point (AP) of the network, information associated with the WTRU; determining, by the NE, whether to expose the network to or hide the network from the WTRU based on any of: (1) the received information from the AP; or (2) one or more network exposure rules; and/or sending, by the network entity to the AP, a message to control selective exposure of the network.

In a third embodiment, a method of managing a connection to a network by a wireless transmit/receive unit (WTRU), may comprise: determining, by an access point (AP) of the network using a friend association list associated with the network whether the WTRU is authorized to access the network; and/or assigning, by the AP, automatic access by the WTRU to the network when the WTRU is authorized to access the network.

In a fourth embodiment, a method of managing a network connection by a wireless transmit/receive unit (WTRU) may comprise: receiving, by an access point (AP) from the WTRU, a probe including information identifying the WTRU; determining, by the AP, whether the WTRU is authorized for a network connection based on the received probe; exposing a hidden network to the WTRU or initiating a new network for the WTRU based on the information in the received probe; and/or sending, by the AP, configuration information to enable the WTRU to automatically connect to the hidden network or the newly initiated network.

In a fifth embodiment, a method of associating a wireless transmit/receive unit (WTRU) or an access point (AP) itself with a user of a social media service may comprise: configuring a home network at the AP while a user of a social media service is signed into the social media service; automatically associating, by the AP, one or more identifiers of WTRUs that have been connected to the AP with an identifier of the user of the social media service, as association information; and/or storing the association information.

In a sixth embodiment, a method of managing a connection to a network by a wireless transmit/receive unit (WTRU) and/or a User may comprise: determining, by an access point (AP) of the network, whether the WTRU or the User is authorized to expose a hidden network or initiate a new network; and/or exposing the hidden network to the WTRU or initiating the new network for the WTRU when the WTRU or the user is authorized for the hidden network or the newly initiated network.

In a seventh embodiment, a method of 93 A method of establishing a secure connection between a wireless transmit/receive unit (WTRU) and an access point (AP) associated with a Wireless Network (WN) may comprise: receiving, by the AP from the WTRU, information for authenticating the WTRU or a user of the WTRU; determining from the received information any of: (1) an identity of the WTRU; (2) an identity of the user of the WTRU; and/or (3) the MAC address of the WTRU; sending the received information, by the AP, to the a network entity (NE) to enable authentication of the WTRU; receiving, by the AP, a security key from the NE associated with the WTRU and the AP; deriving a transient key or using the received security key as a transient key associated with a session between the WTRU and the AP; and/or performing a 4-way handshake operation to confirm the secure connection between the WTRU and the AP.

In an eighth embodiment, a method of facilitating an establishment of a secure connection between a wireless transmit/receiver unit (WTRU) and an access point (AP) associated with a wireless network (WN) may comprise: receiving, by a network entity (NE) from the AP, any of: (1) an identity of the WTRU; (2) an identity of the user of the WTRU; and/or (3) a MAC address of the WTRU; performing, by the NE, an authentication of the WTRU using the received information; deriving, by the NE, a security key associated with the WTRU and the AP; and/or sending, by the NE to the AP, the derived security key to facilitate a 4-way handshake operation between the WTRU and the AP.

The method of any of the first through eighth embodiments, wherein: the receiving of the network information may include receiving an identifier of the WTRU and the selectively exposing of the network may include selectively exposing the network based on the received identifier.

The method of any of the first through eighth embodiments, wherein the selectively exposing of the network may include selectively exposing the network to the WTRU based on: (1) an indicator from a network entity and/or (2) one or more network exposure rules.

The method of any of the first through eighth embodiments, wherein the selectively exposing of the network may include one of: (1) exposing the network to the WTRU; or (2) hiding the network from the WTRU.

The method of any of the first through eighth embodiments, wherein the hiding the network from the WTRU may include: disassociating, by the AP, the WTRU from the network; and/or halting, by the AP, communication to the WTRU.

The method of any of the first through eighth embodiments, wherein the selectively exposing of the network may include: determining to expose the network to the WTRU on condition that the received information associated with the WTRU satisfies one or more network exposure rules; and/or exposing the network to the WTRU.

The method of any of the first through eighth embodiments, wherein the selectively exposing of the network may include determining to hide the network from the WTRU on condition that the received information associated with the WTRU does not satisfy one or more network exposure rules; and/or hiding the network from the WTRU.

The method of any of the first through eighth embodiments, which may further comprise: sending, by the AP, an identifier of the WTRU to a network entity; and/or receiving, by the AP, a message indicating whether or not to expose the network to the WTRU.

The method of any of the first through eighth embodiments, wherein the selectively exposing of the network may include exposing the network to the WTRU on condition that the message indicates to expose the network to the WTRU, and hiding the network from the WTRU on condition that the message indicates to not expose the network to the WTRU.

The method of any of the first through eighth embodiments, which may further comprise determining whether to expose the network to or hide the network from the WTRU based on any of: (1) the received information from the WTRU or (2) one or more network exposure rules.

The method of any of the first through eighth embodiments, wherein: the determining of whether to expose or hide the network may include determining a Quality of Service (QoS) level to be used by the WTRU; and/or the selectively exposing of the network may include: exposing the network to the WTRU on condition that the QoS level exceeds a QoS threshold level, and/or hiding the network from the WTRU on condition that the QoS level does not exceed the QoS threshold level.

The method of any of the first through eighth embodiments, wherein: the determining of whether to expose or hide the network may include determining a capacity of the network; and/or the selectively exposing of the network may include: exposing the network to the WTRU on condition that the capacity of the network will not be exceeded if the WTRU is connected to the network, and/or hiding the network from the WTRU on condition that the capacity of the network will be exceeded if the WTRU is connected to the network.

The method of any of the first through eighth embodiments, wherein the selectively exposing of the network may include selectively exposing the network to the WTRU based on load balancing rules such that: (1) the network is exposed to the WTRU to move the WTRU to the network to redistribute load to the network; or (2) the network is hidden from the WTRU to move the WTRU out of the network to redistribute load to one or more further networks in accordance with the load balancing rules.

The method of any of the first through eighth embodiments, wherein: the determining of whether to expose the network to the WTRU may include determining whether any of: (1) the WTRU is a preferred device; (2) a user of the WTRU is a preferred user; or (3) the WTRU is executing a preferred application, as a determined result; and/or the selectively exposing of the network may include exposing the network to the WTRU based on the determined result.

The method of any of the first through eighth embodiments, which may further comprise hiding the network from the WTRU on condition that the WTRU is no longer executing the preferred application.

The method of any of the first through eighth embodiments, wherein: the determining of whether or not to expose the network to the WTRU may include determining, by the AP of the network using a friend association list, whether the WTRU is authorized to access the network; and/or the selectively exposing of the network may include assigning, by the AP, automatic access by the WTRU to the network on condition that the WTRU is authorized to access the network.

The method of any of the first through eighth embodiments, which may further comprise: receiving, by the AP of the network, further information associated with a further WTRU; determining, by the AP of the network using the friend association list whether the further WTRU is listed in the friend association list; on condition that the further WTRU is not listed in the friend association list, determining whether the further WTRU is any of: (1) associated with the WTRU listed in the friend association list; or (2) associated with a home network of the WTRU listed in the friend association list; and/or on condition that the further WTRU is any of: (1) listed in the friend association list; (2) associated with the WTRU listed in the friend association list; or (3) associated with the home network of the WTRU listed in the friend association list, exposing the network to the further WTRU.

The method of any of the first through eighth embodiments, wherein the network may be exposed to the further WTRU on condition that: (1) the WTRU is associated with the WTRU; and/or (2) the WTRU is within range of the network and/or the WTRU is connected to the network.

The method of any of the first through eighth embodiments, which may further comprise configuring the AP to allow a further WTRU to be exposed to the network via a further friend association list that is associated with: (1) the WTRU; and/or (2) a user of the WTRU.

The method of any of the first through eighth embodiments, which may further comprise configuring the AP to allow the WTRU to be exposed to the network, which is a hidden network, via a friend association list.

The method of any of the first through eighth embodiments, which may further comprise sending, by the AP to another WTRU associated with the network, a notification that the WTRU listed in the friend association list is to be given, is being given, or has been given exposure to the network; receiving, by the AP, a message indicating one of: (1) a pre-approval of the exposure of the network to the WTRU; (2) a post-approval of the exposure of the network to the WTRU or (3) a disapproval of the exposure of the network to the WTRU; and/or initiating, continuing or halting exposure of the network to the WTRU based on the indication in the received message.

The method of any of the first through eighth embodiments, wherein the WTRU may be associated with a further network and may include an associated network configuration.

The method of any of the first through eighth embodiments, which may further comprise virtualizing the further network, using the associated network configuration, on the network.

The method of any of the first through eighth embodiments, which may further comprise: retrieving, by the network entity, a user profile associated with the user of the WTRU; and/or determining whether to expose the network to the WTRU based on the retrieved user profile and the one or more network exposure rules.

The method of any of the first through eighth embodiments, wherein the determining of whether to expose the network to the WTRU may include sending, by the NE to the WTRU, a notification to confirm terms for exposing and/or accessing the network.

The method of any of the first through eighth embodiments, wherein: the determining of whether to expose the network to the WTRU may include determining a priority of the WTRU and other WTRUs connected to, associated with or in range of the network; and/or the sending of the message to control selective exposure of the network may include sending the message indicating to expose the network to the WTRU on condition that capacity of the network is sufficient to serve capacity requirements of a group of highest priority WTRUs that include the WTRU.

The method of any of the first through eighth embodiments, wherein the assigning of automatic access by the WTRU to the network when the WTRU is authorized to access the network may include: after determining that the WTRU is authorized to access the network: configuring the AP to expose the network to the WTRU; accepting an attachment of the WTRU to the network; and/or controlling access of the WTRU using network access policies.

The method of any of the first through eighth embodiments, wherein the friends association list may be a friends list of a social network service.

The method of any of the first through eighth embodiments, which may further comprise: receiving, via the AP from the social network service, an access token to access the friends list associated with the network; and/or obtaining, the friends list from the social network service, using the received access token.

The method of any of the first through eighth embodiments, wherein the obtaining of the friends list may include storing the friends list locally.

The method of any of the first through eighth embodiments, which may further comprise receiving, by the AP, the friend association list via a social networking service.

The method of any of the first through eighth embodiments, wherein: the determining of whether the WTRU is authorized to access the network may include comparing an identifier associated with the WTRU with one or more identifiers in the friend association list; and/or the assigning of automatic access by the WTRU to the network when the WTRU is authorized to access the network may include: responsive to the identifier associated with the WTRU corresponding to one of the identifiers in the friend association list, exposing the network to the WTRU, and/or responsive to the identifier associated with the WTRU not corresponding to any identifiers in the friend association list, not exposing the network to the WTRU.

The method of any of the first through eighth embodiments, which may further comprise obtaining, by the AP, connection policies for connection to the network.

The method of any of the first through eighth embodiments, wherein the determining of whether the WTRU is authorized to access the network may be based on the friend association list and the obtained connection policies.

The method of any of the first through eighth embodiments, wherein the friend association list may include information accumulated while one or more users are using a social networking service.

The method of any of the first through eighth embodiments, wherein the social networking service may include any of: Facebook, Twitter, Linked-in, Instagram, Snapchat, Wanelo, Vine, Skype, Pinterest, Tumblr, Oovoo, Path, Keek, My Space, My Flickr, google+, gmail, yahoo and/or Happy Flickr.

The method of any of the first through eighth embodiments, wherein the WTRU may be associated with a home network.

The method of any of the first through eighth embodiments, which may further comprise establishing, by the AP, a tunnel between the network and the home network to enable the WTRU to execute a service offered by the home network via the established tunnel.

The method of any of the first through eighth embodiments, wherein the assigning of automatic access by the WTRU to the network may be based on policies.

The method of any of the first through eighth embodiments, wherein the assigning of automatic access by the WTRU to the network may be triggered based on any of: (1) a credit or debit card purchase; (2) a ticket purchase; (3) payment for a rental of a hotel; (4) a purchase of a service or a good and/or (5) card access to a building.

The method of any of the first through eighth embodiments, wherein the newly initiated network may be a hidden WiFi network serving only the WTRU.

The method of any of the first through eighth embodiments, which may further comprise configuring the newly initiated network as a single WTRU serving network such that when each WTRU is to connect via the AP, a respectively different network is initiated for each respective WTRU The method of any of the first through eighth embodiments, wherein the establishing of the new network may include: configuring a time period for a pre-established network in accordance with a predetermined policy; maintaining the pre-established network prior to an expiration of the time period; and/or shutting down the pre-established network after the expiration of the time period.

The method of any of the first through eighth embodiments, wherein the shutting down of the pre-established network may include disconnecting the WTRU from the pre-established network.

The method of any of the first through eighth embodiments—wherein the sending of configuration information may include: sending network information to identify the newly initiated network to the WTRU.

The method of any of the first through eighth embodiments, which may further comprise shutting down, by the AP, a pre-established network to force the WTRU to automatically reconnect to the newly initiated network.

The method of any of the first through eighth embodiments, which may further comprise terminating of the network connection including disconnecting the WTRU from the pre-established network by the shutting down of the pre-established network.

The method of any of the first through eighth embodiments, which may further comprise updating, the association information on condition that the WTRU connects to the home network of the AP.

The method of any of the first through eighth embodiments, which may further comprise obtaining, by the AP, owner authorization information from a cloud service seeking explicit or pre-provisioned authorization from the owner for access by the WTRU and/or User.

The method of any of the first through eighth embodiments, which may further comprise automatically accessing the hidden network or the newly initiated network.

The method of any of the first through eighth embodiments, wherein the automatic accessing of the hidden network or the newly initiated network may include receiving, by the AP, a session key known by the WTRU and/or other network configuration information, which may enable secure communications connectivity to be setup between the WTRU and the AP.

The method of any of the first through eighth embodiments, wherein the session key may be derived from a security association between the WTRU/User and a cloud service.

The method of any of the first through eighth embodiments, which may further comprise discovering the NE, which facilitates authentication of any of: (1) the WTRU, or (2) the user of the WTRU, using at least the determined identity or identities of the WTRU or the user; sending an identity of the AP to the NE, performing an authentication between the AP and the NE; and/or establishing a secure communication link between the AP and the NE.

The method of any of the first through eighth embodiments, wherein the obtaining of the security key may include: receiving, by the AP from the NE, a passphrase; and/or deriving, at the AP, the security key using the passphrase.

The method of any of the first through eighth embodiments, wherein the obtaining of the security key may include receiving, by the AP from the NE, the security key directly from the NE.

The method of any of the first through eighth embodiments, wherein the obtaining of the security key may include receiving, by the AP from the NE, the transient key directly from the NE.

The method of any of the first through eighth embodiments, wherein the obtaining of the security key may include: obtaining, by the AP, a new security key for each session established between the WTRU and the AP.

The method of any of the first through eighth embodiments, wherein the obtaining of the security key may include: expiring, by the AP, the security key (1) after each use; (2) periodically, (3) on demand from the NE and/or (4) based on security policies at the AP.

The method of any of the first through eighth embodiments, which may further comprise establishing, by the AP, communications with the WTRU, exclusive of the NE, for performing an authentication.

The method of any of the first through eighth embodiments, wherein the performing of the authentication of the WTRU may include deriving, by the AP, one or more transient keys from the security key.

The method of any of the first through eighth embodiments, which may further comprise: establishing, by the AP, communications between the WTRU and the NE; performing an authentication of the WTRU and/or a user of the WTRU; deriving one or more security keys which may be any of: (1) one or more master session keys; (2) one or more pre-shared master keys and/or (3) one or more transient keys; and/or receiving, by the AP, the one or more security keys that are known to the NE.

The method of any of the first through eighth embodiments, which may further comprise controlling, by the AP, access to one or more services available on the WN that is associated with the AP based on access control policies.

The method of any of the first through eighth embodiments, wherein the WTRU may be associated with a second network different from the wireless WN of the AP.

The method of any of the first through eighth embodiments, which may further comprise: receiving, by the AP, configuration information associated with the WTRU; and/or virtualizing the second network on the WN of the AP or tunneling to the second network, by the AP, to provide services available on the second network to the WTRU based on the received configuration information.

The method of any of the first through eighth embodiments, wherein the derived security key sent to the AP may be any of: (1) a master session key; (2) a pre-shared master key or (3) a transient key.

In a ninth embodiment, a network access point (NAP) may be configured to manage an exposure of a network to a wireless transmit/receive unit (WTRU) and may comprise: a transmit/receive unit configured to receive information associated with the WTRU; and/or a processor configured to selectively exposing the network.

In a tenth embodiment, a network entity (NE) may be configured to manage an exposure of a network to a wireless transmit/receive unit (WTRU) and may comprise: a transmit/receive unit configured to receive from an access point (AP) of the network, information associated with the WTRU; and/or a processor configured to determine whether to expose to or hide the network from the WTRU based on any of: (1) the received information from the AP or (2) one or more network exposure rules, as a determined result, wherein the transmit/receive unit may be configured to send to the AP a message to control selective exposure of the network based on the determined result.

In an eleventh embodiment, a network access point (NAP) may be configured to manage a connection to a network by a wireless transmit/receive unit (WTRU), and may comprise: a processor is configured to: determine, using a friend association list, whether the WTRU is authorized to access the network; and/or assign, by the AP, automatic access by the WTRU to the network, when the WTRU is authorized to access the network.

In a twelfth embodiment, a NAP may be configured to manage a network connection by a wireless transmit/receive unit (WTRU) and may comprise: a transmit/receive unit configured to receive from the WTRU a probe including information identifying the WTRU; and/or a processor configured to: determine whether the WTRU is authorized for a network connection based on the received probe, and/or expose a hidden network to the WTRU or initiating a new network for the WTRU based on the information in the received probe, wherein the transmit/receive unit may be configured to send configuration information to enable the WTRU to automatically connect to the hidden network or the newly initiated network.

In a thirteenth embodiment, a NAP may be configured to manage a connection to a network by a WTRU or a user, and may comprise: a processor configured to: determine whether the WTRU or the user is authorized to be exposed to a hidden network or initiate a new network; and/or expose the hidden network to the WTRU or initiate the new network for the WTRU when the WTRU or the user is authorized to be exposed to the hidden network or the newly initiated network.

In a fourteenth embodiment, a graphical user interface for displaying network exposure status of one or more wireless transmit/receive units associated with a network, may comprise: a processor unit configured to determine a status of each WTRU associated with or in range of the network, wherein the status includes: (1) whether a respective WTRU has not been exposed to the network; (2) whether a respective WTRU has been detected and no user is registered to that respective WTRU; (3) the respective WTRU has been detected and is being avoided by the network; (4) the respective WTRU is being exposed to the network and the respective WTRU has not associated with the network yet; and/or (5) the respective WTRU is connected to the network; and/or a display unit configured to provide visual indications of each status for each respective WTRU.

In a fifteenth embodiment, a NAP associated with a wireless network (WN) may be configured to establish a secure connection between a wireless transmit/receive unit (WTRU) and the NAP and may comprise: a transmit/receive unit configured to receive from the WTRU, information for authenticating the WTRU or a user of the WTRU; and/or a processor configured to determine from the received information any of: (1) an identity of the WTRU; (2) an identity of the user of the WTRU; or (3) the MAC address of the WTRU, wherein: the transmit/receive unit may be configured to: send the received information to the a network entity (NE) to enable authentication of the WTRU, and receive a security key from the NE associated with the WTRU and the AP; and/or the processor may be configured to: derive a transient key or using the received security key as a transient key associated with a session between the WTRU and the AP, and perform a 4-way handshake operation to confirm the secure connection between the WTRU and the AP.

In a sixteenth embodiment, a NE may be configured to facilitate establishment of a secure connection between a WTRU and an AP associated with a WN, and may comprise: a transmit/receive unit configured to receive from the AP, any of: (1) an identity of the WTRU; (2) an identity of the user of the WTRU; and/or the MAC address of the WTRU; and/or a processor configured to: perform an authentication of the WTRU using the received information, and derive a security key associated with the WTRU and the AP, wherein the transmit/receive unit may be configured to send to the AP the derived security key to facilitate a 4-way handshake operation between the WTRU and the AP.

The NAP of any of the ninth, eleventh, twelfth, thirteenth or fifteenth embodiments, wherein: the transmit/receive unit may be configured to receive an identifier of the WTRU and/or the processor may be configured to selectively expose the network based on the received identifier.

The NAP of any of the ninth, eleventh, twelfth, thirteenth or fifteenth embodiments, wherein the processor may be configured to selectively expose the network to the WTRU based on: (1) an indicator from a network entity; and/or (2) one or more network exposure rules.

The NAP of any of the ninth, eleventh, twelfth, thirteenth or fifteenth embodiments, wherein the processor may be configured to one of: (1) expose the network to the WTRU; or (2) hiding the network from the WTRU.

The NAP of any of the ninth, eleventh, twelfth, thirteenth or fifteenth embodiments, wherein the processor may be configured to: disassociate the WTRU from the network; and/or halt communication to the WTRU.

The NAP of any of the ninth, eleventh, twelfth, thirteenth or fifteenth embodiments, wherein processor may be configured to: determine to expose the network to the WTRU on condition that the received information associated with the WTRU satisfies one or more network exposure rules; and expose the network to the WTRU.

The NAP of any of the ninth, eleventh, twelfth, thirteenth or fifteenth embodiments, wherein the processor may be configured to: determine to hide the network from the WTRU on condition that the received information associated with the WTRU does not satisfy one or more network exposure rules; and hide the network from the WTRU.

The NAP of any of the ninth, eleventh, twelfth, thirteenth or fifteenth embodiments, wherein: the transmit/receive unit may be configured to: send an identifier of the WTRU to a network entity, and receive a message indicating whether or not to expose the network to the WTRU; and/or the processor may be configured to: expose the network to the WTRU on condition that the message indicates to expose the network to the WTRU, and hide the network from the WTRU on condition that the message indicates to not expose the network to the WTRU.

The NAP of any of the ninth, eleventh, twelfth, thirteenth or fifteenth embodiments, wherein the processor may be configured to: determine whether to expose to or hide the network from the WTRU based on any of: (1) the received information from the WTRU; or (2) one or more network exposure rules.

The NAP of any of the ninth, eleventh, twelfth, thirteenth or fifteenth embodiments, wherein the processor may be configured to: determine a Quality of Service (QoS) level to be used by the WTRU; expose the network to the WTRU on condition that the QoS level exceeds a QoS threshold level, and/or hide the network from the WTRU on condition that the QoS level does not exceed the QoS threshold level.

The NAP of any of the ninth, eleventh, twelfth, thirteenth or fifteenth embodiments, wherein the processor may be configured to: determine a capacity of the network; expose the network to the WTRU on condition that the capacity of the network will not be exceeded, if the WTRU is connected to the network, and/or hide the network from the WTRU on condition that the capacity of the network will be exceeded, if the WTRU is connected to the network.

The NAP of any of the ninth, eleventh, twelfth, thirteenth or fifteenth embodiments, wherein the processor may be configured to selectively expose the network to the WTRU based on load balancing rules such that the network is exposed to the WTRU to move the WTRU to the network to redistribute load and the network is hidden from the WTRU to move the WTRU out of the network to redistribute load to one or more further networks in accordance with the load balancing rules.

The NAP of any of the ninth, eleventh, twelfth, thirteenth or fifteenth embodiments, wherein the processor may be configured to: determine whether any of: (1) the WTRU is a preferred device; (2) a user of the WTRU is a preferred user; or (3) the WTRU is executing a preferred application, as a determined result; and expose the network to the WTRU based on the determined result.

The NAP of any of the ninth, eleventh, twelfth, thirteenth or fifteenth embodiments, wherein the processor may be configured to hide the network from the WTRU on condition that the WTRU is no longer executing a preferred application.

The NAP of any of the ninth, eleventh, twelfth, thirteenth or fifteenth embodiments, wherein the processor may be configured to: determine, using a friend association list, whether the WTRU is authorized to access the network; and/or assign automatic access by the WTRU to the network on condition that the WTRU is authorized to access the network.

The NAP of any of the ninth, eleventh, twelfth, thirteenth or fifteen embodiments, wherein: the transmit/receive unit may be configured to receive further information associated with a further WTRU; and/or the processor may be configured to: determine whether the further WTRU is listed in the friend association list, on condition that the further WTRU is not listed in the friend association list, determine whether the further WTRU is any of: (1) associated with the WTRU listed in the friend association list; or (2) associated with a home network of the WTRU listed in the friend association list, and on condition that the further WTRU is any of: (1) listed in the friend association list; (2) associated with the WTRU listed in the friend association list; or (3) associated with the home network of the WTRU listed in the friend association list, expose the network to the further WTRU.

The NAP of any of the ninth, eleventh, twelfth, thirteenth or fifteen embodiments, wherein the network may be exposed to the further WTRU on condition that the WTRU is associated with the WTRU and further that the WTRU is within range of the network and/or connected to the network.

The NAP of any of the ninth, eleventh, twelfth, thirteenth or fifteen embodiments, wherein the processor may be configured to allow a further WTRU to be exposed to the network via a further friend association list that is associated with the WTRU and/or a user of the WTRU.

The NAP of any of the ninth, eleventh, twelfth, thirteenth or fifteen embodiments, wherein the processor may be configured to allow the WTRU to be exposed to the network, which is a hidden network, via a friend association list.

The NAP of any of the ninth, eleventh, twelfth, thirteenth or fifteen embodiments, wherein: the transmit/receive unit may be configured to: send to another WTRU associated with the network, a notification that the WTRU listed in the friend association list is to be given, is being given or has been given exposure to the network, and receive, a message indicating one of: (1) a pre-approval of the exposure of the network to the WTRU; (2) a post-approval of the exposure of the network to the WTRU or (3) a disapproval of the exposure of the network to the WTRU; and/or the processor may be configured to initiate, continue or halt exposure of the network to the WTRU based on the indication in the received message.

The NAP of any of the ninth, eleventh, twelfth, thirteenth or fifteen embodiments, wherein: the WTRU may be associated with a further network and may include an associated network configuration; and/or the processor may be configured to virtualize the further network, using the associated network configuration, on the network.

The NE of any of the tenth or sixteen embodiments, wherein: the transmit/receive unit may be configured to retrieve a user profile associated with the user of the WTRU; and/or the processor may be configured to determine whether to expose the network to the WTRU based on the retrieved user profile and the one or more network exposure rules.

The NE of any of the tenth or sixteen embodiments, wherein the transmit/receive unit may be configured to send to the WTRU a notification to confirm terms for exposing and/or accessing the network.

The NE of any of the tenth or sixteen embodiments, wherein: the processor may be configured to determine a priority of the WTRU and other WTRUs connected to, associated with, or in range of the network; and/or the transmit/receive unit may be configured to send the message indicating to expose the network to the WTRU on condition that a capacity of the network is sufficient to serve capacity requirements of a group of highest priority WTRUs that include the WTRU.

The NAP of any of the ninth, eleventh, twelfth, thirteenth or fifteen embodiments, wherein the processor may be configured to, after determining that the WTRU is authorized to access the network: configure the NAP to expose the network to the WTRU; and/or accept an attachment of the WTRU to the network; and/or control access of the WTRU using network access policies.

The NAP of any of the ninth, eleventh, twelfth, thirteenth or fifteen embodiments, wherein: the friends association list may be a friends list of a social network service.

The NAP of any of the ninth, eleventh, twelfth, thirteenth or fifteen embodiments, wherein the transmit/receive unit may be configured to: receive from the social network service, an access token to access the friends list associated with the network, and/or obtain the friends list from the social network service, using the received access token.

The NAP of any of the ninth, eleventh, twelfth, thirteenth or fifteen embodiments, wherein the NAP may further comprise a memory configured to store the obtained friends list locally.

The NAP of any of the ninth, eleventh, twelfth, thirteenth or fifteen embodiments, wherein: the transmit/receive unit may be configured to receive the friend association list via a social networking service; and the processor may be configured to: compare an identifier associated with the WTRU with one or more identifiers in the friend association list, responsive to the identifier associated with the WTRU corresponding to one of the identifiers in the friend association list, expose the network to the WTRU, and/or responsive to the identifier associated with the WTRU not corresponding to any identifiers in the friend association list, not expose the network to the WTRU.

The NAP of any of the ninth, eleventh, twelfth, thirteenth or fifteen embodiments, wherein: the transmit/receive unit may be configured to obtain one or more connection policies for connection to the network; and/or the processor may be configured to determine whether the WTRU is authorized to access the network based on the friend association list and the obtained connection policies.

The NAP of any of the ninth, eleventh, twelfth, thirteenth or fifteen embodiments, wherein the WTRU may be associated with a home network and may include an associated network configuration such that the NAP virtualizes the home network, using the home network configuration, on the NAP.

The NAP of any of the ninth, eleventh, twelfth, thirteenth or fifteen embodiments, wherein the newly initiated network is a hidden WiFi network serving only the WTRU.

The NAP of any of the ninth, eleventh, twelfth, thirteenth or fifteen embodiments, wherein the processor may configure the newly initiated network, as a single WTRU serving network, such that when each WTRU is to connect via the AP, a respectively different network may be initiated for each respective WTRU.

The NAP of any of the ninth, eleventh, twelfth, thirteenth or fifteen embodiments, wherein the processor: configures a time period for a pre-established network in accordance with a predetermined policy; maintains the pre-established network prior to an expiration of the time period; and/or shuts down the pre-established network after the expiration of the time period.

The NAP of any of the ninth, eleventh, twelfth, thirteenth or fifteen embodiments, wherein the processor may be configured to disconnect the WTRU from the pre-established network by the shutting down of the pre-established network.

The NAP of any of the ninth, eleventh, twelfth, thirteenth or fifteen embodiments, wherein: the transmit/receive unit may be configured to send network information to identify the newly initiated network to the WTRU; and/or the processor may be configured to shut down a pre-established network to force the WTRU to automatically reconnect to the newly initiated network.

The NAP of any of the ninth, eleventh, twelfth, thirteenth or fifteen embodiments, wherein the transmit/receive unit may be configured to obtain owner authorization information from a cloud service seeking explicit or pre-provisioned authorization from an owner for access by the WTRU and/or the user.

The NAP of any of the ninth, eleventh, twelfth, thirteenth or fifteen embodiments, wherein: the processor may be configured to automatically access the hidden network or the newly initiated network; and the processor receiving, via the transmit/receive unit, a session key known by the WTRU and other network configuration information, which may enable secure communications connectivity to be setup between the WTRU and the NAP.

The NAP of any of the ninth, eleventh, twelfth, thirteenth or fifteen embodiments, wherein the session key may be derived from a security association between the WTRU/user and a cloud service.

The NAP of any of the ninth, eleventh, twelfth, thirteenth or fifteen embodiments, wherein: the processor may be configured to: discover the NE, which facilitates authentication of any of: (1) the WTRU, or (2) the user of the WTRU, using at least the determined identity or identities of the WTRU or the user, and perform an authentication between the AP and the NE; and/or the transmit/receive unit may be configured to send an identity of the AP to the NE such that the processor establishes a secure communication link between the AP and the NE.

The NAP of any of the ninth, eleventh, twelfth, thirteenth or fifteen embodiments, wherein, wherein: the transmit/receive unit may be configured to receive from the NE a passphrase; and/or the processor may be configured to derive the security key using the passphrase.

The NAP of any of the ninth, eleventh, twelfth, thirteenth or fifteen embodiments, wherein the transmit/receive unit may be configured to receive the security key directly from the NE.

The NAP of any of the ninth, eleventh, twelfth, thirteenth or fifteen embodiments, wherein the processor may be configured to obtain a new security key for each session established between the WTRU and the NAP.

The NAP of any of the ninth, eleventh, twelfth, thirteenth or fifteen embodiments, wherein the processor may be configured to expire the security key (1) after each use; (2) periodically, (3) on demand from the NE and/or (4) based on security policies at the AP.

The NAP of any of the ninth, eleventh, twelfth, thirteenth or fifteen embodiments, wherein: the transmit/receive unit may be configured to establish communications with the WTRU for performing an authentication, exclusive of the NE; and/or the processor may be configured to derive one or more transient keys from the security key.

The NAP of any of the ninth, eleventh, twelfth, thirteenth or fifteen embodiments, wherein the processor may be configured to control access to one or more services available on the WN that is associated with the AP based on access control policies.

The NAP of any of the ninth, eleventh, twelfth, thirteenth or fifteen embodiments, wherein: the WTRU may be associated with a second network different from the wireless WN of the AP; the transmit/receive unit may be configured to receive configuration information associated with the WTRU; and/or the processor may be configured to virtualize the second network on the WN of the AP or tunnel to the second network to provide services available on the second network to the WTRU based on the received configuration information.

The NE of any of the tenth The NE of any of the tenth or sixteen embodiments, wherein the processor may be configured to derive the security key sent to the AP as any of: (1) a master session key; (2) a pre-shared master key and/or (3) a transient key.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of managing an exposure of an indicated network that is hidden to a wireless transmit/receive unit (WTRU), the method comprising:
    receiving, by an access point (AP), an identifier associated with the WTRU;
    sending, by the AP, the identifier of the WTRU to a network entity (NE);
    receiving, by the AP from the NE, information indicating whether or not to expose the indicated network that is hidden to the WTRU;
    on condition that the indicated network is to be exposed to the WTRU, receiving, by the AP via the NE, one or more connection policies to enable a connection of the WTRU to the indicated network;
    determining, by the AP, based on at least the received information whether to expose the indicated network;
    selectively exposing, by the AP, the indicated network; and
    on condition that the indicated network is exposed:
        (1) connecting the WTRU with the indicated network, and
        (2) controlling access of the WTRU to the indicated network based on the one or more connection policies received via the NE.

2. The method of claim 1, wherein:
    the selectively exposing of the indicated network includes one of: (1) exposing the indicated network to the WTRU; or (2) hiding the exposed indicated network from the WTRU; and
    the hiding of the exposed indicated network from the WTRU includes:
        disassociating, by the AP, the WTRU from the exposed indicated network, and
        halting, by the AP, communication to the WTRU from the AP.

3. The method of claim 1, wherein the selectively exposing of the indicated network includes:
    selectively responding, by the AP with a probe response to the WTRU searching for the indicated network on condition that the received information associated with the WTRU satisfies one or more network exposure rules.

4. The method of claim 3, wherein the selectively responding with the probe response to the WTRU searching for the indicated network includes:
    determining whether any of: (1) the WTRU is a preferred device; (2) a user of the WTRU is a preferred user; or (3) the WTRU is executing a preferred application, as a determined result; and
    exposing the indicated network to the WTRU based on the determined result.

5. The method of claim 3, further comprising:
    determining, by the AP using a friend association list, whether the WTRU is authorized to access the indicated network; and
    assigning, by the AP, automatic access by the WTRU to the indicated network on condition that the WTRU is authorized to access the indicated network.

6. The method of claim 1, wherein:
    the determining of whether or not to expose the indicated network includes:
        determining a capacity of the indicated network;
        determining to expose the indicated network to the WTRU on condition that the capacity of the indicated network will not be exceeded if the WTRU is connected to the indicated network, and
        determining to hide the exposed indicated network from the WTRU on condition that the capacity of the indicated network will be exceeded if the WTRU is connected to the exposed indicated network.

7. The method of claim 1, further comprising configuring the AP to allow a further WTRU to be exposed to the indicated network via a further friend association list that is associated with any of: (1) the WTRU; or (2) a user of the WTRU.

8. The method of claim 1, further comprising:
    sending, by the AP to another WTRU associated with the indicated network, a notification that the WTRU listed in a friend association list is to be given, is being given, or has been given exposure to the indicated network;
    receiving, by the AP, a message indicating one of: (1) a pre-approval of the exposure of the indicated network to the WTRU; (2) a post-approval of the exposure of the indicated network to the WTRU or (3) a disapproval of the exposure of the indicated network to the WTRU; and initiating, continuing or halting exposure of the indicated network to the WTRU based on the indication in the received message.

9. The method of claim 1, wherein the WTRU is associated with a further network that includes an associated network configuration, the method further comprising virtualizing the further network, using the associated network configuration, on the indicated network.

10. The method of claim 1, further comprising virtualizing, on the AP, a home network associated with the WTRU using a SSID of the home network.

11. The method of claim 1, further comprising triggering the access for the WTRU based on any of: (1) a credit or debit card purchase; (2) a ticket purchase; (3) payment for a rental of a hotel; (4) a purchase of a service or a good and/or (5) card access to a building.

12. A network access point (NAP) configured to manage an exposure of an indicated network that is hidden to a wireless transmit/receive unit (WTRU), comprising:
a transmit/receive unit configured to:
receive, from the WTRU, an identifier associated with the WTRU,
send, to a network entity (NE), the identifier of the WTRU, and
receive, from the NE, information indicating whether or not to expose an indicated network to the WTRU;
on condition that the indicated network is to be exposed to the WTRU, receive, via the NE, one or more connection policies to enable a connection of the WTRU to the indicated network; and
a processor configured to:
selectively expose the indicated network; and
on condition that the indicated network is exposed:
(1) connect the WTRU with the indicated network, and
(2) control access of the WTRU to the indicated network based on the one or more connection policies received via the NE.

13. The NAP of claim 12, wherein the processor is configured to:
disassociate the WTRU from the indicated network; and
halt communication to the WTRU from the NAP.

14. The NAP of claim 12, wherein
the processor is configured to:
expose the indicated network to the WTRU on condition that the information indicates to expose the indicated network to the WTRU, and
continue to hide the indicated network from the WTRU on condition that the information indicates to not expose the indicated network to the WTRU.

15. The NAP of claim 12, wherein the processor is configured to:
determine a Quality of Service (QoS) level to be used by the WTRU;
expose the indicated network to the WTRU on condition that the QoS level exceeds a QoS threshold level, and
continue to hide the indicated network from the WTRU on condition that the QoS level does not exceed the QoS threshold level.

16. The NAP of claim 12, wherein the processor is configured to selectively expose the indicated network to the WTRU based on load balancing rules such that the indicated network is exposed to the WTRU to move the WTRU to the indicated network to redistribute load and the indicated network is hidden from the WTRU to move the WTRU out of the indicated network to redistribute load to one or more further networks in accordance with the load balancing rules.

17. The NAP of claim 12, wherein the processor is configured to:
determine, using a friend association list, whether the WTRU is authorized to access the indicated network; and
assign automatic access by the WTRU to the indicated network on condition that the WTRU is authorized to access the indicated network.

18. The NAP of claim 12, wherein:
the transmit/receive unit is configured to:
send to another WTRU associated with the indicated network, a notification that the WTRU listed in a friend association list is to be given, is being given or has been given exposure to the indicated network, and
receive, a message indicating one of: (1) a pre-approval of the exposure of the indicated network to the WTRU; (2) a post-approval of the exposure of the indicated network to the WTRU or (3) a disapproval of the exposure of the indicated network to the WTRU; and
the processor is configured to initiate, continue or halt exposure of the indicated network to the WTRU based on the indication in the received information.

19. The NAP of claim 12, wherein the NAP virtualizes a home network associated with the WTRU using a SSID of the home network.

20. The NAP of claim 12, wherein the processor is configured to trigger the access for the WTRU based on any of: (1) a credit or debit card purchase; (2) a ticket purchase; (3) payment for a rental of a hotel; (4) a purchase of a service or a good or (5) card access to a building.

21. A method of managing an exposure of an indicated network that is hidden to a wireless transmit/receive unit (WTRU), the method comprising:
receiving, by an access point (AP), an identifier associated with the WTRU;
sending, by the AP, the identifier of the WTRU to a network entity (NE);
receiving, by the AP from the NE, information indicating whether or not to expose the indicated network that is hidden to the WTRU;
selectively exposing, by the AP, the indicated network;
sending, by the AP to another WTRU associated with the indicated network, a notification that the WTRU listed in the friend association list is to be given, is being given, or has been given exposure to the indicated network;
receiving, by the AP, a message indicating one of: (1) a pre-approval of the exposure of the indicated network to the WTRU; (2) a post-approval of the exposure of the indicated network to the WTRU or (3) a disapproval of the exposure of the indicated network to the WTRU; and
initiating, continuing or halting exposure of the indicated network to the WTRU based on the indication in the received message.

* * * * *

UNITED STATES PATENT AND TRADEMARK OFFICE
CERTIFICATE OF CORRECTION

PATENT NO. : 9,980,213 B2  
APPLICATION NO. : 14/913538  
DATED : May 22, 2018  
INVENTOR(S) : Kenneth F. Lynch et al.

Page 1 of 1

It is certified that error appears in the above-identified patent and that said Letters Patent is hereby corrected as shown below:

In the Specification

In Column 1, Line 6, after "This application" insert --is a National Stage Application filed under 35 U.S.C. 371 of International Application No. PCT/US2014/052247, filed August 22, 2014 and--.

In Column 1, Line 9, after "the contents of" insert --each of--.

Signed and Sealed this
Sixteenth Day of October, 2018

Andrei Iancu
*Director of the United States Patent and Trademark Office*